(12) United States Patent
Fukuoka et al.

(10) Patent No.: US 12,479,213 B2
(45) Date of Patent: Nov. 25, 2025

(54) INK, INK SET AND PRINTER

(71) Applicant: KYOCERA CORPORATION, Kyoto (JP)

(72) Inventors: Shuichi Fukuoka, Kirishima (JP); Hisamitsu Sakai, Kyoto (JP); Akihiko Nishimoto, Kirishima (JP); Hitoshi Ookoda, Kirishima (JP); Takashi Miyahara, Kirishima (JP); Atsushi Ishihara, Kirishima (JP); Chihiro Takeshita, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 288 days.

(21) Appl. No.: 18/043,302

(22) PCT Filed: Aug. 25, 2021

(86) PCT No.: PCT/JP2021/031120
§ 371 (c)(1),
(2) Date: Feb. 27, 2023

(87) PCT Pub. No.: WO2022/045179
PCT Pub. Date: Mar. 3, 2022

(65) Prior Publication Data
US 2023/0364922 A1    Nov. 16, 2023

(30) Foreign Application Priority Data
Aug. 28, 2020    (JP) .................................. 2020-144343

(51) Int. Cl.
*B41J 2/21*    (2006.01)
*B41J 2/01*    (2006.01)
(Continued)

(52) U.S. Cl.
CPC ............... *B41J 2/2107* (2013.01); *B41J 2/01* (2013.01); *B41J 2/14201* (2013.01); *B41J 2/48* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 6,057,384 A * 5/2000 Nguyen ................. C09D 11/30
523/160
6,498,202 B1 * 12/2002 Sun ....................... C09D 11/322
347/100
(Continued)

FOREIGN PATENT DOCUMENTS

CN    108602348 A    9/2018
EP    3543301 A1    9/2019
(Continued)

OTHER PUBLICATIONS

Isao Takagi, Use of UV absorbers in paints, Journal of the Japan, Society of Color Material, 1971, pp. 483-490, vol. 44, 15pp.
(Continued)

*Primary Examiner* — Manish S Shah
(74) *Attorney, Agent, or Firm* — HAUPTMAN HAM, LLP

(57) ABSTRACT

An ink contains a medium, a coloring agent, a fixing polymer, and one or more kinds of polymers other than the fixing polymer. The coloring agent is dissolved or dispersed in the medium. The fixing polymer has a glass-transition temperature higher than the ordinary temperature and is dispersed in the medium. The one or more kinds of polymers each have a glass-transition temperature higher than the
(Continued)

ordinary temperature and are dissolved or dispersed in the medium. The fixing polymer is higher in glass-transition temperature than 80 mass % or more of the one or more kinds of polymers contained in the ink and each having a glass-transition temperature higher than the ordinary temperature.

19 Claims, 17 Drawing Sheets

(51) Int. Cl.
- B41J 2/14 (2006.01)
- B41J 2/48 (2006.01)
- B41J 3/407 (2006.01)
- B41J 11/00 (2006.01)
- B41M 5/00 (2006.01)
- C09D 11/101 (2014.01)
- C09D 11/30 (2014.01)
- C09D 11/322 (2014.01)
- C09D 11/326 (2014.01)
- C09D 11/34 (2014.01)
- C09D 11/40 (2014.01)

(52) U.S. Cl.
CPC ............ B41J 3/407 (2013.01); B41J 11/002 (2013.01); B41J 11/00214 (2021.01); B41M 5/0023 (2013.01); C09D 11/101 (2013.01); C09D 11/30 (2013.01); C09D 11/322 (2013.01); C09D 11/326 (2013.01); C09D 11/34 (2013.01); C09D 11/40 (2013.01)

(58) Field of Classification Search
CPC ...... B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/04581; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033

See application file for complete search history.

(56) References Cited

U.S. PATENT DOCUMENTS

| | | | |
|---|---|---|---|
| 2010/0178425 A1 | 7/2010 | Ooishi et al. | |
| 2011/0234727 A1* | 9/2011 | Aoki | B41M 5/0011 347/102 |
| 2014/0362136 A1* | 12/2014 | Yatake | B41J 2/01 524/522 |
| 2015/0267066 A1* | 9/2015 | Aoki | C09D 11/326 524/522 |
| 2018/0370253 A1 | 12/2018 | Ohnishi | |
| 2019/0030918 A1 | 1/2019 | Matsumoto et al. | |
| 2019/0292391 A1 | 9/2019 | Seguchi et al. | |
| 2023/0256752 A1* | 8/2023 | Fukuoka | B41J 2/2107 347/101 |

FOREIGN PATENT DOCUMENTS

| | | |
|---|---|---|
| JP | H4185672 A | 7/1992 |
| JP | 2010163534 A | 7/2010 |
| JP | 2013221231 A | 10/2013 |
| JP | 2014000683 A | 1/2014 |
| JP | 2016132679 A | 7/2016 |
| WO | 2009127261 A1 | 10/2009 |
| WO | 2017138436 A1 | 8/2017 |

OTHER PUBLICATIONS

Linshang Technology, "What are the factors that determine the curing effect of UV inks?", Technical information, Ultraviolet Intensity Detection, www.Istek.cn/word/wordview_4_978/ivk_sa/1024320u.html, Jul. 5, 2017, 10pp.

China Times Material Technology (Guangdong) Co., Ltd, "How can UV inks achieve curing quickly?", UV ink information, Medium time, www.zhongshink.com/news_content-828307.html, Aug. 19, 2020, 5pp.

* cited by examiner

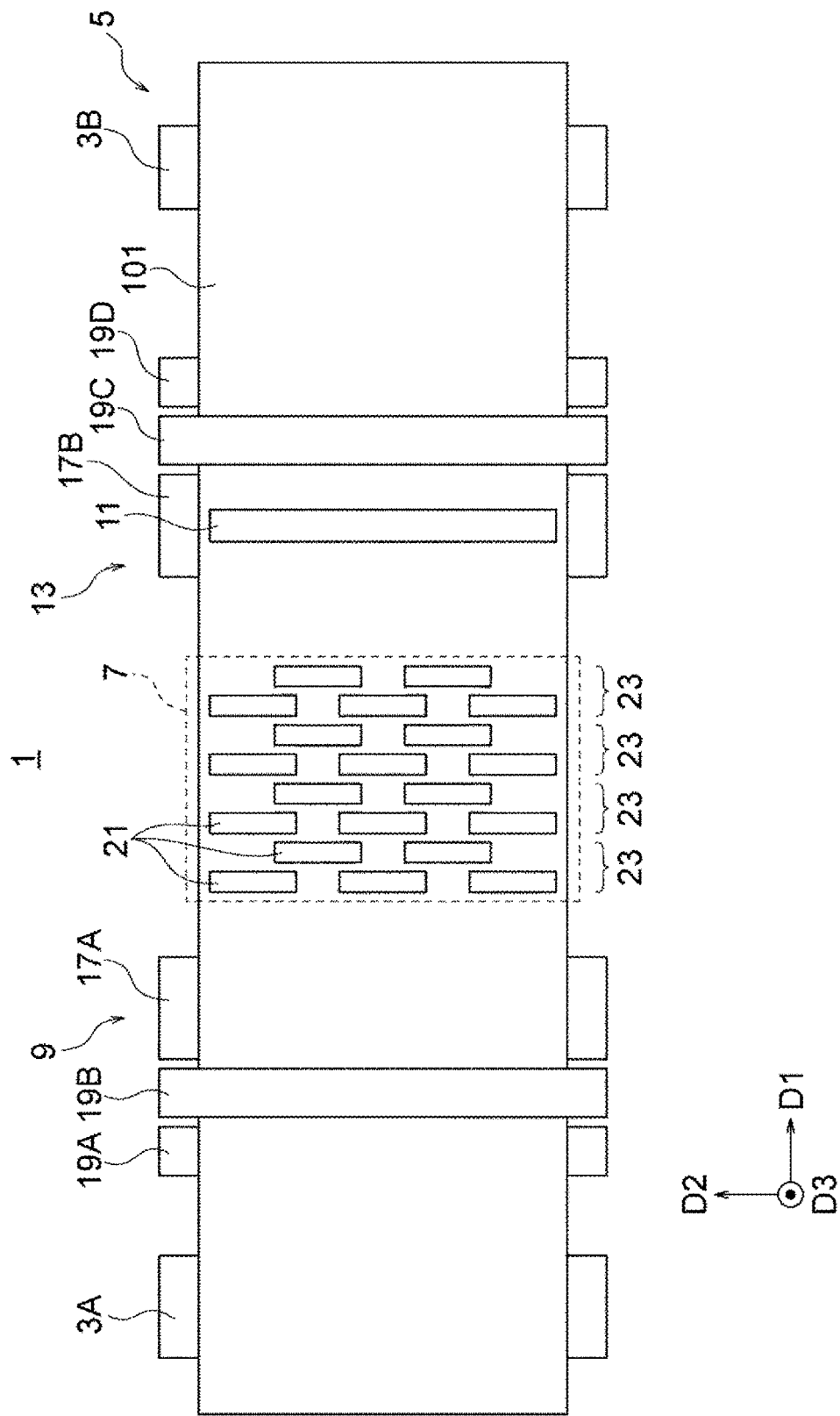

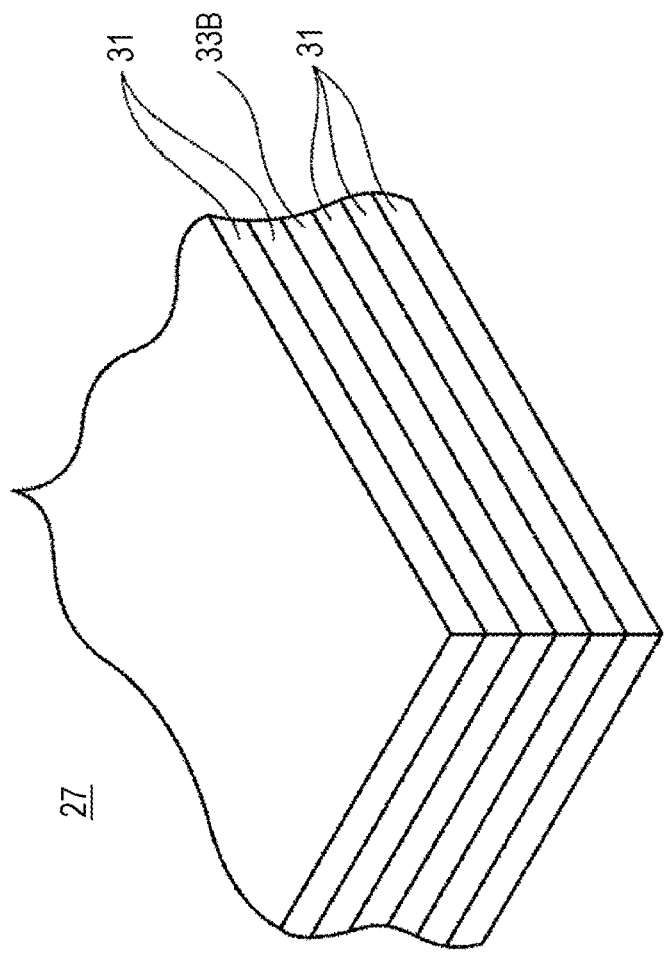

| Kind of monomer | Production Example 1 | Production Example 6 |
|---|---|---|
| Styrene | 65 | 80 |
| Butyl acrylate | 20 | 5 |
| Methacrylic acid | 5 | 10 |
| Methoxypolyethylene glycol methacrylate | 10 | 5 |

FIG. 15

|  |  | Production Example 2 | Production Example 3 | Production Example 4 | Production Example 5 |
|---|---|---|---|---|---|
| Water dispersion | Kind of pigment | Black | Cyan | Magenta | Yellow |
|  |  | P.B.7 | P.B.15:3 | P.R.150 | P.Y.74 |
|  | Solid content (%) | 22.00 | 22.00 | 22.00 | 22.00 |
|  | Ratio of pigment introduced (%) | 68.76 | 68.52 | 68.52 | 68.52 |
| Composition (weight ratio) | Pigment | 15.13 | 15.08 | 15.08 | 15.08 |
|  | Dispersant polymer | 6.48 | 6.46 | 6.46 | 6.46 |
|  | DENACOL EX 321L | 0.39 | 0.46 | 0.46 | 0.46 |
|  | Ion-exchanged water | 78.00 | 78.00 | 78.00 | 78.00 |
|  | Total | 100.00 | 100.00 | 100.00 | 100.00 |
| Physical properties | Viscosity (mPa·s) | 4.8 | 4.2 | 4.6 | 4.5 |
|  | pH | 9.7 | 9.6 | 9.8 | 9.6 |
|  | Average particle size (nm) | 94 | 96 | 144 | 108 |

FIG. 16

|  |  |  | Production Example 7 | Production Example 8 | Production Example 9 | Production Example 10 |
|---|---|---|---|---|---|---|
| Kind of ink |  |  | Black | Cyan | Magenta | Yellow |
| Ink Composition | Water dispersion containing pigment | part(s) by mass | 508.9 | 510.8 | 510.8 | 510.8 |
|  | Water dispersion containing fixing polymer | part(s) by mass | 48.3 | 47.2 | 47.2 | 47.2 |
|  | Propylene glycol | part(s) by mass | 286.0 | 286.0 | 286.0 | 286.0 |
|  | Diethylene glycol monoisobutyl ether | part(s) by mass | 44.0 | 44.0 | 44.0 | 44.0 |
|  | Silicone-based surface-active agent | part(s) by mass | 5.5 | 5.5 | 5.5 | 5.5 |
|  | Ion-exchanged water | part(s) by mass | 207.3 | 207.3 | 207.3 | 207.3 |
| Physical properties | Average particle size | nm | 98.8 | 102.3 | 153.0 | 107.6 |
|  | Viscosity at 32°C | mPa·s | 5.2 | 4.8 | 5 | 5.3 |
|  | Static surface tension | mN/m | 28.9 | 28.4 | 28.9 | 28.3 |
|  | pH | — | 9.1 | 9.2 | 9.3 | 9.1 |

INK, INK SET AND PRINTER

RELATED APPLICATIONS

The present application is a National Phase of International Application Number PCT/JP2021/031120, filed Aug. 25, 2021, and claims priority based on Japanese Patent Application No. 2020-144343, filed Aug. 28, 2020.

TECHNICAL FIELD

The present disclosure relates to an ink, an ink set, and a printing apparatus.

BACKGROUND OF INVENTION

A known ink contains a polymer as well as a medium (e.g., a solvent) and a coloring agent (see, for example, Patent Literature 1). The ink disclosed in Patent Literature 1 contains a pigment dispersing polymer and a fixing aid polymer. The pigment dispersing polymer is added to disperse a pigment, and the fixing aid polymer is added to improve the abrasion resistance of materials for printing.

CITATION LIST

Patent Literature

Patent Literature 1: International Publication No. 2017/138436

SUMMARY

According to an aspect of the present disclosure, an ink contains a medium, a coloring agent, a fixing polymer, and one or more kinds of polymers other than the fixing polymer. The coloring agent is dissolved or dispersed in the medium. The fixing polymer has a glass-transition temperature higher than the ordinary temperature and is dispersed in the medium. The one or more kinds of polymers each have a glass-transition temperature higher than the ordinary temperature and are dissolved or dispersed in the medium. The fixing polymer is higher in glass-transition temperature than 80 mass % or more of the one or more kinds of polymers contained in the ink and each having a glass-transition temperature higher than the ordinary temperature.

According to another aspect of the present disclosure, an ink set includes two kinds of inks each being the ink mentioned above. The inks contain different coloring agents. At least one of the inks contains an ultraviolet-absorbing agent different from the coloring agents. The percentage content of the ultraviolet-absorbing agent in one of the inks is not equal to the percentage content of the ultraviolet-absorbing agent in the other ink.

According to still another aspect of the present disclosure, a printing apparatus includes an ink ejector, a dryer, and a melting device. The ink ejector is configured to eject the ink to an object on which a printed record is to be produced. The dryer is configured to heat the object to expedite evaporation of the medium. The melting device is configured to subject the ink on the object to heat that causes the fixing polymer to melt and to fix the ink to the object accordingly.

BRIEF DESCRIPTION OF THE DRAWINGS

FIG. 2 is a plan view of the printing apparatus in FIG. 1.

FIG. 3D is an enlarged view of a region IIId in FIG. 3C.

FIG. 15 is a table for explanation of a method for producing a disperse system that is to be contained in the ink according to the embodiment.

FIG. 16 is a table for explanation of a method for producing the ink according to the embodiment.

DESCRIPTION OF EMBODIMENTS

Figure 1:
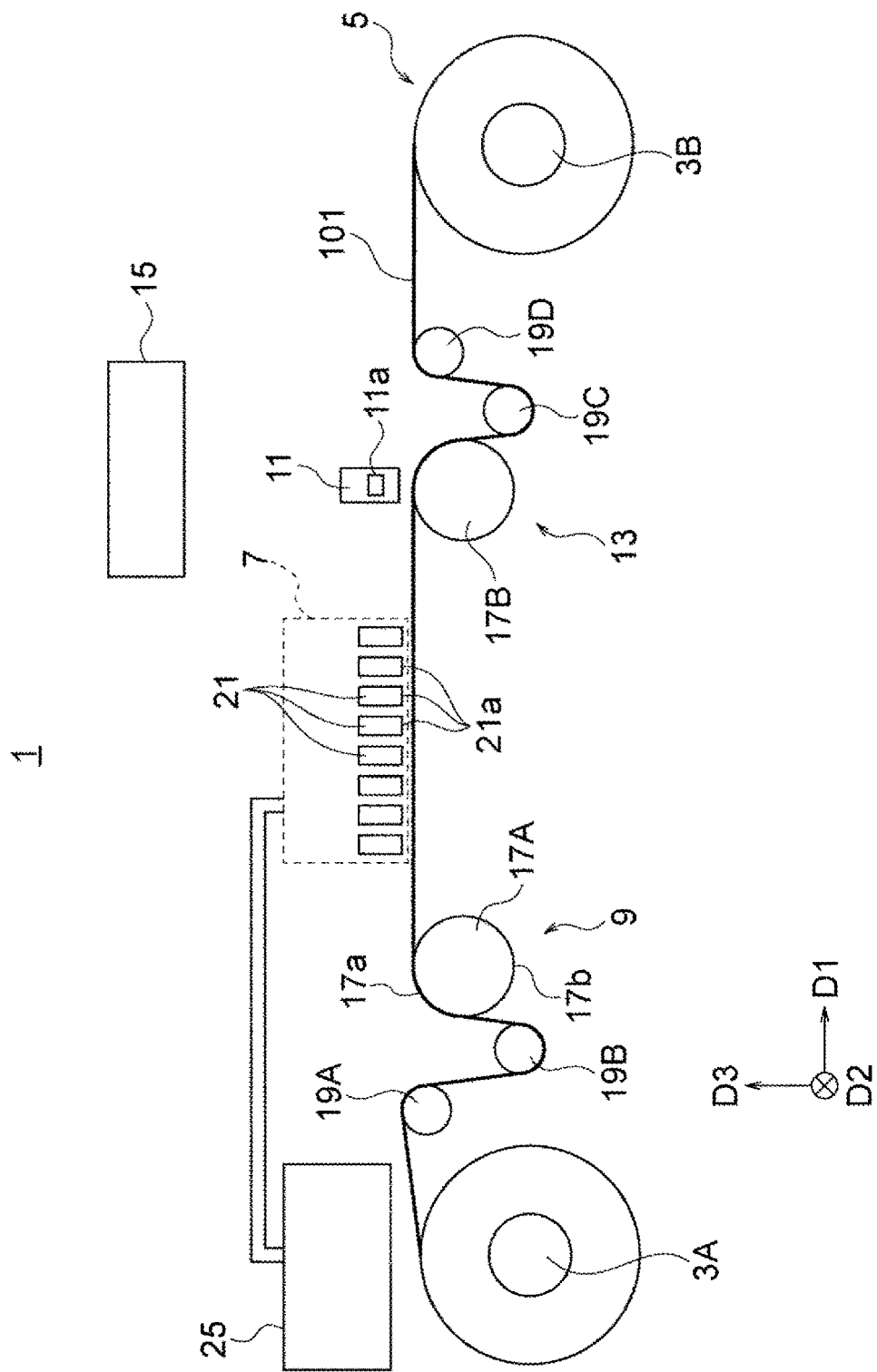
FIG. 1 is a side view of a printing apparatus according to a first embodiment.

Hereinafter, embodiments of the present disclosure will be described with reference to the accompanying drawings. The accompanying drawings are schematic representations. That is, not every detail may be illustrated in the drawings. Constituent elements are not drawn to scale, and the dimension ratios thereof do not fully correspond to the actual dimension ratios. The relative dimensions and the scale ratio may vary from drawing to drawing. For the purpose of emphasizing a particular shape or the like, the outline of the shape may be illustrated in such a manner that a specific dimension looks greater than it really is.

Embodiments that follow a first embodiment will be principally described with a focus on their distinctive features only. Unless otherwise noted, these embodiments may be equated with the previously described embodiment or may be understood by analogy to the previously described embodiment. Each element in an embodiment and the corresponding element in another embodiment may be denoted by the same reference sign, irrespective of possible specific differences therebetween.

The term "medium" may refer to a substance (solvent) used to dissolve another substance or may refer to a substance (dispersion medium) in which particles of another substance (dispersoid) are dispersed. The term "dispersion medium" in a narrow sense generally refers to a medium in which particles (a dispersoid) within a certain size range (e.g., particles measuring 1 nm or more) are dispersed, whereas the term "dispersion medium" in a broad sense refers to both the dispersion medium in a narrow sense and the solvent. The dispersion medium mentioned herein is to be understood in a narrow sense.

As is commonly known, a dispersoid is not limited to particles of a solid and may be particles in liquid form or in gaseous form. Unless otherwise specified, the term "particles" used alone herein refers to not particles contained as a dispersoid but to particles of a solid.

The term "glass" in a narrow sense generally refers to a substance containing silicate as a principal component, whereas the term "glass" in a broad sense refers to an amorphous solid that exhibits a glass transition as the temperature rises. The glass mentioned herein is to be understood in a broad sense. The glass or glass component mentioned herein is not limited to a substance containing silicate as a principal component and may be, for example, a substance containing a polymer as a principal component.

As is commonly known, the glass-transition temperature (glass-transition point) is the temperature at which the glass transition occurs. The glass-transition temperature is hereinafter also referred to as Tg for short. For example, Tg may be measured as specified in the Japanese Industrial Standards (JIS) K7121. Examples of the glass-transition temperatures specified in JIS K7121 include the extrapolated glass-transition onset temperature, the mid-point glass-transition temperature, and the extrapolated glass-transition end temperature. To be more precise, the term "Tg" may be herein understood as the mid-point glass-transition temperature. When the temperature is kept below Tg, the term "Tg" may be understood as the extrapolated glass-transition onset temperature. When the temperature is kept at Tg or higher, the term "Tg" may be understood as the extrapolated glass-transition end temperature.

Herein, "color difference" may be determined using expression specified in "7.1.1 Color difference in the L*a*b* color system" in JIS Z 8730 (withdrawn).

The term "ordinary temperature (room temperature)" may refer to 20° C.±15° C. as specified in JIS Z 8703. To be more precise, the term "ordinary temperature" may refer to 20° C.

First Embodiment (Overall Configuration of Printing Apparatus)

FIG. 1 is a side view of a printing apparatus 1 according to a first embodiment of the present disclosure. FIG. 2 is a plan view of the printing apparatus 1.

For convenience, the printing apparatus is illustrated with a Cartesian coordinate system D1-D2-D3 fixed in the space. With regard to the printing apparatus 1, any direction may be defined as the vertical direction. For convenience, the +D3 side is herein deemed as the upper side in the vertical direction. Unless otherwise specified, the terms "plan view" and "seen-through plan view" herein mean that an object of interest is viewed in the direction of the D3 axis.

The printing apparatus 1 conveys an object on which a printed record is to be produced. The object is conveyed from a feed roller 3A to a take-up roller 3B and is hereinafter referred to as an object 101. Various kinds of rollers, such as the feed roller 3A and the take-up roller 3B, constitute a conveyor 5, which conveys the object 101. The printing apparatus 1 includes various devices arranged along the path on which the object 101 is conveyed. For example, the printing apparatus 1 includes an ink ejector 7 and devices (e.g., devices 9, 11, and 13) that expedite the process of fixing the ink to the object 101. The ink ejector 7 ejects ink droplets to the object 101. The ink ejected by the ink ejector 7 lands on the object 101 and is then treated by the devices. The printing apparatus 1 also includes a controller 15 (see FIG. 1). The controller 15 controls various devices including those mentioned above.

The printing apparatus 1 may additionally include a coater (not illustrated) and a cleaning device. The coater is disposed between the feed roller 3A and the ink ejector 7 and applies a coating agent uniformly to the object 101. The cleaning device cleans heads 21 of the ink ejector 7. The coating agent and the heads 21 will be described later.

(Object on which Printed Record is to be Produced)

For example, the object 101 is in the form of a long sheet. The object 101 is winded up by the feed roller 3A prior to printing. The object 101 is fed by the feed roller 3A and is conveyed along a path below the ink ejector 7. Finally, the object 101 is winded and taken up by the take-up roller 3B. The object 101 may be made of a desired material and may have desired dimensions (e.g., width, length, and thickness). The object 101 may be made of paper, resin, or cloth. The object 101 is a resin film of desired thickness. For example, the object 101 is made of polyethylene terephthalate (PET), and the thickness of the object 101 is not less than 5 µm and not more than 20 µm. Ink is ejected onto one of two opposite surfaces of the object 101. The surface concerned may be hereinafter also referred to as a front surface. The other surface may be hereinafter also referred to as a back surface.

(Ink)

The ink that is yet to be ejected by the ink ejector 7 contains, for example, a medium (a solvent and/or a dispersion medium), a coloring agent, and more than one kind of polymer. It is required that a fixing polymer be contained in the ink. Once the ink lands on the object 101, the medium in the ink evaporates. The fixing polymer melts (may be transformed into a vitreous state) by the addition of heat and then solidifies. The coloring agent is fixed to the object 101 accordingly.

As can be understood from the above description, the ink in the present embodiment is not a UV curable ink. UV curable inks contain a synthetic resin (a UV curable resin) that is chemically transformed from liquid state into solid state by reaction with ultraviolet radiation energy. The UV curable resin can be fixed to the object 101 as the UV curable resin is cured. Such a UV curable resin (polymer) is not virtually contained in the ink in the present embodiment. However, the UV curable resin may be contained in the ink in the present embodiment, in which case the UV curable resin is to be present in an amount that is small enough to differentiate the ink from UV curable inks.

The constituent that is present in the highest mass % in the ink prior to the ejection of ink is herein referred to as the medium. The content of the medium in the ink may be set to a desired value. The content of the medium may be less than 50 mass % or may be not less than 50 mass %. For example, the content of the medium is not less than 50 mass % and not more than 90 mass %. The medium may be water or an aqueous solvent or may be an organic substance, such as an organic solvent. Alternatively, the medium may be a mixture of the former and the latter. An example in which the medium contains water and an organic solvent will be described in the present embodiment. In a case where the medium contains water, the content of water in the ink may be less than 50 mass % or may be not less than 50 mass %. For example, the content of water is not less than 50 mass % and not more than 70 mass %.

Unless otherwise specified, the term "mass %" used herein in relation to constituents of the ink in finished form refers to the content of the constituents of the ink prior to the ejection of the ink (i.e., prior to the evaporation of the medium and the like).

For example, water and an organic solvent with desired constituents and properties may be mixed to constitute the medium. The organic solvent may contain alcohol, such as glycerol or glycol and/or may contain ether, such as glycol ether. Alcohol may serve as a humectant that helps keep the ink from drying out prior to ejection. Ether aids in adjusting the surface tension, viscosity, and/or drying speed of the ink. The ratio of the mass of water to the mass of the organic solvent may be set to a desired value, where either may be higher than the other. For example, the mass % of water may be higher than the mass % of the organic solvent. More specifically, the content of water in the medium may be not less than 60 mass % and not more than 70 mass %.

The coloring agent may be a pigment that is insoluble in the medium, or the coloring agent may be a dye that is soluble in the medium (solvent). Alternatively, the coloring agent may be a combination of both. The pigment and dye may be analogous to any of various commonly known pigments and dyes or any of materials fabricated on the basis of various commonly known pigments and/or dyes. For example, a pigment (self-dispersing pigment) with a coat that inhibits coagulation is used. Alternatively, an uncoated pigment may be used. The mass % of the coloring agent in the ink (prior to ejection) may be set to a desired value. For example, the content of the coloring agent is not less than 1 mass % and not more than 10 mass %.

The ink contains two or more kinds of polymers whose glass-transition temperatures (Tg) are higher than the ordinary temperature. The fixing polymer is one of the two or more kinds of polymers. At least one polymer whose Tg is lower than the ordinary temperature may be optionally contained in the ink.

(Fixing Polymer)

As mentioned above, the fixing polymer melts by the addition of heat. In other words, the fixing polymer contained in the ink is in the form of particles (in solid state) before the application of heat (e.g., before the ejection of the ink). Thus, the fixing polymer is insoluble in the medium (e.g., in water) and is dispersed in the medium. The glass-transition temperature (Tg) of the fixing polymer is higher than the temperature of the ink before the application of heat. For example, the glass-transition temperature (Tg) of the fixing polymer is higher than the ordinary temperature and/or is higher than the temperature of the ink that is yet to be ejected. The fixing polymer in the ink subjected to heat remains in solid state such that the coloring agent can be fixed. The fixing polymer may have properties other than the property of fixing the coloring agent.

The fixing polymer may be higher in Tg than the other polymers contained in the ink. For example, the fixing polymer may be higher in Tg than most (or the entirety) of the other polymers contained in the ink and each having a Tg higher than the ordinary temperature. The content of most or the entirety of the polymers may be not less than 80 mass %, not less than 90 mass %, or not less than 95 mass %. For example, the content of the other polymers in the ink is 100 mass %, in which case the fixing polymer is higher in Tg than the entirety of the other polymers. Most (or the entirety) of the other polymers may refer to only one kind of polymer or may refer to two or more kinds of polymers.

The Tg of the fixing polymer may be set to a desired value. For example, the Tg of the fixing polymer is not less than 70° C. and is not more than 120° C. (or not more than 110° C.). The difference between the Tg of the fixing polymer and the Tg of the most (or the entirety) of the other polymers is equal to or more than 40° C. and equal to or less than 60° C.

Given that the fixing polymer is higher in Tg than 80 mass % or more of the other polymers each having a Tg higher than the ordinary temperature, the difference between the Tg of the fixing polymer and the Tg of 80 mass % or more of the entirety of the other polymers concerned may be equal to or more than 40° C. and equal to or less than 60° C. With regard to the expression "80 mass % or more" in the sentence above, it is not required that the former and the latter be equal in value. Given that the fixing polymer is higher in Tg than 90 mass % or more of the other polymers each having a Tg higher than the ordinary temperature, the difference between the Tg of the fixing polymer and the Tg of only part of 90 mass % or more of the other polymers concerned may be equal to or more than 40° C. and equal to or less than 60° C. For example, the difference between the Tg of the fixing polymer and the Tg of only 80 mass % of the other polymers concerned may be equal to or more than 40° C. and equal to or less than 60° C. The same holds true for cases in which additional requirements are imposed with regard to the polymers concerned, where the content of the polymers concerned is not less than 80 mass % (or any other value).

The mass % of the fixing polymer in the ink may be set to a desired value. For example, the mass % of the fixing polymer in the ink may be less or more than or equal to the mass % of any kind of polymers contained in the ink, the total of the mass % of the other polymers contained in the ink and each having a Tg higher than the ordinary temperature, or the total of the mass % of the polymers other than the fixing polymer in the ink. When the total of the mass % of the entirety of the other polymers contained in the ink and each having a Tg higher than the ordinary temperature is used as a reference point, the mass % of the fixing polymer may be not less than 0.1 times the total of the mass %, not less than 0.3 times the total of the mass %, or not less than 0.5 times the total of the mass %. For example, the content of the fixing polymer is not less than 1 mass % and not more than 40 mass %.

A polymer with a desired composition and/or desired constituents may be used as the fixing polymer. For example, the fixing polymer may be a condensation polymer (e.g., a polyurethane polymer or a polyester polymer), an acrylic polymer, a styrene polymer, a styrene-acrylic polymer, a butadiene polymer, a styrene-butadiene polymer, a vinyl chloride polymer, or a methacrylic acid polymer. Some of these polymers may be regarded as vinyl polymers. The Tg of such a polymer may fall within the aforementioned range; that is, the Tg of such a polymer may be not less than 70° C. and not more than 120° C.

The fixing polymer may be obtained by combining two or more kinds of monomers contained as principal components of these various kinds of polymers. For example, the monomer contained as the principal component of the styrene polymer is styrene. In other words, the fixing polymer may be obtained by combining monomers from which polymers having different Tgs are obtainable. When the fixing polymer has a higher percentage content of a monomer from which a polymer higher in Tg than the other polymers is obtainable, the Tg of the fixing polymer is relatively high. When the fixing polymer has a higher percentage content of a monomer from which a polymer lower in Tg than the other polymers is obtainable, the Tg of the fixing polymer is relatively low. That is, the Tg of the fixing polymer may be adjusted as desired.

(Other Polymer(s))

The ink may contain, in addition to the fixing polymer, one or more polymers with desired physical properties and desired functions. For example, the one or more polymers are soluble in the medium (solvent) (e.g., water-soluble polymers) or insoluble in the medium (solvent) (e.g., water-insoluble polymers), irrespective of whether the Tg is higher than the ordinary temperature. The one or more polymers before the application of heat (e.g., before the ejection of the ink) may be in a liquid state or in a solid state. A dispersant polymer for dispersing particles of a pigment (i.e., for inhibiting coagulation of the pigment) or an abrasion resistant polymer for making the ink highly resistant to abrasion may be contained in the ink.

The mass % of one or more polymers other than the fixing polymer in the ink may be set to a desired value. The relationship between the mass % of the fixing polymer and the mass % of the one or more polymers is as described above. For example, the content of the entirety of the polymers other than the fixing polymer or the content of the other polymers contained in the ink and each having a Tg higher than the ordinary temperature is not less than 1 mass % and not more than 40 mass %.

As mentioned above, the Tg of at least one of the other polymers is higher than the ordinary temperature and is lower than the Tg of the fixing polymer. For example, the Tg of the dispersant polymer and/or the abrasion resistant polymer may be higher than the ordinary temperature and may be lower than the Tg of the fixing polymer. The proportion of the dispersant polymer or the abrasion resistant polymer to the other polymers each having a Tg higher than the ordinary temperature may be not less than 80 mass %, not less than 90 mass %, or not less than 95 mass %, may be 100 mass %, or may be less than any of the values. Although the Tg of the at least one of the other polymers is higher than the ordinary temperature and lower than the Tg of the fixing polymer, the Tg of the polymer concerned is not limited to particular values. For example, the Tg of the polymer concerned is equal to or higher than 50° C. and is lower than 70° C.

In addition to the fixing polymer, polymers with desired composition and/or desired ingredients may be contained in the ink. The composition and/or ingredients of the polymer (s) (e.g., the dispersant polymer and/or the abrasion resistant polymer) other than the fixing polymer may be any of those mentioned above as examples of the composition and/or ingredients of the fixing polymer. For example, the polymer concerned may be a styrene polymer. The relative mass proportions of monomers contained in the polymer in the production process are not equal to the relative mass proportions of monomers contained in the fixing polymer in the production process. The Tg of fixing polymer is adjustable by the mass % of each of the monomers contained in the fixing polymer. The same holds for the polymer(s) other than the fixing polymer.

The dispersant polymer may be structurally analogous to commonly known polymers. For example, the dispersant polymer is a ribbon-like polymer. In some embodiments, however, the dispersant polymer is in the form of particles. The dispersant polymer may include a portion that adsorbs on a pigment and a portion that exhibits its dispersibility. The dispersibility is exhibited due to, for example, steric hindrance, electrostatic repulsion, and/or obstruction of electrical continuity. The dispersant polymer may be added to an ink containing a self-dispersing pigment although such a dispersant polymer is a non-essential constituent of the ink containing a self-dispersing pigment. The dispersant polymer may be a mixture of styrene and butyl acrylate in a 70:30 ratio. The Tg of such a dispersant polymer may fall within the aforementioned range; that is, the Tg of such a dispersant polymer is equal to or higher than 50° C. and is lower than 70° C.

The abrasion resistant polymer may be structurally analogous to commonly known polymers. For example, the abrasion resistant polymer may be a polyester resin. The Tg of such an abrasion resistant polymer may fall within the aforementioned range; that is, the Tg of such an abrasion resistant polymer is equal to or higher than 50° C. and is lower than 70° C.

The ink may contain desired components other than the polymers mentioned above. For example, the ink may contain a surface-active agent (not including the dispersant polymer), a humectant, a surface-tension modifier, a PH adjuster, and/or a glazing agent. These additives may be polymer-based products or may be constituents of the medium (organic solvent).

(Conveyor)

The conveyor 5 includes rollers arranged along the path on which the object 101 is conveyed. For example, the conveyor 5 includes rollers that are denoted by 3A, 3B, 17A, 17B, and 19A to 19D, respectively. The rollers are each in the form of a hollow cylinder or a solid cylinder, with its axis being orthogonal to the direction of conveyance of the object 101. The front surface or the back surface of the object 101 comes into contact with external circumferential surfaces of the rollers in such a manner that the entire width of the object 101 is within the length of each roller. Together with or without at least one of the rollers, the take-up roller 3B is rotated about the axis by a motor such that the object 101 is conveyed. The rollers in the present embodiment are rotated by the motor. In some embodiments, however, the rollers are rotated by another driving source or by manpower.

Any desired number of rollers may be placed in any desired arrangement with respect to the conveyance path, and each roller may have any desired diameter. The conveyor 5 in the illustrated example includes, in addition to the feed roller 3A and the take-up roller 3B, a first tension roller 19A, a second tension roller 19B, a first heat roller 17A, a second heat roller 17B, a third tension roller 19C, and a fourth tension roller 19D, which are arranged in sequence from the position of the feed roller 3A to the position of the take-up roller 3B. The rollers except for the take-up roller 3B may be driven and rotated by a motor or the like or may simply turn passively due to friction produced by the object 101.

The first heat roller 17A and the second heat roller 17B each have the function of heating the object 101 and are thus also regarded as devices that expedite the process of fixing the ink to the object 101. The devices will be described in detail later. The first to fourth tension rollers denoted by 19A to 19D are involved in application of tension to the object 101. The first to fourth tension rollers denoted by 19A to 19D in the illustrated example bring the object 101 in close contact with the first heat roller 17A and the second heat roller 17B, thus contributing to increased efficiency of heat application.

More specifically, the first heat roller 17A is disposed upstream of the ink ejector 7 and is in contact with the back surface of the object 101. The second tension roller 19B is disposed upstream of the first heat roller 17A with no other rollers therebetween and is in contact with the front surface of the object 101, that is, the surface opposite to the surface with which the first heat roller 17A is in contact. The first tension roller 19A is disposed upstream of the second tension roller 19B with no other rollers therebetween and is in contact with the back surface of the object 101, that is, the surface opposite to the surface with which the second tension roller 19B is in contact. The first tension roller 19A and/or the second tension roller 19B is subjected to a force exerted by a biasing member (not illustrated), such as a spring and/or an actuator, and is thus pushed against the object 101. The object 101 is held under tension accordingly. The object 101 is in close contact with the first heat roller 17A.

The second heat roller 17B is disposed downstream of the ink ejector 7 and is in contact with the back surface of the object 101. The third tension roller 19C is disposed downstream of the second heat roller 17B with no other rollers therebetween and is in contact with the front surface of the object 101, that is, the surface opposite to the surface with which the second heat roller 17B is in contact. The fourth tension roller 19D is disposed downstream of the third tension roller 19C with no other rollers therebetween and is in contact with the back surface of the object 101, that is, the surface opposite to the surface with which the third tension roller 19C is in contact. The third tension roller 19C and/or the fourth tension roller 19D is subjected to a force exerted by a biasing member (not illustrated), such as a spring and/or an actuator, and is thus pushed against the object 101. The object 101 is held under tension accordingly. The object 101 is in close contact with the second heat roller 17B.

The first heat roller 17A and/or the second heat roller 17B may have a relatively large diameter. This results in the increased area of close contact between the object 101 and the heat roller concerned and, by extension, the increased efficiency of heat application. For example, the first heat roller 17A is larger in diameter than the first tension roller 19A and/or the second tension roller 19B. Likewise, the second heat roller 17B is larger in diameter than the third tension roller 19C and/or the fourth tension roller 19D. The first heat roller 17A and/or the second heat roller 17B may be larger in diameter than any other rollers of the conveyor 5.

When the object 101 is viewed laterally, a line being a linear edge of the object 101 and extending between the second tension roller 19B and the first heat roller 17A may form an angle with a line being a linear edge of the object 101 and extending between the first heat roller 17A and the next downstream roller (e.g., the second heat roller 17B in FIG. 1). The angle of inclination may be relatively large. Thus, the region in which the object 101 is in close contact with the first heat roller 17A extends over an increased angular range about the axis of the first heat roller 17A. For example, the angle of inclination is not less than 45°, not less than 70°, or not less than 90°. The aforementioned relation holds for a line being a linear edge of the object 101 and extending between the third tension roller 19C and the second heat roller 17B and a line being a linear edge of the object 101 and extending between the second heat roller 17B and the next upstream roller (e.g., the first heat roller 17A in FIG. 1).

The rollers and the like may be placed in varying arrangements. For instance, the first heat roller 17A, the first tension roller 19A, and the second tension roller 19B in the illustrated example may be installed in reverse orientation with respect to the surfaces of the object 101 with which the respective rollers are in contact. It is not required that the second tension roller 19B be installed in combination with the first tension roller 19A; that is, the first tension roller 19A is optional. It is not required that the third tension roller 19C be installed in combination with the fourth tension roller 19D; that is, the fourth tension roller 19D is optional. In some embodiments, the first to fourth tension rollers denoted by 19A to 19D may be eliminated. Rollers other than those illustrated in the accompanying drawings may be provided. For example, the first heat roller 17A and the second heat roller 17B may be arranged with other rollers disposed therebetween. When viewed laterally, the rollers are arranged along a curve protruding upward and are in contact with the back surface of the object 101.

The way in which the object 101 is moved may be adjusted as appropriate in accordance with, for example, the workings of the ink ejector 7. The conveyor 5 may move the object 101 continuously or intermittently. More specifically, the object 101 may be moved continuously with the conveyance speed kept constant or varied. The intermittent movement may also be regarded as movement with variable speed. The speed of conveyance of the object 101 may be set to a desired value. For example, the conveyance speed (e.g., the average speed of a variable speed conveyor) is not less than 50 m/min and not more than 300 m/min or is not less than 100 m/min and not more than 200 m/min (Ink Ejector)

The ink ejector 7 includes at least one head. In the illustrated example, the ink ejector 7 includes twenty heads, which are denoted by 21. The heads 21 are oriented toward the object 101 and are directly engaged in ejection of ink.

The position of the ink ejector 7 may be herein considered synonymous with the position of the heads 21, the position of an ejection surface 21a, or the location of the region occupied by nozzles 21b. The ejection surface 21a and the nozzles 21b will be described later. In other words, the term "ink ejector 7" used in relation to the position of the ink ejector 7 may be replaced with "heads 21", "ejection surface 21a", or "region occupied by the nozzles 21b" where appropriate.

The heads 21 in the present embodiment are essentially fixed in a direction forming an angle with the direction of conveyance of the object 101; that is, the printing apparatus 1 is a line printer. In some embodiments, the printing apparatus is a serial printer, which ejects liquid droplets and conveys the object 101 in an alternating manner. The liquid droplets are ejected from the heads 21 moving in a direction forming an angle with the direction of conveyance of the object 101 (e.g., a direction substantially perpendicular to the direction of conveyance of the object 101).

Each head 21 is held by a member (not illustrated) in such a manner that the ejection surface 21a facing the object 101 is substantially parallel to the object 101. The ejection surface 21a is a surface from which ink is ejected. In the illustrated example, the ejection surface 21a is a lower surface. The distance between the ejection surface 21a and the object 101 may be set to a desired value. For example, the distance is not less than 0.5 mm and not more than 20 mm or is not less than 0.5 mm and not more than 2 mm. When viewed in plan, the head 21 (the ejection surface 21a) may have a desired planar shape, such as a strip-like shape (or, more specifically, a substantially rectangular shape) whose long sides form an angle with the direction of conveyance of the object 101. Examples of the direction forming an angle with the direction of conveyance include a direction substantially perpendicular to the direction of conveyance. The direction concerned may hereinafter also be referred to as a width direction of the object 101.

The heads 21 constitute at least one head group. Referring to FIG. 2, four head groups are provided. The head groups are denoted by 23. The head groups 23 each include more than one head 21. In the illustrated example, the head groups 23 each include five heads 21. The heads 21 included in each head group 23 are arranged in such a manner that their respective printable ranges lie with no gap therebetween in the width direction of the object 101 or in such a manner that peripheral portions of the printable ranges overlap each other. This arrangement enables printing with no blank spaces in the width direction of the object 101.

More specifically, three of the five heads 21 in each head group 23 in the illustrated example are aligned in the width direction of the object 101. The other two of the five heads 21 are aligned in the width direction of the object 101 in a manner so as not to be in alignment with the three heads 21 in the direction of conveyance and are each located between adjacent ones of the three heads 21 in the width direction of the object 101. In other words, the heads 21 in each head group 23 are arranged in a staggered pattern.

The four head groups 23 are arranged in the direction of conveyance of the object 101. The heads 21 receive a supply of ink from an ink tank 25 (see FIG. 1). The heads 21 belonging to the same head group 23 receive a supply of ink of the same color. The four head groups 23 enable printing with inks of four different colors. For example, the head groups 23 eject magenta (M) ink, yellow (y) ink, cyan (C) ink, and black (K) ink, respectively. These color inks are ejected to the object 101, on which a color image is printed accordingly.

The printing apparatus 1 may include one head 21, in which case an image within the printable range of the head 21 is to be printed in monochrome. The number of heads 21 in each head group 23 and the number of head groups 23 may be changed as appropriate, depending on what the object 101 is like and/or depending on printing conditions. For example, a greater number of head groups 23 enable printing with more colors. Two or more head groups 23 arranged to eject ink of the same color in alternating manner in the direction of conveyance yield an increase in conveyance speed, with no performance variation between the heads 21. The print area per unit time is increased accordingly. Two or more head groups 23 arranged in a manner so as not to be in positional agreement in a direction forming an angle with the direction of conveyance to eject ink of the same color yield an increase in resolution in the width direction of the object 101.

Instead of color inks, a coating agent in liquid form may be ejected uniformly or in specific patterns by the heads 21 to surface treat the object 101. The object 101 may be a low-permeability material, in which case the coating agent is to form a liquid receiving layer such that ink can be readily fixed to the object 101. Alternatively, such a coating agent is to form a liquid permeation barrier layer such that a liquid is prevented from spreading too much on the high-permeability material (the object 101) or from mixing too much with another liquid ejected onto an adjacent spot on the high-permeability material (the object 101). The coating agent may be applied by using the aforementioned coater (not illustrated) only or both the coater and the heads 21.

The heads 21 may be accommodated in a head chamber (not illustrated). The head chamber is essentially a space isolated from the outside. The head chamber has an opening through which the object 101 conveyed by the conveyor 5 enters the head chamber. The head chamber also has an opening through which the object 101 conveyed by the conveyor 5 exits the head chamber. The heads 21 apply ink to the object 101 in the head chamber. The head chamber provides greater ease of reducing the range of variation of factors affecting the fixation of ink than would be possible on the outside of the head chamber. Examples of the factors include temperature, humidity, and atmospheric pressure. At least one of the various factors in the head chamber may be controlled actively by a desired means.

Ink droplets may be ejected from the heads 21 in a desired manner. For example, the heads 21 may each be a piezo head from which ink is ejected in the form of droplets through the application of pressure by a piezoelectric actuator. Alternatively, the heads 21 may each be a thermal head from which ink is ejected in the form of droplets through the application of pressure arising from bubbles developed by the addition of heat to ink.

(Devices that Expedite Process of Fixing Ink to Object on which Printed Record is to be Produced)

As mentioned above, the printing apparatus 1 includes the devices that expedite the process of fixing the ink to the object 101. The ink ejected by the ink ejector 7 lands on the object 101 and is then treated by the devices. Examples of the devices include a dryer 9, a melting device, 11, and an auxiliary melting device 13, which are generally lumped together as devices that expedite the fixation of the ink by the addition of heat to the ink. The devices are in different specific forms, are configured to add different amounts of heat, and/or are placed in different positions. The devices act differently upon the ink and/or exert influence on their respective actions.

(Dryer)

The dryer 9 expedites the evaporation of the medium in the ink by, for example, heating the object 101. The dryer 9 heats the object 101 before and/or after the ink lands on the object 101. The back surface of the object 101 may be heated; that is, the ink on the object 101 may be heated indirectly. Alternatively, the front surface of the object 101 may be heated; that is, together with the object 101, the ink on the object 101 may be heated directly. Still alternatively, both the back surface and the front surface of the object 101 may be heated.

When viewed from another perspective, the dryer 9 may include a portion disposed upstream of the ink ejector 7 in the direction of conveyance of the object 101, a portion in positional agreement with the ink ejector 7 in the direction of conveyance, a portion disposed downstream of the ink ejector 7 in the direction of conveyance, or at least two of the portions constructed as one piece or discretely located away from each other. The dryer 9 may also include a portion facing the front surface of the object 101 and/or a portion facing the back surface of the object 101. The dryer 9 may include a portion that is not in positional agreement with the ink ejector 7 and that is disposed upstream of the ink ejector 7. This reduces the possibility that the stable ejection of ink during heating of the object 101 and the ink will be adversely affected by a turbulent flow in a space that is in positional agreement with the ink ejector 7.

The position of the dryer 9 may be herein considered synonymous with the position of a portion directly involved in the heating of the object 101 (e.g., the external circumferential surface of the heat roller of the dryer 9 or a warm air vent of the dryer 9) or with the location of a region being part of the object 101 and being heated by the dryer 9 (e.g., a region in contact with the roller or a region at which a jet of warm air is directed). In other words, the term "dryer 9" used in relation to the position of the dryer 9 may be replaced with "portion directly involved in the heating" or "region being part of the object 101 and being heated" where appropriate.

For example, the dryer 9 heats the object 101 substantially uniformly in the width direction of the object 101; that is, the amount of heat applied to the object 101 by the dryer 9 is uniform in the width direction of the object 101. Thus, the temperature distribution of the object 101 is substantially uniform in the width direction. In some embodiments, however, the amount of heat applied to the object 101 by the dryer 9 is varied in the width direction of the object 101. For example, a greater amount of heat may be applied to each side in the width direction where heat can dissipate well. The region that can be heated by the dryer 9 at a time may have a desired length in the direction of conveyance of the object 101.

The dryer 9 may be variously designed. The dryer 9 in the present embodiment includes the first heat roller 17A. As mentioned above, the first heat roller 17A is disposed upstream of the ink ejector 7 and is in contact with the back surface of the object 101.

More specifically, the external circumferential surface of the first heat roller 17A extends around the axis of the first heat roller 17A and is partially in contact with the object 101. The first heat roller 17A in an example does not essentially slide over the object 101 and turns actively or passively as the object 101 moves. The first heat roller 17A is thus deemed to include a first portion 17a and a second portion 17b, which are located around the axis of the first heat roller 17A to heat the object 101. The first portion 17a and the second portion 17b are deemed to come into contact with the object 101 in an alternating manner.

The first heat roller 17A may be in a form that is analogous to any of various commonly known rollers or that is designed on the basis of various commonly known rollers. The first heat roller 17A in an example includes a heating wire therein. When a current flows through the heating wire (not illustrated), the first heat roller 17A generates heat by Joule's law. The first heat roller 17A in another example includes an induction coil therein and generates heat by induction heating. The first heat roller 17A in still another example includes a channel through which a heating medium subjected to heat is supplied from the outside. The first heat roller 17A includes a base that is in the form of a hollow cylinder or a solid cylinder. The base may be made of a ceramic material, metal, and/or any other desired material.

(Melting Device)

For example, the melting device 11 irradiates ink on the object 101 with UV rays to heat the ink. As mentioned above, the fixing polymer (glass component) in the ink subjected to heat melts and then solidifies such that the coloring agent in the ink is fixed to the object 101. A region being part of the object 101 and not being covered with the ink may also be irradiated with UV rays. Some of the UV rays may pass through the ink to radiate into the object 101. The object 101 may be made of a material through which UV rays can essentially pass. Alternatively, the object 101 may be made of a material in which heat is produced by absorption of at least some of the UV rays.

In view of the fact that the melting device 11 is designed to irradiate ink with UV rays, the melting device 11 is disposed downstream of the ink ejector 7 in the direction of conveyance of the object 101, and the melting device 11 is located on the front surface side of the object 101 and faces the front surface. The relative positions of (the distance between) the ink ejector 7 and the melting device 11 in the direction of conveyance of the object 101 may be set to a desired value. For example, the ink ejector 7 and the melting device 11 may be disposed with a space therebetween or may be adjacent to each other with (almost) no space therebetween.

The position of the melting device 11 may be herein considered synonymous with the place where UV rays exit the melting device 11 (i.e., the position of the foremost part of the optical system) or the location of the region that is part of the object 101 and that is to be irradiated with UV rays. In other words, the term "melting device 11" used in relation to the position of the melting device 11 may be replaced with "place where UV rays exit the melting device 11" or "region that is part of the object 101 and that is to be irradiated with UV rays".

The object 101 in an example may be irradiated with UV rays emitted by the melting device 11 after being fully heated by the dryer 9. When viewed from another perspective, the fixing polymer in the ink may start melting while the medium in the ink is evaporating or after the medium in the ink has completely evaporated. Practically speaking, a very small amount of medium may be left in the ink at the completion of evaporation. For example, the medium may be regarded as having completely evaporated when the amount of medium left in the ink immediately before the UV irradiation is equivalent to not more than 5 mass % of the ink that is on the verge of being ejected.

The melting device 11 may also be deemed to be disposed downstream of the dryer 9 in the direction of conveyance of the object 101. The relative positions of (the distance between) the dryer 9 and the melting device 11 in the direction of conveyance of the object 101 may be set to a desired value. For example, the dryer 9 and the melting device 11 may be disposed with a space therebetween or may be adjacent to each other with no space therebetween.

For example, a region extending over the entire width of the printable range of the ink ejector 7 can be irradiated with UV rays emitted by the melting device 11. The melting device 11 extends over the entire width of the object 101 or over the entire width of the printable range such that the region within the width is irradiated with UV rays all at once. In another example (not illustrated), the melting device 11 may be movable in the width direction of the object 101 such that the region extending over the entire width of the printable range can be irradiated with UV rays emitted by the melting device 11.

For example, the melting device 11 irradiates the object 101 with UV rays substantially uniformly in the width direction of the object 101. That is, the amount of energy of UV rays emitted per unit time to the object 101 (and the ink) is substantially uniform in the width direction of the object 101. The amount of UV rays that can be absorbed by the object 101 (and the ink) is dependent on the ink distribution in the width direction. Thus, the amount of heat generated by UV irradiation is not necessarily uniform in the width direction. In some embodiments, however, the amount of UV rays emitted by the melting device 11 is varied in the width direction of the object 101.

The region being part of the object 101 and irradiated with UV rays is rectangular and is defined by sides extending in the direction of conveyance of the object 101 and by sides extending in the width direction of the object 101. It is not required that the region irradiated with UV rays be rectangular. As mentioned above, the region that is to be irradiated with UV rays is not smaller in dimension than the entire width of the printable range of the ink ejector 7 in the width direction of the object 101. The region that is to be irradiated with UV rays may have a desired length in the direction of conveyance of the object 101.

The melting device 11 may be in any desired form. For example, the melting device 11 includes a light source 11a, which generates UV rays. The melting device 11 may include, in addition to the light source 11a, a reflector, a diaphragm, and/or a condenser. The reflector reflects UV rays emitted by the light source 11a and escaping to the side opposite to the object 101. The diaphragm has an aperture that is used to adjust the cross-sectional shape of UV rays. The condenser is a lens that brings UV rays into focus. Regardless of whether these elements are included in the melting device 11, only the light source 11a may be regarded as the melting device 11. The light source 11a may include a light emitting diode (LED), an incandescent lamp, a fluorescent lamp, a mercury lamp, or any other desired illuminant. The light source 11a may include one or more illuminants. For example, the light source 11a may be a surface light source made up of multiple illuminants (e.g., LEDs).

As is commonly known, the wavelength of UV radiation is shorter than the wavelength of visible radiation and is, for example, not less than 10 nm and not more than 400 nm. The UV rays emitted by the melting device 11 may be near-ultraviolet radiation or far-ultraviolet radiation. The near-ultraviolet radiation may be UV-A, UV-B, or UV-C. That is, UV rays of desired wavelength may be emitted by the melting device 11. The energy distribution of UV rays emitted by the melting device 11 is in a narrow range of wavelengths. Thus, the UV radiation is similar in this respect to laser light. In some embodiments, the energy distribution of UV radiation emitted by the melting device 11 is in a broad range of wavelengths. The wavelength may be herein considered synonymous with the wavelength at which the energy is at its (highest) peak.

The melting device 11 may emit UV rays of desired intensity to the object 101 (and the ink). The intensity of the UV rays herein means the amount of energy of UV rays emitted per unit time per unit area to the object 101. The UV rays concerned may be more intense than UV rays emitted to an object to cure a UV curable ink on the object. For example, the intensity of the UV rays emitted to cure a UV curable ink is generally less than 10 W/cm$^2$, whereas the intensity of the UV rays emitted by the melting device 11 may be not less than 10 W/cm$^2$, not less than 20 W/cm$^2$, or not less than 30 W/cm$^2$. In some embodiments, however, the UV rays emitted by the melting device 11 is less intense than the UV rays emitted to cure a UV curable ink.

The melting device 11 may emit a desired total quantity of UV rays to the object 101 (and the ink). The total quantity of radiation is determined by integrating the intensity with time. The total quantity of the UV radiation concerned may be greater than the total quantity of UV rays emitted to an object to cure a UV curable ink on the object. For example, the total quantity of UV rays emitted to an object to cure a UV curable ink is generally less than 500 mJ/cm$^2$, whereas the total quantity of UV rays emitted to the object 101 by the melting device 11 may be not less than 500 mJ/cm$^2$, not less than 1000 mJ/cm$^2$, not less than 1500 mJ/cm$^2$, not less than 5000 mJ/cm$^2$, or not less than 10000 mJ/cm$^2$. In some embodiments, however, the total quantity of UV rays emitted to the object 101 by the melting device 11 is less than the total quantity of UV rays emitted to an object to cure a UV curable ink on the object.

(Auxiliary Melting Device)

The auxiliary melting device 13 is located opposite the melting device 11 with the object 101 placed therebetween. The auxiliary melting device 13 heats the back surface of the object 101 to aid in the melting of the fixing polymer. In view of the fact that the auxiliary melting device 13 aids in the melting of the fixing polymer, the position of the auxiliary melting device 13 in the direction of conveyance of the object 101 may be understood as analogous to the position of the melting device 11 in the direction concerned. For example, the auxiliary melting device 13 may be disposed downstream of the ink ejector 7 and the dryer 9.

The supplemental information provided above in relation to the position of the dryer 9 holds for the position of the auxiliary melting device 13; that is, the position of the auxiliary melting device 13 may be herein considered synonymous with the position of a portion directly involved in the heating of the object 101 or with the location of a region being part of the object 101 and being heated by the auxiliary melting device 13. In other words, the term "auxiliary melting device 13" used in relation to the position of the auxiliary melting device 13 may be replaced with "portion directly involved in the heating" or "region being part of the object 101 and being heated" where appropriate.

The region being part of the object 101 in a see-through plan view and being heated by the auxiliary melting device 13 overlaps the region being part of the object 101 and being irradiated with UV rays emitted by the melting device 11. These two regions may substantially coincide with each other or may overlap each other. For example, the region being irradiated with UV rays may coincide with all or part of the region being heated by the auxiliary melting device 13. As can be inferred from the action that will be described later, this enables the efficient use of UV radiation energy in the melting of the fixing polymer.

For example, the auxiliary melting device 13 heats the object 101 substantially uniformly in the width direction of the object 101; that is, the amount of heat applied to the object 101 by the auxiliary melting device 13 is uniform in the width direction. In some embodiments, however, the amount of heat applied to the object 101 by the auxiliary melting device 13 is varied in the width direction of the object 101. For example, a greater amount of heat may be applied to each side in the width direction where heat can dissipate well. The region that can be heated by the auxiliary melting device 13 at a time may have a desired length in the direction of conveyance of the object 101.

The auxiliary melting device 13 may be variously designed. The auxiliary melting device 13 in the present embodiment includes the second heat roller 17B. The first heat roller 17A and the second heat roller 17B may be structurally the same or different from each other. In either case, the aforementioned features of the first heat roller 17A may be adopted into the second heat roller 17B where appropriate; that is, the second heat roller 17B may include a first portion and a second portion and may also include a heating wire, an induction coil, or a channel (Heads of Ink Ejector)

The heads 21 of the ink ejector 7 may be basically in a form that is analogous to any of various commonly known heads or that is designed on the basis of various commonly known heads. The heads 21 in the present embodiment each may include a heater. The heater heats ink that is yet to be ejected. Heating ink prior to ejection offers the following advantage: the medium in the ejected ink can evaporate in a shorter time, and/or the fixing polymer can melt in a shorter time. The heaters included in the heads 21 may be in any desired form. The following describes an example of the heaters included in the heads 21.

Figure 3A:
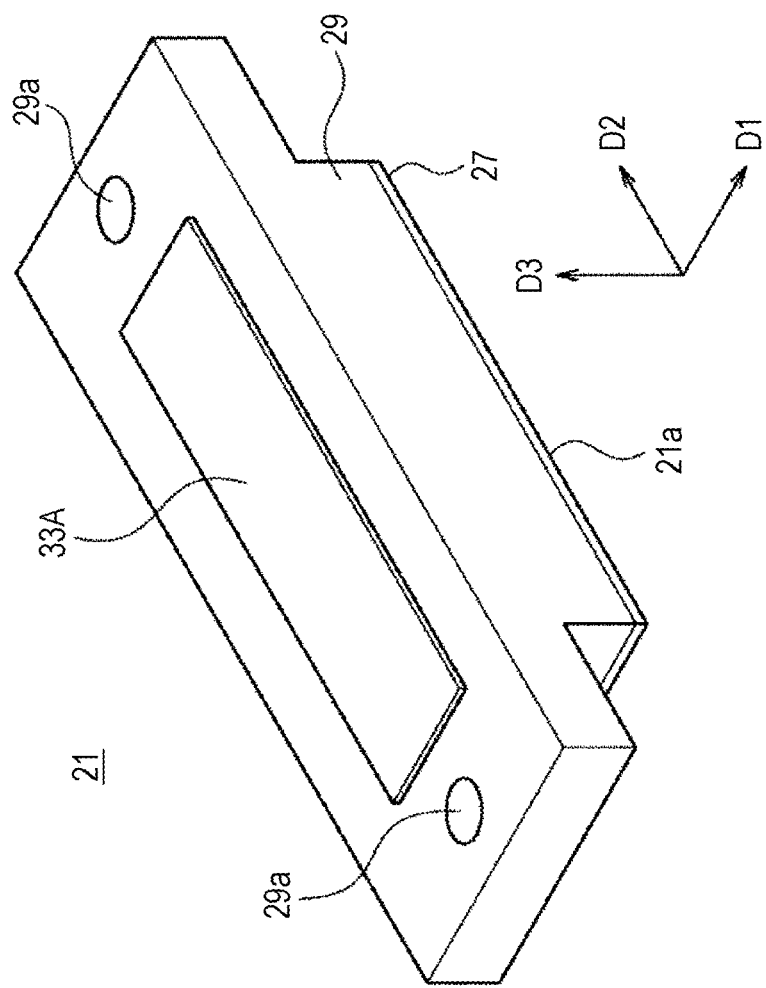
FIG. 3A is a perspective view of an ink jet head of the printing apparatus in FIG. 1, illustrating the ink jet head seen obliquely from above.
Figure 3B:
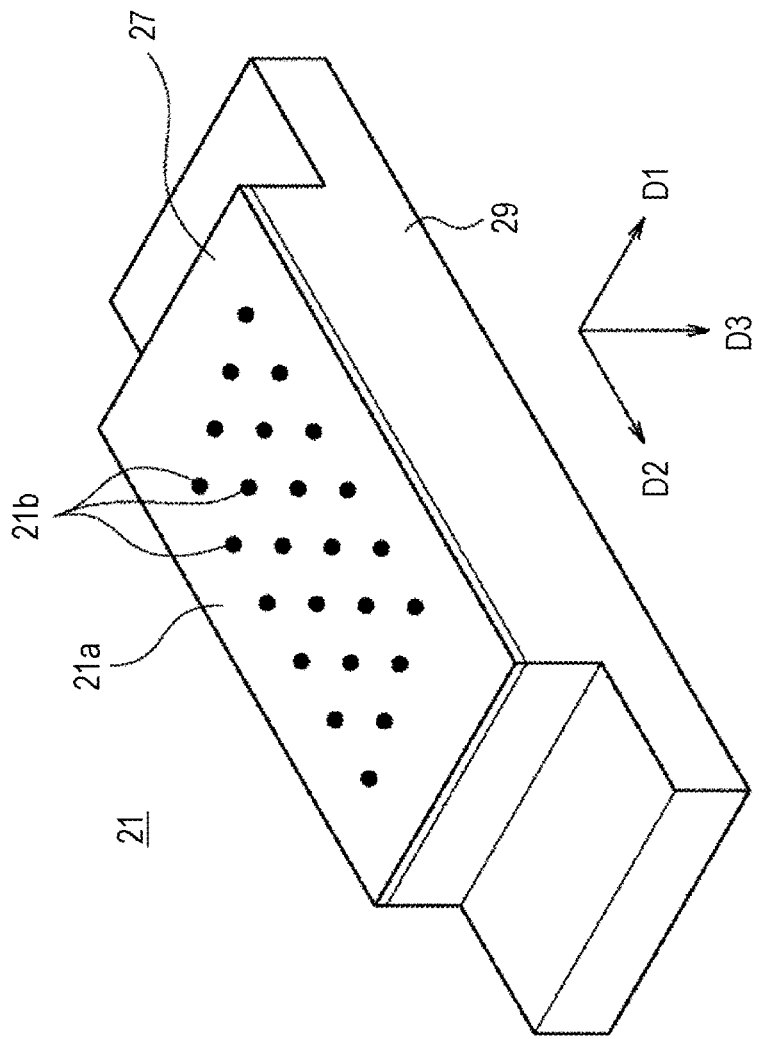
FIG. 3B is a perspective view of the ink jet head in FIG. 3A, illustrating the ink jet head seen obliquely from below.
Figure 3C:
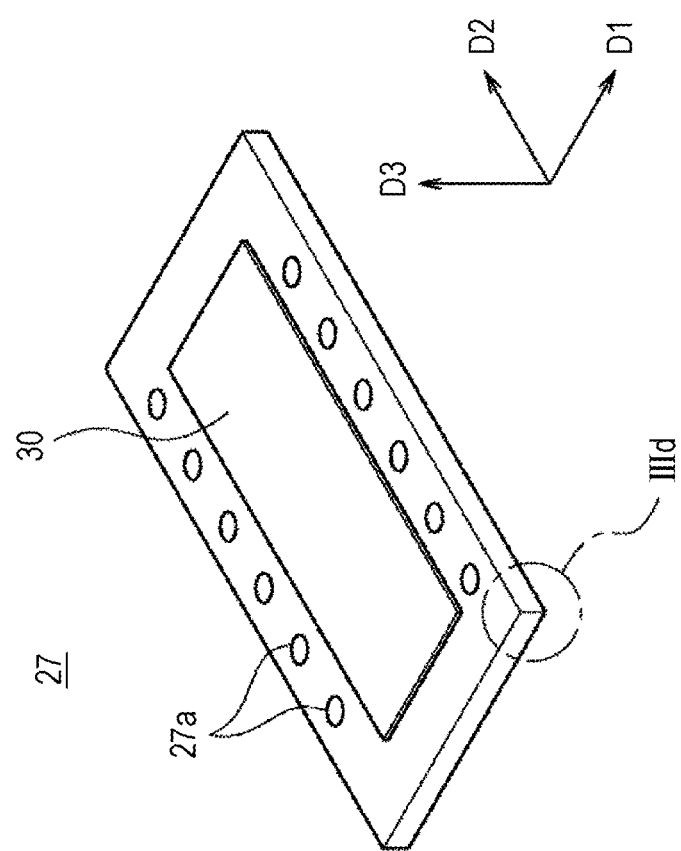
FIG. 3C is a perspective view of part of the ink jet head in FIG. 3A, illustrating a head main body seen obliquely from above.

FIG. 3A is a perspective view of one of the heads 21, illustrating the head 21 viewed from above (from the side opposite to the side on which the object 101 is placed). FIG. 3B is a perspective view of the head 21, illustrating the head 21 viewed from below (from the side on which the object 101 is placed). FIG. 3C is a perspective view of part of the head 21, illustrating a head main body 27 viewed from above.

For example, the head 21 includes the head main body 27 and a backside member 29, which is fixed to an upper part of the head main body 27. The head main body 27 has the ejection surface 21a, which is oriented toward the object 101. The ejection surface 21a has nozzles 21b, through which ink droplets are ejected. The head main body 27 is thus regarded as a member that is directly involved in the ejection of ink droplets. The backside member 29 aids in interconnecting the head main body 27 to other constituent components (e.g., the ink tank 25 and the controller 15). The head 21 may include, in addition to the head main body 27 and the backside member 29, a desired member (e.g., a housing placed on the backside member 29).

For example, the head main body 27 includes discrete channels and at least one common channel (not illustrated). Each of the discrete channels is connected to the corresponding one of the nozzles 21b. The common channel is connected to all of the discrete channels and extends along the ejection surface 21a. The head main body 27 includes at least one opening, which is denoted by 27a and is provided in a surface located opposite the ejection surface 21a. Each opening 27a is connected to an end portion of the corresponding common channel or to an end portion of the at least one common channel. The head 21 in the illustrated example is a piezo head, in which case the head 21 may include an actuator substrate 30. The actuator substrate 30 is located opposite the ejection surface 21a of the head main body 27. The actuator substrate 30 includes piezoelectric actuators, each of which applies pressure to the inside of the corresponding one of the discrete channels.

The backside member 29 includes at least one opening and a channel (not illustrated). The at least one opening is denoted by 29a and is connected to the ink tank 25 (not illustrated) with a tube (not illustrated) therebetween. The channel forms a connection between the at least one opening 29a and the at least one opening 27a of the head main body 27. The backside member 29 includes a driver and a circuit board therein. The driver (not illustrated) is mounted on the circuit board (not illustrated) and supplies the head main body 27 (e.g., the actuator substrate 30) with power.

FIG. 3D is an enlarged view of a region IIId in FIG. 3C.

The head main body 27 includes plates 31, which are stacked in layers. Through-holes extending through the plates 31 are constructed as the nozzles 21b and the channels connected to the nozzles 21b. The plates 31 in an example are made of metal or resin.

Referring to FIG. 3A, the head 21 in such an example includes a heater 33A, which is disposed on an upper surface of the backside member 29. The heater 33A may be in sheet form; that is, the heater 33A may be a film heater. For example, the heater 33A includes a heating wire and insulators in sheet form. The heating wire is routed in a plane in a desired manner and is sandwiched between the insulators. The heater 33A may have any desired planar shape and desired dimensions.

In addition to or in place of the heater 33A, a heater 33B may be provided. Referring to FIG. 3D, the heater 33B is disposed between the plates 31. As with the heater 33A, the heater 33B includes a heating wire and insulators in sheet form. The heating wire is routed in a plane in a desired manner and is sandwiched between the insulators. The heater 33B may have any desired planar shape and desired dimensions. In a see-through plan view, the heater 33B may extend across all of the nozzles 21b.

One or more heaters (not illustrated) may be provided in addition to or in place of the heater on the upper surface of the backside member 29 and/or the heater inside the head main body 27. Examples of the heaters include a heater (not illustrated) on a side surface of the head 21 (on a surface that forms an angle with the D1 direction or the D2 direction), a heater inside the backside member 29, and a heater between the head main body 27 and the backside member 29. It is not required that the heaters be in sheet form. Each heater may be thick enough to be differentiated from heaters in sheet form. In addition to or in place of the heaters, a channel through which a heating medium flows may be provided in the head 21.

(Controller)

The controller 15 (see FIG. 1) includes a central processing unit (CPU), read-only memory (ROM), random-access memory (RAM), and an external storage device, which are not illustrated. In other words, the controller 15 includes, for example, a computer. The CPU executes programs stored in the ROM and/or programs stored in the external device to implement various functional units, which will be described later. The controller 15 may include a logic circuit configured to perform only a certain operation or may include a driver that supplies various components with power.

In terms of hardware configuration, the controller 15 may be a decentralized controller in a desired form. For example, the controller 15 may include subordinate controllers and a superordinate controller. Each of the subordinate controllers is provided for the corresponding one of the conveyor 5, the ink ejector 7, the dryer 9, the melting device 11, and the auxiliary melting device 13. The superordinate controller controls (e.g., synchronizes) the subordinate controllers by transmitting signals to the subordinate controllers and by receiving signals from the subordinate controllers.

(Configuration of Signal Processing Part)

Figure 4:
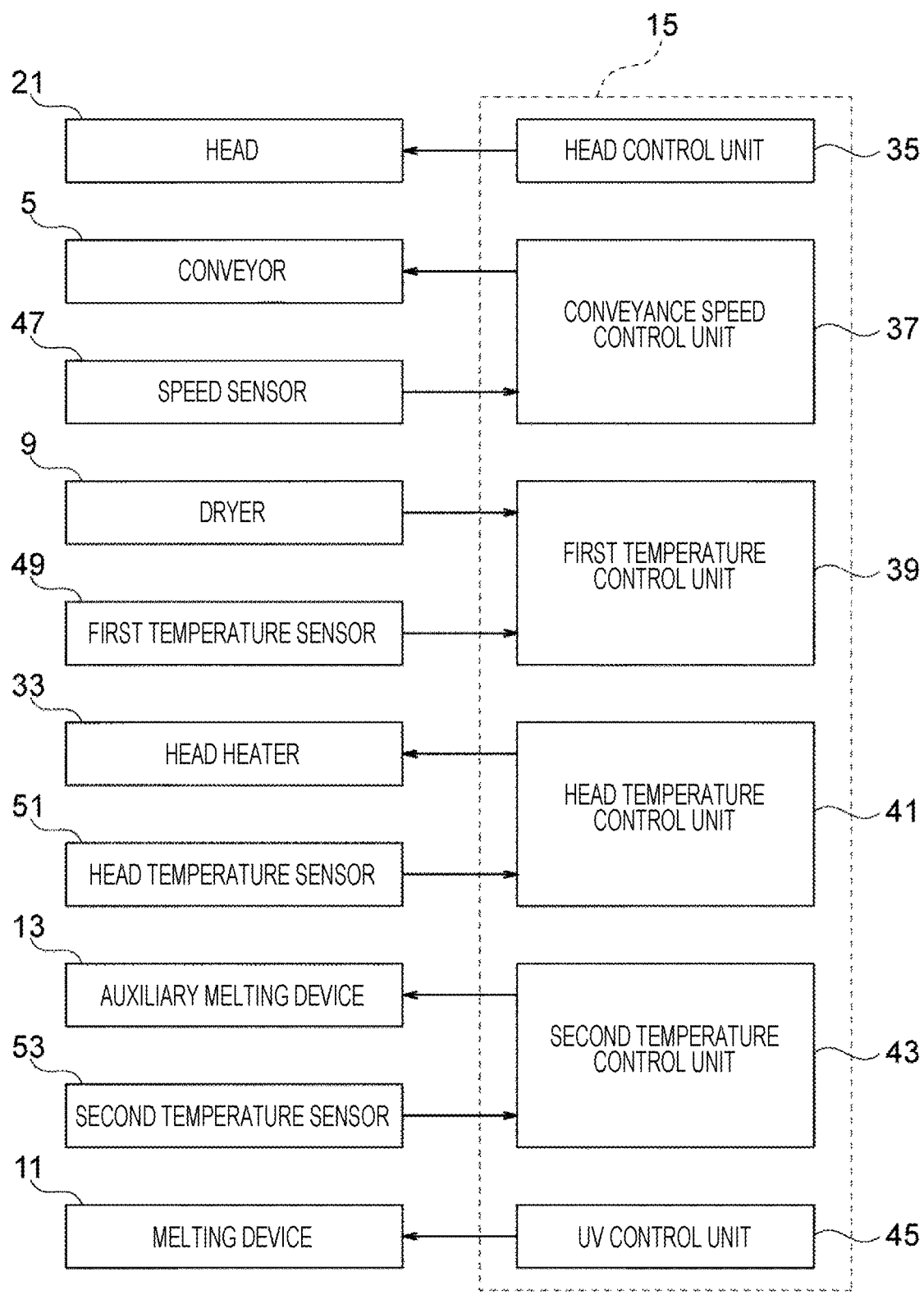
FIG. 4 is a block diagram illustrating the configuration of a signal processing part of the printing apparatus in FIG. 1.

FIG. 4 is a block diagram illustrating the configuration of a signal processing part of the printing apparatus 1.

The controller 15 includes various functional units (e.g., units 35, 37, 39, 41, 43, and 45) implemented by the CPU executing the programs. The unit denoted by 35 controls the heads 21 and is hereinafter referred to as a head control unit. The unit denoted by 37 controls the conveyor 5 and is hereinafter referred to as a conveyance speed control unit. The unit denoted by 39 controls the dryer 9 (the first heat roller 17A) and is hereinafter referred to as a first temperature control unit. The unit denoted by 41 controls head heaters 33 (the heaters 33A and/or the heaters 33B) of the heads 21 and is hereinafter referred to as a head temperature control unit. The unit denoted by 43 controls the auxiliary melting device 13 (the second heat roller 17B) and is hereinafter referred to as a second temperature control unit. The unit denoted by 45 controls the melting device 11 and is hereinafter referred to as a UV control unit. Each unit will be described in more detail below.

(Head Control Unit)

The head control unit 35 in an example generates information and then outputs the information to the drivers (not illustrated) of the heads 21. The information is generated on the basis of data about images and the like, where characters are regarded as a kind of image. The information concerns the size of droplets that are to be ejected by each nozzle 21b at predetermined periodic timings for ejection. Upon receipt of the information, each of the drivers (not illustrated) applies, in accordance with the information, voltage to driving elements (e.g., piezoelectric actuators) that are provided for the respective nozzles 21b. The drivers may be regarded as part of the head control unit 35. The periodic timings for ejection may be set by the manufacturer of the printing apparatus 1 and may be invariable. Alternatively, the head control unit 35 may set the periodic timings for ejection on the basis of predetermined information. For example, the predetermined information concerns the resolution in the direction of conveyance of the object 101 and/or the speed of conveyance of the object 101. The resolution and the speed are set by the manufacturer or the user. When a printed record is to be produced at a resolution of 1200 dpi by the heads 21 on the object 101 conveyed at a speed of 100 m/min, the heads 21 are controlled in such a way as to operate at a driving frequency of 78.74 kHz to eject ink.

(Conveyance Speed Control Unit)

The conveyance speed control unit 37 controls the conveyor 5 in such a manner that the speed of conveyance of the object 101 is kept at a target value. The target value essentially remains unchanged while the printing apparatus 1 is operating. The expression "while the printing apparatus 1 is operating" may be herein read as "during a print job". The target value may be set by the manufacturer of the printing apparatus 1 and may be invariable. Alternatively, the user may set the target value. Still alternatively, the conveyance speed control unit 37 may set the target value on the basis of predetermined information. For example, the predetermined information concerns the resolution in the direction of conveyance of the object 101 and/or the periodic ejection timings for ejection. The resolution and the periodic timings are set by the manufacturer or the user.

The conveyance speed control unit 37 in the illustrated example performs feedback control on the basis of a value acquired from a speed sensor 47, which determines the speed of conveyance of the object 101. Alternatively, the conveyance speed control unit 37 may perform open loop control without feedback. The speed sensor 47 may determine the speed of conveyance of the object 101, or the speed sensor 47 may determine the speed of a driving element involved in the conveyance of the object 101. The speed sensor 47 in the former case may be analogous to an optical mouse that determines the speed by image recognition. The speed sensor 47 in the latter case may be a sensor (e.g., an encoder or a resolver) that detects rotations of the rollers of the conveyor 5 or rotations of the motor driving the rollers. The conveyance of the object 101 is synchronized with the ejection of ink from the heads 21 accordingly.

The conveyance speed control unit 37 causes a driver (not illustrated) to supply power to at least one motor that rotates at least one of the rollers of the conveyor 5. The driver may be regarded as part of the conveyance speed control unit 37. The driver may perform feedback control (subordinate to the aforementioned feedback control) on the motor or may perform open loop control on the motor.

(First Temperature Control Unit)

The first temperature control unit 39 controls the dryer 9 in such a manner that the temperature of a predetermined portion of the object 101 is kept at a target value. For example, the predetermined portion of the object 101 is a region being heated by the dryer 9. Alternatively, the predetermined portion may be another region of the object 101 or, more specifically, a region in which temperature variations are predominantly caused by the heat liberated from the dryer 9. For example, the predetermined portion may be disposed downstream of the region being heated by the dryer 9 and may be a region not being heated by a device other than the dryer 9. Referring to FIG. 1, the predetermined portion may be a region facing the ink ejector 7.

The target value of the temperature essentially remains unchanged while the printing apparatus 1 is operating. The target value may be set by the manufacturer of the printing apparatus 1 and may be invariable. Alternatively, the user may set the target value. Still alternatively, the first temperature control unit 39 may set the target value on the basis of predetermined information. Examples of the predetermined information include: information concerning ink and received as an input from the manufacturer or the user (e.g., information that can be used to determine the Tg of a predetermined polymer); information concerning the conveyance speed set by the manufacturer or the user (the speed of conveyance of the object 101); and information concerning the relative positions of (the distance between) the dryer 9 and another device (7, 11, 13) and received as an input from the manufacturer or the user.

The first temperature control unit 39 in the illustrated example performs feedback control on the basis of a value acquired from a first temperature sensor 49, which determines the temperature of the predetermined portion of the object 101. Alternatively, the first temperature control unit 39 may perform open loop control without feedback. The first temperature sensor 49 may determine the temperature of the object 101, the ambient temperature of the environment in which the object 101 is placed, or the temperature of a desired portion of the dryer 9 (e.g., the temperature of the front surface or the inside of the first heat roller 17A). In any case, the first temperature sensor 49 may be a non-contact temperature sensor or a contact temperature sensor. Examples of the non-contact temperature sensor include radiation thermometers and thermographs. Examples of the contact temperature sensor include thermocouples, thermistors, and resistance temperature detectors. The determined temperature may, as it is, be compared to the target value. Alternatively, the determined temperature may be compared to the target value after a desired correction is made. For example, a comparison may be made after the determined temperature is converted into the temperature in a position other than the position of the sensor.

Concrete examples of the control performed on the dryer 9 include control of power that is supplied to a heat generating element (e.g., a heating wire or an induction coil) by way of a driver (not illustrated). What is to be controlled depends on what the heat generating element is like; more specifically, the voltage, the current, and/or the frequency (in the case of controlling AC power) may be controlled. The driver may be regarded as part of the first temperature control unit 39. The controlled performed on the dryer 9 is not limited to the above. In an embodiment in which a heating medium is supplied to the first heat roller 17A, the flow rate of the heating medium may be controlled.

(Head Temperature Control Unit)

The head temperature control unit 41 controls the head heaters 33 in such a manner that the temperature of ink in a predetermined portion of each head 21 is kept at a target value. The predetermined portion may be the head main body 27 or the backside member 29 or may be any portion (any channel) in the head main body 27 or in the backside member 29. When the predetermined portion is located in the nozzles 21*b* or is close to the nozzles 21*b*, the fixation of an ink 103 to the object 101 can be controlled more accurately.

The target value of the temperature essentially remains unchanged while the printing apparatus 1 is operating. The target value may be set by the manufacturer of the printing apparatus 1 and may be invariable. Alternatively, the user may set the target value. Still alternatively, the head temperature control unit 41 may set the target value on the basis of predetermined information. Examples of the predetermined information include information concerning ink and received as an input from the manufacturer or the user (e.g., information that can be used to determine the Tg of a predetermined polymer).

The head temperature control unit 41 in the illustrated example performs feedback control on the basis of a value acquired from a head temperature sensor 51, which determines the temperature of ink. Alternatively, the head temperature control unit 41 may perform open loop control without feedback. The head temperature sensor 51 may be exposed in a channel to determine the temperature of ink. Alternatively, the head temperature sensor 51 may determine the temperature of the heads 21 without being exposed in a channel. That is, the head temperature sensor 51 may be a contact temperature sensor exposed in the channel or a non-contact temperature sensor not exposed in the channel Concrete examples of the contact temperature sensor and concrete examples of the non-contact temperature sensor have already been mentioned above. The determined temperature may, as it is, be compared to the target value. Alternatively, the determined temperature may be compared to the target value after a desired correction is made. For example, a comparison may be made after the determined temperature is converted into the temperature in a position other than the position of the sensor.

Concrete examples of the control performed on the head heaters 33 include control of power that is supplied to the head heaters 33 by way of a driver (not illustrated). What is to be controlled depends on what the head heaters 33 are like and; more specifically, the voltage, the current, and/or the frequency (in the case of controlling AC power) may be controlled. The driver may be regarded as part of the head temperature control unit 41.

(Second Temperature Control Unit)

The second temperature control unit 43 controls the auxiliary melting device 13 in such a manner that the temperature of a predetermined portion of the object 101 is kept at a target value. For example, the predetermined portion of the object 101 is a region being heated by the auxiliary melting device 13.

The target value of the temperature essentially remains unchanged while the printing apparatus 1 is operating. The target value may be set by the manufacturer of the printing apparatus 1 and may be invariable. Alternatively, the user may set the target value. Still alternatively, the second temperature control unit 43 may set the target value on the basis of predetermined information. Examples of the predetermined information include information concerning ink and received as an input from the manufacturer or the user (e.g., information that can be used to determine the Tg of a predetermined polymer).

The second temperature control unit 43 in the illustrated example performs feedback control on the basis of a value acquired from a second temperature sensor 53, which determines the temperature of the predetermined portion of the object 101. Alternatively, the second temperature control unit 43 may perform open loop control without feedback. The second temperature sensor 53 may determine the temperature of the object 101, the ambient temperature of the environment in which the object 101 is placed, or the temperature of a desired portion of the auxiliary melting device 13 (e.g., the temperature of the front surface or the inside of the second heat roller 17B). In any case, the second temperature sensor 53 may be a non-contact temperature sensor or a contact temperature sensor. Concrete examples of the contact temperature sensor and concrete examples of the non-contact temperature sensor have already been mentioned above. The determined temperature may, as it is, be compared to the target value. Alternatively, the determined temperature may be compared to the target value after a desired correction is made. For example, a comparison may be made after the determined temperature is converted into the temperature in a position other than the position of the sensor.

The auxiliary melting device 13 may be designed to heat the object 101 (and the ink) to a predetermined temperature. For example, the predetermined temperature is lower than the Tg of the fixing polymer contained in the ink and is equal to or higher than the Tg of most (or the entirety) of the other polymers contained in the ink and each having a Tg higher than the ordinary temperature. What is meant by the expression "most (or the entirety) of the other polymers" is as has already been mentioned above. The melting device 11 may be designed to heat the ink to a temperature higher than the predetermined temperature by UV irradiation. More specifically, the predetermined temperature is the target temperature that is to be achieved by using the auxiliary melting device 13. For example, the melting device 11 heats the ink to a temperature higher than the Tg of the fixing polymer. While the auxiliary melting device 13 and the melting device 11 are designed as above, the heat applied to the ink by the melting device 11 can heavily influence the temperature of the object 101. In such a case, the sensor may determine the temperature of a desired portion of the auxiliary melting device 13, not the temperature of the object 101, and the auxiliary melting device 13 may perform feedback control in which the temperature of the portion will be brought close to the target temperature. The feedback control may involve conversion from the temperature of the portion to the temperature of the object 101. In such a case, the temperature that is to be determined by the conversion will be brought close to the target temperature.

Concrete examples of the control performed on the auxiliary melting device 13 include control of power that is supplied to a heat generating element (e.g., a heating wire or an induction coil) by way of a driver (not illustrated). What is to be controlled depends on what the heat generating element is like; more specifically, the voltage, the current, and/or the frequency (in the case of controlling AC power) may be controlled. The driver may be regarded as part of the second temperature control unit 43. The controlled performed on the auxiliary melting device 13 is not limited to the above. In an embodiment in which a heating medium is supplied to the second heat roller 17B, the flow rate of the heating medium may be controlled.

(UV Control Unit)

The UV control unit 45 in an example controls the melting device 11 in such a manner that the intensity of UV rays emitted to the object 101 at a constant distance from the melting device 11 is kept at a target value. The distance concerned is the working distance (WD).

The target value of the intensity essentially remains unchanged while the printing apparatus 1 is operating. The target value may be set by the manufacturer of the printing apparatus 1 and may be invariable. Alternatively, the user may set the target value. Still alternatively, the UV control unit 45 may set the target value on the basis of predetermined information. Examples of the predetermined information include: information concerning ink and received as an input from the manufacturer or the user (e.g., information that can be used to determine the Tg of a predetermined polymer); and the temperature of a region of the object 101 in a hypothetical case in which the region is not irradiated with UV rays although the region is originally planned to be irradiated with UV rays. The temperature in the hypothetical case in which the region is not irradiated with UV rays may be set by the manufacturer or the user. Alternatively, the UV control unit 45 may calculate the target value on the basis of predetermined information. Examples of the predetermined information include: a target value of the temperature of (the amount of heat applied by) at least one of the components involved in the application of heat (e.g., the temperature of at least one of the components denoted by (9 (17A), 21(33), 13(17B)); and the relative positions of (the distance between) the melting device 11 and the component concerned.

The UV control unit 45 performs open loop control that does not involve feedback about the intensity of UV radiation. The UV control unit 45 also control power that is supplied to the light source 11a by way of a driver (not illustrated) to enable the light source 11a to generate UV rays. What is to be controlled depends on what the light source 11a is like; more specifically, the voltage, the current, and/or the frequency (in the case of controlling AC power) may be controlled. The driver may perform feedback control of power. The driver may be regarded as part of the UV control unit 45.

(Process by which Ink is Fixed)

Figure 5:
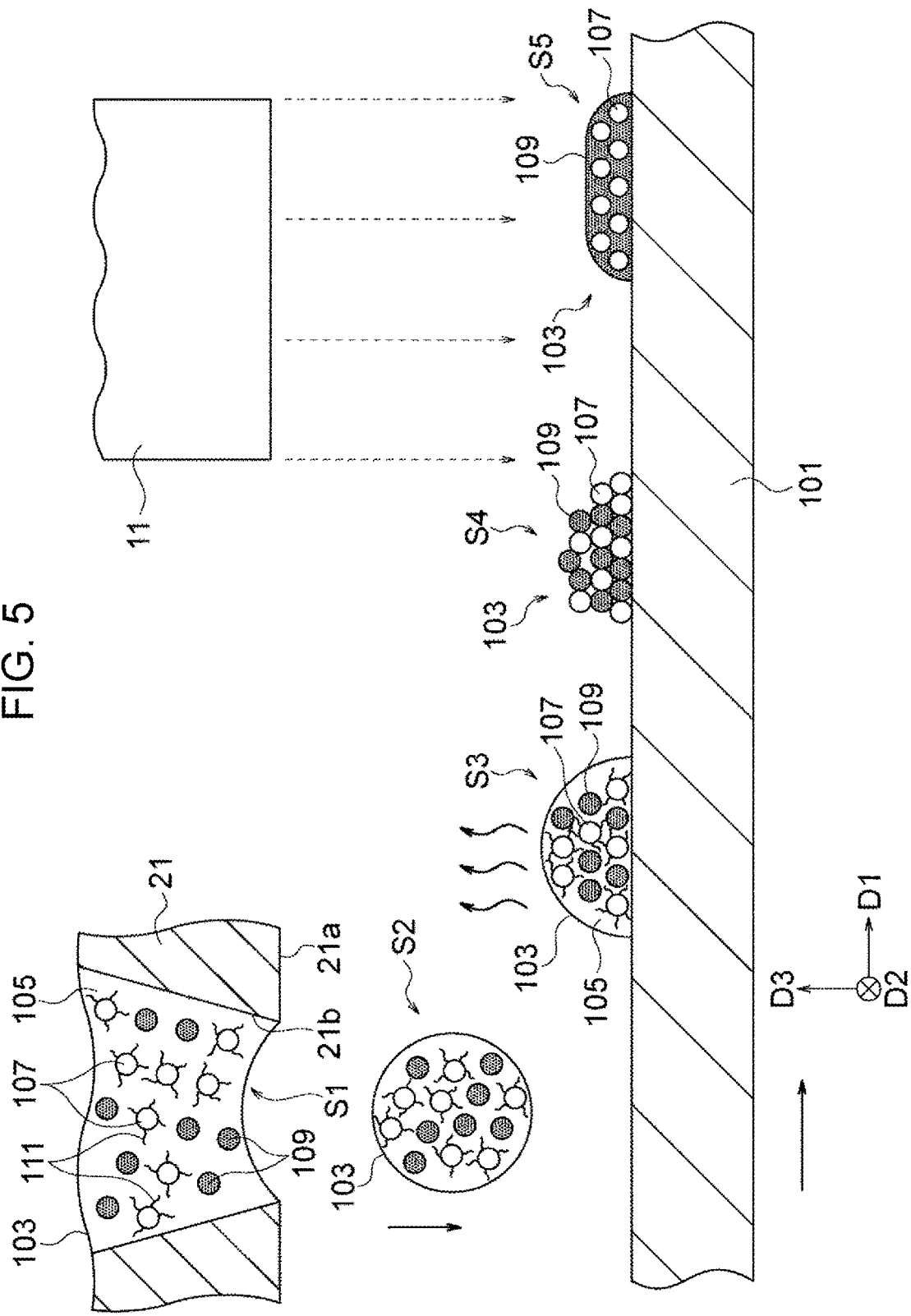
FIG. 5 is a conceptual diagram illustrating a method by which the printing apparatus in FIG. 1 enables the fixation of ink.

FIG. 5 is a conceptual diagram illustrating a process by which the printing apparatus 1 enables the fixation of ink to the object 101.

The up-and-down direction and the left-and-right direction in FIG. 5 correspond respectively to the up-and-down direction and the left-and-right direction in FIG. 1. Part of the object 101 viewed in section is illustrated in FIG. 5. The object 101 is conveyed from the left side of the drawing plane to the right side of the drawing plane. The upper left part of the drawing plane is an enlarged sectional view of part of one of the heads 21. The ink 103 in the form of liquid droplets are ejected from the head 21 to the (upper) surface of the object 101. While the ink is moving together with the object 101, the percentage content and the state (e.g., vitreous state) of each constituent of the ink change. FIG. 5 may be regarded as a chronological illustration of changes in the state of the same liquid droplet (the ink 103) or may be regarded as a simultaneous illustration of different liquid droplets. The ink is hereinafter denoted by the same numerical sign (103), irrespective of changes in the percentage content and the state of each constituent of the ink 103.

Referring to FIG. 5, the state of the ink 103 (the percentage content and the state of each constituent of the ink 103) is conceptualized as five different states. These states are hereinafter referred to as first to fifth states, which are denoted by S1 to S5, respectively.

In the first state S1, the ink 103 is retained in the head 21; that is, the ink 103 is yet to be ejected. The ink 103 in the first state S1 contains, for example, a medium 105 (a solvent and/or a dispersion medium), a coloring agent 107, and two or more kinds of polymers (a polymer 109 and a polymer 111). It is required that a fixing polymer and another polymer be contained in the ink 103. The polymer denoted by 109 is a fixing polymer, and the polymer denoted by 111 is herein referred to as a first polymer. The first polymer 111 is an example of the polymer whose Tg is higher than the ordinary temperature and lower than the Tg of the fixing polymer 109. As mentioned above, the ink may contain desired components (e.g., polymers) other than these polymers. For greater clarity, constituents other than the polymers 109 and 111 are not illustrated in FIG. 5.

Unless a contradiction or the like arises, the description about the first polymer 111 may be applicable to other polymers. Unless a contradiction or the like arises, the first polymer 111 may be read as most (or the entirety) of the other polymers contained in the ink and each having a Tg higher than the ordinary temperature and lower than the Tg of the fixing polymer 109. What is meant by the expression "most of the other polymers" is as has already been mentioned above.

For convenience, the coloring agent 107 is illustrated as particles (pigments) dispersed in the medium 105. In the first state S1, the fixing polymer 109 is in the form of particles (solid). As mentioned above, the polymers other than the fixing polymer 109 in the first state S1 each may be a dissolved substance or a dispersoid and may be a liquid or a solid. The first polymer 111 is illustrated as a ribbon-like dispersant polymer. As mentioned above, the accompanying drawings are schematic representations. Thus, the diameter and the density of particles in FIG. 5 do not fully correspond to the actual diameter and the actual density of particles in the ink 103.

In the second state S2, the ink 103 ejected from the head 21 flies in the air toward the object 101; that is, the ejected ink is yet to land on the object 101. The second state S2 (the percentage content and the state of each constituent) is not basically different from the first state S1.

Once the ink 103 lands on the object 101, the ink 103 remains in the third state S3 for a certain period of time. In this state, the medium 105 gradually evaporates. The heat applied to the ink 103 beforehand by the head heaters 33 expedites the evaporation of the medium 105. The heat applied to the object 101 by the dryer 9 and transferred to the ink 103 also expedites the evaporation of the medium 105.

Polymers (not illustrated) other than the fixing polymer 109 may be in the form of particles in both the first state S1 and second state S2 and may, in part or in whole, be vitrified in the third state S3. One or more kinds of polymers other than the fixing polymer 109 may decompose and evaporate by the application of heat. Additives other than the polymers may remain in the ink or may evaporate.

In the fourth state S4, the ink 103 is about to be irradiated with UV rays emitted by the melting device 11. The medium 105 in this state is at a more advanced stage of evaporation than in the third state S3. For example, the medium 105 may be at the completion of evaporation. As a result of evaporation of the medium 105, a substance dissolved in the medium 105 or a dispersoid in the medium 105 (except for those having evaporated) coagulates and is left. FIG. 5 illustrates the process by which the coloring agent 107 and the fixing polymer 109 coagulate.

One or more kinds of polymers (e.g., the first polymer 111) other than the fixing polymer 109 may be left or may decompose and evaporate. Each polymer left in the ink is or is not in a vitreous state. For example, the polymers left in the ink except for the fixing polymer 109 may, in whole, be in a vitreous state. For greater clarity, the fourth state S4 and the fifth state S5 in FIG. 5 are illustrated without the first polymer 111, regardless of the presence or absence of the first polymer 111 in the ink 103.

In the fifth state S5, the ink 103 is irradiated with UV rays emitted by the melting device 11. In this state, the coloring agent 107 generates heat by absorption of UV rays, and as a result, the fixing polymer 109 melts (is vitrified). In the subsequent state (not illustrated), the temperature of the ink 103 decreases after the irradiation of UV rays. Consequently, the fixing polymer 109 solidifies, causing the coloring agent 107 to adhere to the object 101. The other polymers (e.g., the first polymer 111), if present in the ink 103 after application of heat, also solidify (or remain in solid state) although the other polymers are not illustrated.

As mentioned above, the medium 105, in part or in whole, may evaporate before the fixing polymer 109 melts. This reduces the possibility that the fixing polymer 109 in a vitreous state will be formed into a coating that can inhibit the evaporation of the medium 105. The medium 105 can thus evaporate in an efficient manner. When the content of the medium 105 in the first state S1 serves as a reference amount, the amount of evaporation of the medium 105 before the fixing polymer 109 melts (before application of heat through UV irradiation) is, for example, not less than 30 mass %, not less than 50 mass %, or not less than 70 mass % or is the total amount of the medium 105 (i.e., not less than 95% or 100 mass %).

The application of heat to the ink 103 through UV irradiation enables the ink 103 to rise in temperature in a short time and to cause the fixing polymer 109 to melt accordingly. On the downside, heat is generated mainly in the coloring agent 107, that is, in a localized manner. Thus, heating the ink 103 solely by UV irradiation can result in an excessive temperature rise in a particular part, and the quality of the ink 103 and/or the object 101 can deteriorate accordingly. Additional application of heat to the object 101 by the dryer 9 and/or the auxiliary melting device 13 offers the following advantages: the heat generation is less localized; and the time it takes to raise the temperature is shortened.

Paradoxically speaking, a determination whether the polymer concerned is the fixing polymer 109 may be made on the basis of the presence or absence of the aforementioned action, not by its chemical composition and/or its constituents. In the case where two or more kinds of polymers are contained in the ink 103, at least one of these polymers is in solid form (particles) before the application of heat by the melting device 11 (e.g., a device that emits UV rays) and melts (is vitrified) by the heating action of the melting device 11 (e.g., UV irradiation). Such a polymer left in the ink 103 and remaining in solid state may be regarded as the fixing polymer 109.

(Target Temperature that is to be Achieved by Using Head Heaters)

As mentioned above, the heads 21 may include the head heaters 33 such that the ink 103 in the first state S1 is maintained at a predetermined target temperature. The first state S1 (the percentage content and the state of each constituent, except for the viscosity and the like) may be basically the same or similar to the state of the ink 103 at room temperature. For example, the target temperature that is to be achieved by using the head heaters 33 is lower than the Tg of any or all kinds of polymers that are not supposed to be vitrified in the ink at room temperature. Conversely, the Tg of any or all kinds of polymers in the ink 103 is higher than the target temperature that is to be achieved by using the head heaters 33. Setting the target temperature and/or the Tg to satisfy the above condition reduces the possibility that a molten polymer will adhere to, for example, inner surfaces of the nozzles 21b.

The target temperature that is to be achieved by using the head heaters 33 may be as high as possible without being equal to or exceeding the Tg of any or all kinds of polymers in the ink. Conversely, the Tg of any or all kinds of polymers in the ink 103 may be as low as possible while being higher than the target temperature that is to be achieved by using the head heaters 33. Setting the target temperature and/or the Tg to satisfy the condition as above reduces the length of time from when the ink 103 lands on the object 101 and to when the ink 103 is fixed to the object 101. Unintended spreading of liquid droplets on the object 101 is less likely to occur; that is, the liquid droplets can retain their shape well. One of the findings based on experiments conducted by the inventors in the present application was that increasing the temperature of the ink 103 (e.g., to 45° C. or above) improves the shape retention capability of the ink 103.

An example of the Tg of any or all kinds of polymers in the ink and an example of the target temperature that is to be achieved by using the head heaters 33 are as follows. The Tg of any or all kinds of polymers in the ink may be equal to or higher than 50° C. The target temperature that is to be achieved by using the head heaters 33 may be equal to or higher than 40° C. and lower than 50° C. or may be equal to or higher than 40° C. and equal to or lower than lower than 45° C. Given that the target temperature that is to be achieved by using the heads 21 is lower than the Tg of a specific kind of polymer in the ink 103 (e.g., the Tg of the dispersant polymer or the Tg of the abrasion resistant polymer), the difference between the target temperature and the Tg of the polymer concerned may be equal to or more than 1° C. and equal to or less than 10° C. or may be equal to or more than 1° C. and equal to or less than 5° C.

The temperature of the ink 103 decreases in the second state S2 in which the ink 103 (the ejected liquid droplets) flies in the air. The temperature varies linearly with the distance (time period) over which the ink flies in the air. The amount of decrease in temperature is relatively small. Examples of estimations are as follows. In a case in which two picoliters (2 pL) of liquid droplets fly over a distance of 1 mm at an initial speed of 10 m/s in an atmosphere at 25° C., liquid droplets initially at a temperature of 40° C. cool to 38.0° C., and liquid droplets initially at a temperature of 50° C. cool to 46.6° C. In a case in which ten picoliters (10 pL) of liquid droplets fly over a distance of 1 mm at an initial speed of 10 m/s in an atmosphere at 25° C., liquid droplets initially at a temperature of 40.0° C. cool to 39.3° C., and liquid droplets initially at a temperature of 50° C. cool to 48.8° C. The temperature differential may be taken into consideration or may be disregarded in the course of setting the target temperature that is to be achieved by using the head heaters 33 and/or in the course of setting a target temperature that is to be achieved by using the dryer 9.

(Target Temperature that is to be Achieved by Using Dryer)

As mentioned above, the dryer 9 may maintain the object 101 at the target temperature. The temperature of the object 101 may be considered to be substantially equal to the temperature of the ink 103 in the third state S3. In this paragraph and the following paragraph, the target temperature that is to be achieved by using the dryer 9 may thus be read as the temperature of the ink 103 in the third state S3. The target temperature may be lower than the Tg of the fixing polymer 109. Conversely, the Tg of the fixing polymer 109 in the ink 103 may be higher than the target temperature that is to be achieved by using the dryer 9. Setting the target temperature and/or the Tg to satisfy the above condition reduces the aforementioned possibility that the fixing polymer 109 in a molten state will be formed into a coating that can inhibit the evaporation of the medium 105.

The target temperature that is to be achieved by using the dryer 9 may be as high as possible without equaling or exceeding the Tg of the fixing polymer 109. For example, the target temperature that is to be achieved by using the dryer 9 may be set in such a manner that the temperature of the object 101 at the instant when the ink 103 lands on the object 101 is higher than the temperature of the ink 103. This feature further expedites the evaporation of the medium 105. Conversely, the Tg of the fixing polymer 109 in the ink 103 may be as low as possible while being higher than the target temperature that is to be achieved by using the dryer 9. The fixing polymer 109 can melt in a shorter time accordingly.

The time it takes the medium 105 to evaporate may be taken into consideration in the course of setting the target temperature that is to be achieved by using the dryer 9.

Figure 6:
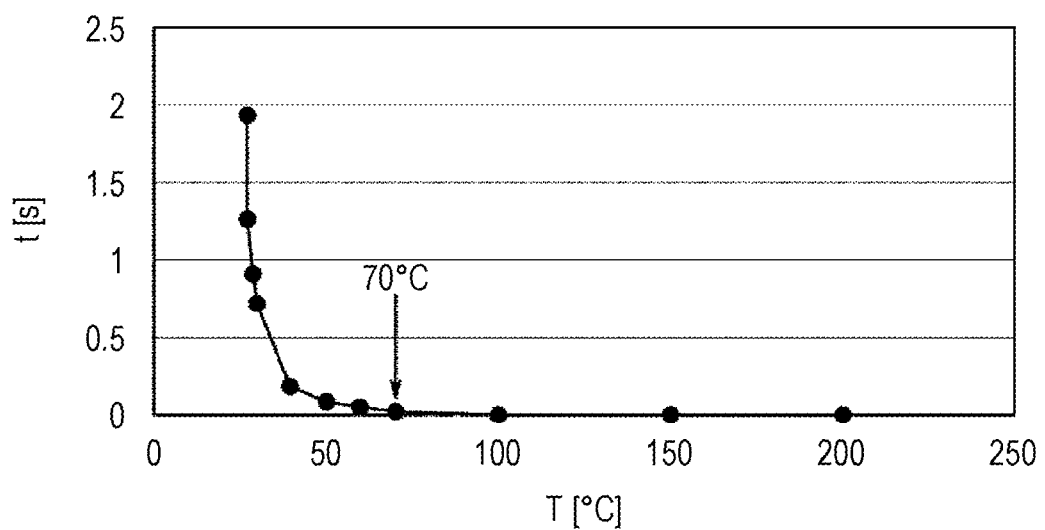
FIG. 6 is a graph illustrating estimations of the time it takes a medium in the ink to evaporate.

FIG. 6 is a graph illustrating estimations of the time it takes the medium 105 to evaporate. The horizontal axis of the graph represents the surface temperature T (° C.) of the ink 103 in the form of droplets. The vertical axis of the graph represents the time t (s) it takes the medium 105 in the ink 103 to evaporate.

Calculations are performed given that the ink 103 in the form of liquid droplets are hemispherical water droplets each having a surface area of about $3.8 \times 10^{-10}$ $m^2$ and being exposed to an atmosphere at 25° C.

As can be seen in the graph, the time t plummets at the instant when the temperature T exceeds the atmospheric temperature. Thereafter, the time t becomes substantially constant when the temperature T is about to reach the boiling point (about 70° C.). In a state (not illustrated in FIG. 6) in which the temperature T is equal to the atmospheric temperature (25° C.), the time t stands at about 4000 s. The results lead to the following conclusion: the target temperature that is to be achieved by using the dryer 9 is preferably set to, for example, 70° C.

The following describes concrete examples of the Tg of the fixing polymer 109 and concrete examples of the target temperature that is to be achieved by using the dryer 9. In this paragraph, the target temperature that is to be achieved by using the dryer 9 may be read as the temperature of the ink 103 in the third state S3. The Tg of the fixing polymer may be equal to or higher than 70° C. and equal to or lower than 120° C. Given that the target temperature that is to be achieved by using the dryer 9 is lower than the Tg of the fixing polymer 109, the target temperature may be equal to or higher than 50° C. and lower than 120° C., may be equal to or higher than 60° C. and lower than 120° C., or may be equal to or higher than 70° C. and lower than 120° C. Given that the Tg of the fixing polymer 109 is higher than the target temperature that is to be achieved by using the dryer 9, the difference between the Tg of the fixing polymer 109 and the target temperature may be equal to or more than 1° C. and equal to or less than 50° C., may be equal to or more than 1° C. and equal to or less than 30° C., or may be equal to or more than 1° C. and equal to or less than 10° C. Unless a contradiction or the like arises, any of the concrete examples of the numerical range may be combined with the concrete example of the Tg of the polymer other than the fixing polymer 109 and with the concrete example of the target temperature that is to be achieved by using the head heaters 33.

The dryer 9 in the present embodiment is functionally synonymous with the first heat roller 17A. The object 101 cools as it moves away from the first heat roller 17A. Given this, the target temperature mentioned above may be a target temperature in a predetermined position between the first heat roller 17A and the ink 103 on the verge of landing (between the first heat roller 17A and the ink ejector 7). For example, the predetermined position may be the position of the first heat roller 17A or may be immediately anterior to the ink ejector 7. The target value of the temperature in the predetermined position may be set in such a manner that the temperature in the entirety of a region being part of the object 101 and extending from the position of the first heat roller 17A to immediately anterior to the ink ejector 7 falls within the aforementioned range of the target temperature.

The following describes examples of estimations of the temperature distribution in the object 101.

Conditions (assumptions) for the estimations are as follows. The first heat roller 17A is at a temperature of 50° C. (Case 1), 60° C. (Case 2), and 70° C. (Case 3). The second heat roller 17B is at a temperature of 70° C. The influence of the melting device 11 is disregarded. The object 101 is placed in an atmosphere at 25° C. The object 101 is conveyed at a speed of 100 m/min. The object 101 is made of PET and has a thickness of 12 μm.

Figure 7:
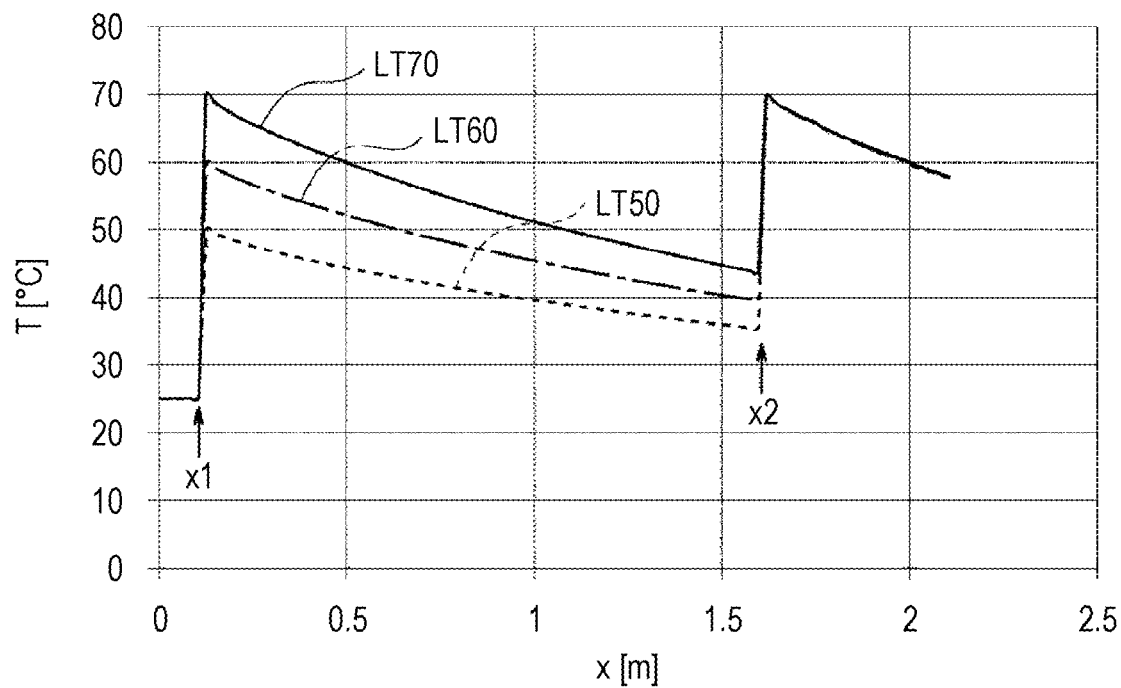
FIG. 7 is a graph illustrating estimations of the temperature distribution in an object subjected to printing performed by the printing apparatus in FIG. 1.

FIG. 7 is a graph illustrating the estimations. The horizontal axis of the graph represents the position x (m) in the D1 direction. The vertical axis of the graph represents the temperature T (° C.) of the object 101. The position of the first heat roller 17A is denoted by x1. The position of the second heat roller 17B is denoted by x2. Lines denoted by LT50, LT60, and LT70 represent the estimations in the cases in which the first heat roller 17A is at a temperature of 50° C., 60° C., and 70° C., respectively.

As can be seen in the graph, the temperature of the object 101 decreases substantially linearly. It is therefore easy to estimate the temperature of the object 101 (the ink 103) in the position of a device other than the dryer 9 (e.g., the ink ejector 7 or the melting device 11) on the basis of the temperature of (the amount of heat applied by) the dryer 9 (the first heat roller 17A in the present embodiment), the relative positions of (the distance between) the dryer 9 and the device concerned (e.g., the ink ejector 7 or the melting device 11), and the speed of conveyance of the object 101. The distance and the conveyance speed may be regarded as the time it takes to convey the object 101 from the dryer 9 to the device concerned.

When viewed from another perspective, the aforementioned parameters (e.g., the amount of applied heat, the distance, and the conveyance speed) may be specified with desired values (target values) such that desired temperatures are achieved in desired positions. The various effects mentioned above can be produced accordingly. For example, the temperature in a region being part of the object 101 and being immediately anterior to a region facing the ink ejector 7 may be equal to or higher than the Tg of the first polymer 111 and lower than the Tg of the fixing polymer 109. The temperature in a region being part of the object 101 and extending from immediately posterior to the dryer 9 (the first heat roller 17A in the present embodiment) to immediately anterior to a region facing the melting device 11 may be equal to higher than the Tg of the first polymer 111 and lower than the Tg of the fixing polymer 109. The medium can fully evaporate before the melting device 11 causes the fixing polymer 109 to melt.

Referring to FIG. 7, the temperature in a region at a distance of 1.5 m downstream of the first heat roller 17A is maintained substantially at or above 40° C. when the first heat roller 17A is at or above 60° C. or, more specifically, at or above 70° C. That is, the temperature T is maintained at such a relatively high level over a relatively long distance (a relatively long time period). This feature reduces the possibility that the temperature of the ink 103 on the object 101 will fall. It is thus ensured that the ink 103 can retain its shape. This feature also enables more expeditious evaporation of the medium through the addition of heat to the ink 103.

(Target Temperature that is to be Achieved by Using Auxiliary Melting Device)

As mentioned above, the auxiliary melting device 13 may maintain the object 101 at a target temperature. The auxiliary melting device 13 may be designed to heat the object 101 to a predetermined temperature below the Tg of the fixing polymer 109. The melting device 11 and the auxiliary melting device 13 concurrently cause heating. When the heat applied by the melting device 11 can heavily influence the temperature of the object 101, the target temperature that is to be achieved by using the auxiliary melting device 13 may be the temperature of a predetermined portion of the auxiliary melting device 13, rather than the temperature of the object 101.

Where appropriate, the target temperature that is to be achieved by using the auxiliary melting device 13 may be understood as analogous to the target temperature that is to be achieved by using the dryer 9. For example, the target temperature that is to be achieved by using the auxiliary melting device 13 may be lower than the Tg of the fixing polymer 109 and may be as high as possible without equaling or exceeding the Tg of the fixing polymer 109. Given that the target temperature that is to be achieved by using the auxiliary melting device 13 is lower than the Tg of the fixing polymer 109, the target temperature may be equal to or higher than 50° C. and lower than 120° C., may be equal to or higher than 60° C. and lower than 120° C., or may be equal to or higher than 70° C. and lower than 120° C. In other words, given that the Tg of the fixing polymer 109 is higher than the target temperature that is to be achieved by using the auxiliary melting device 13, the difference between the Tg of the fixing polymer 109 and the target temperature may be equal to or more than 1° C. and equal to or less than 50° C., may be equal to or more than 1° C. and equal to or less than 30° C., and may be equal to or more than 1° C. and equal to or less than 10° C.

(UV Irradiation by Melting Device)

As mentioned above, the temperature in a region being part of the object 101 (the ink 103) and located immediately anterior to the melting device 11 may be set to a desired value, and/or the temperature in a region being part of the object 101 (the ink 103) and heated by the auxiliary melting device 13 may be set to a desired value. The intensity of UV rays emitted by the melting device 11 and the irradiation time (the irradiation distance in the D1 direction) may be set to desired values to ensure that the temperature of the fixing polymer 109 can be heated to its Tg or above.

The following describes examples of estimations of the temperature rise caused by UV irradiation.

The temperature rise in resin containing carbon black (pigment) serving as the coloring agent 107 is estimated. Conditions (assumptions) for the estimations are as follows. Particles of the coloring agent 107 are 70 nm cubes. The coloring agent 107 has a concentration of 2200 kg/m$^3$. The coloring agent 107 has a specific heat of 691 J/kgK. As the coloring agent 107, 5200 particles are contained in 0.8 pL of resin. The resin has a concentration of 1060 kg/m$^3$. The resin has a specific heat of 1340 J/kgK. The intensity of UV irradiation is 352 kW/m$^2$, 80% of which is to be converted into heat. Heat is to be trapped in the resin. The initial temperature prior to UV irradiation is set to 25° C. (Case 1) and 50° C. (Case 2).

Figure 8A:
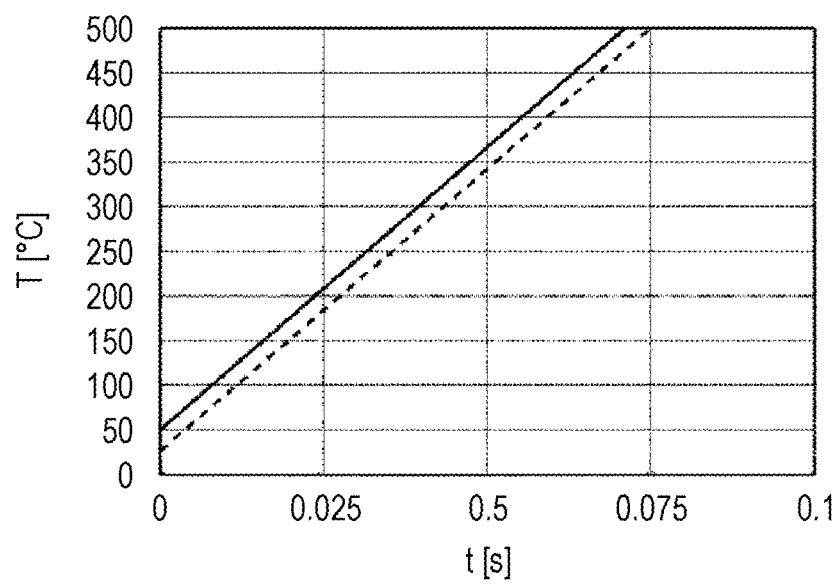
FIG. 8A is a graph for explanation of estimations of temperature variations in a resin heated by UV irradiation.

FIG. 8A is a graph illustrating temperature variations in the 0.8 pL of resin under the aforementioned conditions. The horizontal axis of the graph represents the UV irradiation time t (µs). The vertical axis of the graph represents the temperature T (° C.). Temperature variations with the initial temperature at 25° C. are denoted by a broken line, and temperature variations with the initial temperature at 50° C. are denoted by a solid line.

As can be seen in the graph, the temperature of the resin containing the coloring agent 107 reaches and exceeds the Tg of the fixing polymer 109 in a relatively short time. More specifically, the temperature of the resin increases from 50° C. to 120° C. in about 0.01 s.

The temperature rise in water containing the resin is estimated. Conditions (assumptions) for the estimations are as follows. The ink is a mixture of 1.2 pL of water and the 0.8 pL of resin (in which 5200 particles are contained as the coloring agent 107). The water has a concentration of 1000 kg/m$^3$. The water has a specific heat of 4180 J/kgK. Heat is to be trapped in the ink. The initial temperature prior to UV irradiation is set to 25° C. (Case 1) and 50° C. (Case 2).

Figure 8B:
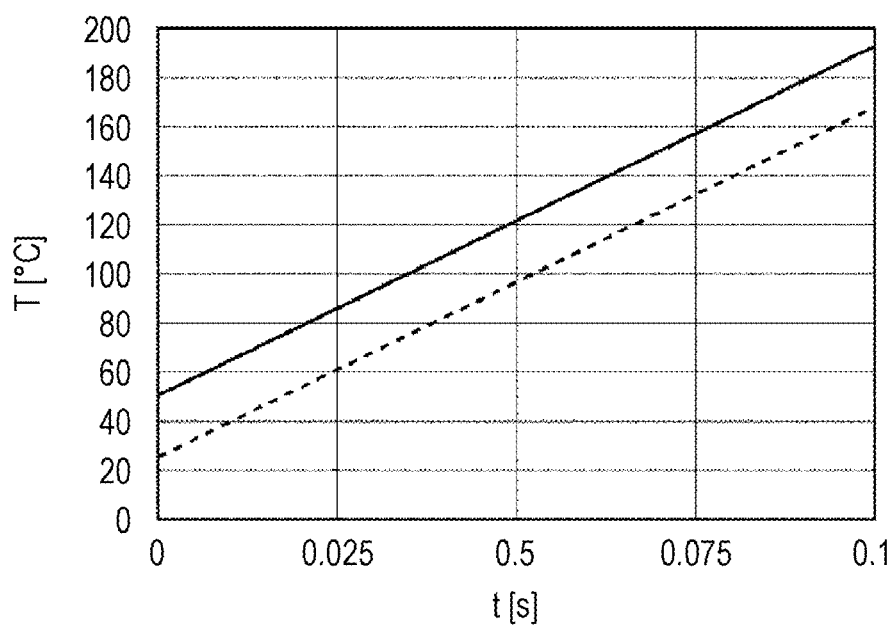
FIG. 8B is a graph for explanation of estimations of temperature variations in water containing the resin in FIG. 8A.

FIG. 8B is a graph illustrating temperature variations in the water (in the whole of the ink) under the aforementioned conditions. The horizontal axis of the graph represents the UV irradiation time t (µs). The vertical axis of the graph represents the temperature T (° C.). Temperature variations with the initial temperature at 25° C. are denoted by a broken line, and temperature variations with the initial temperature at 50° C. are denoted by a solid line.

As can be seen in the graph, the temperature of the ink reaches and exceeds the Tg of the fixing polymer 109 in a relatively short time. More specifically, the temperature of the ink increases from 50° C. to 120° C. in about 0.05 s.

In this way, the temperature of the ink can be estimated from the intensity of UV irradiation and the irradiation time. Conversely, the intensity of UV irradiation and the irradiation time (the irradiation distance in the D1 direction) can be set in such a way as to attain a desired temperature and/or a desired change in temperature. For example, the desired change in temperature means that the ink 103 heated (to a temperature below the Tg of the fixing polymer 109) by the dryer 9 and/or the auxiliary melting device 13 is further heated to a desired temperature (e.g., to a temperature equal to or higher than the Tg of the fixing polymer 109).

It is found from the example estimations that the ink 103 can be heated to a desired temperature in a relatively short time (e.g., in 0.05 s or less) by means of UV irradiation.

According to the example estimations, it takes about 0.05 s to heat the ink 103 to 120° C., whereas it takes about 0.01 s to heat the mixture of resin and the coloring agent 107 to 120° C. This indicates that the UV irradiation causes a local temperature rise. When viewed from another perspective, hating the ink 103 by using not only the melting device 11 but also the dryer 9 and/or the auxiliary melting device 13 can reduce the local temperature increase.

(Example Dimensions of Devices)

The printing apparatus 1 and various devices included in the printing apparatus 1 may have desired dimensions, and the relative positions of (the distance between) the devices may be set as desired. The ink 103 in the present embodiment is dried and fixed to the object 101 in an efficient manner. This feature makes it easier to shorten the entire length of the printing apparatus 1 or, more specifically, the distance between the ink ejector 7 and the take-up roller 3B.

The dimensions may fall within the following ranges. These ranges are examples; that is, the dimensions may fall outside these ranges.

The entire length of the printing apparatus 1 in the (D1) direction in which the object 101 is conveyed may be not less than 1 m and not more than 5 m. The distance between the axis of the feed roller 3A and the axis of the first heat roller 17A in the D1 direction may be not less than 200 mm and not more than 600 mm. The diameter of the first heat roller 17A (and the second heat roller 17B) may be not less than 20 mm and not more than 100 mm. The distance between the axis of the first heat roller 17A and the front end of the ink ejector 7 in the D1 direction may be not less than 200 mm and not more than 600 mm. The distance between the front end of the ink ejector 7 and the rear end of the ink ejector 7 in the D1 direction may be not less than 300 mm and not more than 900 mm. The distance between the rear end of the ink ejector 7 and the front end of the melting device 11 or the axis of the second heat roller 17B in the D1 direction may be not less than 200 mm and not more than 600 mm. The distance between the front end of the melting device 11 and the rear end of the melting device 11 in the D1 direction may be not less than 5 mm and not more than 30 mm Given that a cooler (not illustrated) that cools the object 101 (the ink 103) is provided, the distance between the rear end of the melting device 11 and the axis of the take-up roller 3B in the D1 direction may be not less than 300 mm and not more than 900 mm. The speed of conveyance of the object 101 is not less than 50 mm/min and not more than 300 mm/min, in which case the conveyance speed is compatible with the aforementioned dimensional ranges.

The present embodiment described above can be summarized as follows. The ink 103 contains the medium 105, the coloring agent 107, the fixing polymer 109, and one or more kinds of polymers (e.g., the first polymer 111) other than the fixing polymer 109. The coloring agent 107 is dissolved or dispersed in the medium 105. The fixing polymer 109 has a glass-transition temperature (Tg) higher than the ordinary temperature and is dispersed in the medium 105. The one or more kinds of polymers other than the fixing polymer 109 each have a Tg higher than the ordinary temperature and are dissolved or dispersed in the medium 105. The fixing polymer 109 is higher in Tg than 80 mass % or more of the one or more kinds of polymers contained in the ink 103 and each having a Tg higher than the ordinary temperature.

Thus, the Tg of the fixing polymer 109 is relatively high. In a case where the Tg of the fixing polymer 109 is low, the fixing polymer 109 in a molten state can be formed into a coating that will inhibit the evaporation of the medium 105. The present embodiment, in which the Tg of the fixing polymer 109 is high, reduces the possibility that the evaporation of the medium 105 will be inhibited by such a coating. This feature reduces the time it takes the ink 103 to be dried and fixed.

The fixing polymer 109 may be higher in Tg than the entirety of the one or more kinds of polymers contained in the ink 103.

This feature further reduces the possibility that the fixing polymer 109 will be formed into a coating that can inhibit the evaporation of the medium 105.

The medium 105 may contain water and an organic solvent.

As mentioned above, the evaporation of the medium 105 is expedited when a polymer with a high Tg is used as the fixing polymer. This effect is further brought into play when water, which is less evaporable than typically used organic solvents, is contained in the medium 105. The organic solvent contained in the medium 105 has the effect to keeping the medium 105 from drying out prior to ejection and/or enables adjustment of the drying speed of the medium 105 after the ejection of the ink. This feature provides the ease of ensuring that the medium 105 can evaporate in an expected period of time.

While the fixing polymer 109 is higher in Tg than 80 mass % or more of the one or more kinds of polymers contained in the ink 103 and each having a Tg higher than the ordinary temperature, the difference between the Tg of the fixing polymer 109 and the Tg of 80 mass % or more of the one or more kinds of polymers (i.e., the Tg lower than the Tg of the fixing polymer) may be equal to or more than 40° C. and equal to or less than 60° C.

In a case where there is little difference in Tg between the fixing polymer 109 and the other polymer(s), the melting of the fixing polymer 109 is more likely to melt during the evaporation of the medium 105. This increases the possibility that the evaporation of the medium 105 will be inhibited. For this reason, it will take the medium 105 quite some time to evaporate. In a case where there is a significant difference in Tg between the fixing polymer 109 and the other polymer(s); that is, in a case where the Tg of the fixing polymer 109 is too high, it will take quite some time to heat the fixing polymer 109 to its Tg. Furthermore, it will take quite some time to cause the fixing polymer 109 in a molten state to cool and solidify. In short, it will take quite some time to dry and fix the ink. These difficulties are less likely to arise when the difference in Tg falls within the aforementioned range.

With the fixing polymer 109 being higher in Tg than 80 mass % or more of the one or more kinds of polymers contained in the ink 103 and each having a Tg higher than the ordinary temperature, the one or more kinds of polymers may include a dispersant polymer. The dispersant polymer may account for 80 mass % or more of the one or more kinds of polymers contained in the ink 103 and each having a Tg higher than the ordinary temperature and lower than the Tg of the fixing polymer 109.

The dispersant polymer is dispersed in the medium 105 until the time when the medium 105 fully evaporates. The dispersant polymer is thus less likely to be formed into a coating. For example, the ink 103 is heated to a temperature higher than the Tg of the dispersant polymer, in which case the possibility that the evaporation of the medium 105 will be inhibited by a coating is lower than in the case where the ink 103 is heated to a temperature higher than the Tg of the fixing polymer. Thus, this feature enhances the effect of heating the ink 103 to a relatively high temperature before the fixing polymer 109 is formed into a coating; that is, the medium 105 can evaporate in a more efficient manner.

The present embodiment described above can also be summarized as follows. The printing apparatus 1 includes the ink ejector 7, the dryer 9, and the melting device 11. The ink ejector 7 may eject the ink 103 to the object 101. The dryer 9 may heat the object 101 to expedite evaporation of the medium 105. The melting device 11 may heat the ink 103 on the object 101 to cause the fixing polymer 109 to melt and to fix the ink 103 (the coloring agent 107) to the object 101 accordingly.

For example, a device dedicated to the purpose of causing the medium 105 to evaporate and a device dedicated to the purpose of transforming the fixing polymer 109 into a molten state may be included in the printing apparatus. This leads to the speeding-up of the process of fixing the ink 103, the enhanced efficiency of fixing the ink 103, and/or the improved quality of the ink 103 or the like. More specifically, the dryer 9 heats the object 101, in which case the object 101 rises in temperature in advance before the ink 103 lands on the object 101. Heating the object 101 in advance by using the dryer 9 enables the ink 103 to rise in temperature immediately upon contact with the object 101, thus causing the medium 105 to start evaporating. The melting device 11 heats the object 101, in which case the fixing polymer 109 rises in temperature before the applied heat is transferred to the object 101. This results in improved thermal efficiency. The ink 103 is subjected not only to heat applied by the melting device 11 but also to heat applied by the dryer 9 that heats the object 101 on which the ink 103 has landed. This approach reduces the possibility that the quality of the ink 103 and/or the object 101 will deteriorate due to excessive heating of a particular part. This approach also reduces the possibility that the object 101 will wrinkle and/or become deformed due to localized heating. As stated above, localized heating can cause wrinkles and/or deformation. This is one of the findings based on experiments conducted by the inventors in the present application.

The melting device 11 may be disposed downstream of the dryer 9 in the direction of conveyance of the object 101. When viewed from another perspective, the melting device 11 may cause the fixing polymer 109 to melt after the dryer 9 causes the medium 105 to evaporate.

For example, the melting device 11 causes the fixing polymer 109 to melt after the medium 105 at least partially evaporates. This feature further reduces the possibility that the fixing polymer 109 in a molten state will be formed into a coating that can inhibit the evaporation of the medium 105. The ink 103 can be dried and fixed in a short time accordingly.

The amount of heat to be applied to the object 101 by the dryer 9 (the target temperature that is to be achieved by using the dryer 9), the relative positions of (the distance between) the dryer 9 and the melting device 11, and the speed of conveyance of the object 101 may be set to values at which the medium 105 fully evaporates through the application of heat by the dryer 9 before the melting device 11 causes the fixing polymer 109 to melt.

This feature further reduces the possibility that the fixing polymer 109 will be formed into a coating that can inhibit the evaporation of the medium 105. This feature also reduces the possibility that bubbles will be formed in the fixing polymer 109 due to the evaporation of the medium 105. Thus, the ink 103 will be in higher quality after being fixed. More specifically, the development of bubbles that would cause a reduction of gloss can be inhibited.

The printing apparatus 1 may include the auxiliary melting device 13. The auxiliary melting device 13 may be located opposite the melting device 11 with the object 101 placed between the auxiliary melting device 13 and the melting device 11. The auxiliary melting device 13 may heat the back surface of the object 101 to aid in the melting of the fixing polymer 109. The back surface is opposite to the surface to which the ink 103 is ejected.

For example, the back surface of the object 101 is heated by the auxiliary melting device 13 while the front surface of the object is heated by the melting device 11 (e.g., through UV irradiation). This feature enables the object 101 to rise in temperature in a short time. It is still possible to cause the fixing polymer 109 to melt by means of, for example, UV irradiation only. Although such an approach falls within the technical scope of the present disclosure, the feature mentioned above is more advantageous in terms of reducing an excessive temperature rise in a particular part of the ink 103 and, by extension, the possibility that the ink 103 and/or the object 101 will diminish in quality.

The auxiliary melting device 13 may have a heating surface maintained at a predetermined temperature during contact with the back surface of the object 101. The heating surface may be an external circumferential surface of the second heat roller 17B. In other words, the auxiliary melting device 13 may heat the object 101 to the predetermined temperature. The melting device 11 may heat the ink on the object 101 to a temperature above the predetermined temperature.

Hating the object 101 to the predetermined temperature by using the auxiliary melting device 13 provides ease of reducing the possibility of an excessive temperature rise in a particular part. The amount of heat to be applied to the object 101 is adjusted by the auxiliary melting device 13 in accordance with temperature variations in the atmosphere in which the object 101 is placed. This eliminates the need for control concerning the melting device 11 (e.g., the need to adjust the intensity of UV irradiation or the irradiation time). The control concerning the melting device 11 is therefore simplified.

The dryer 9 may include the first portion 17a and the second portion 17b designed to repeatedly come into contact with the object 101 in an alternating manner to heat the object 101.

It is still possible to heat the object 101 by using a plate-like heater that slides over the object 101 (a plate-like heater in a continual contact with the object 101). Although such an approach falls within the technical scope of the present disclosure, the feature mentioned above is more advantageous in the following respect: heat loss caused by the contact with the object 101 can be at least partially compensated for by a temperature rise in the first portion 17a or the second portion 17b while it is not in contact with the object 101. As a result, the amount of heat production per unit volume of a heat-producing part of the heating wire or the like may be reduced, and the object 101 may be heated at a constant rate. The load borne by the heat-producing part may be reduced accordingly.

The dryer 9 may heat the object 101 to a temperature below the glass-transition temperature (Tg) of the fixing polymer 109. The melting device 11 may heat the ink 103 on the object 101 to a temperature equal to or higher than the Tg of the fixing polymer.

Through the addition of heat by the dryer 9 designed as above, the fixing polymer 109 hardly melts or only a little amount of the fixing polymer 109 melts. As a workaround, the melting device 11 causes the fixing polymer 109 to melt without fail. This feature further reduces the possibility that the fixing polymer 109 will be formed into a coating that can inhibit the evaporation of the medium 105.

When 80 mass % or more of the one or more kinds of polymers contained in the ink 103 and each having a Tg higher than the ordinary temperature is lower in Tg than the fixing polymer 109, the dryer 9 may heat the object 101 to a temperature equal to or higher than the Tg of the 80 mass % or more of the one or more kinds of polymers and lower than the Tg of the fixing polymer 109.

This means that the temperature of the ink 103 heated by the dryer 9 may be relatively high within a range not exceeding the Tg of the fixing polymer 109. Thus, the dryer 9 further expedites the evaporation of the medium 105, as mentioned above.

The dryer 9 may include a first dryer disposed upstream of the ink ejector 7 in the (D1) direction in which the object 101 is conveyed. In the present embodiment, the first dryer is the first heat roller 17A. When 80 mass % or more of the one or more kinds of polymers contained in the ink 103 and each having a Tg higher than the ordinary temperature is lower in Tg than the fixing polymer 109, the amount of heat to be applied by the first dryer, the relative positions of the first dryer and the ink ejector 7, and the speed of conveyance of the object 101 may be set by the manufacturer, the user, and/or the controller 15 to values at which the temperature in a region being part of the object 101 and being immediately anterior to a region facing the ink ejector 7 is equal to or higher than the Tg of the 80 mass % or more of the one or more kinds of polymers and lower than the Tg of the fixing polymer 109.

When the temperature in the region being part of the object 101 and being immediately anterior to the ink ejector 7 is lower than the Tg of the fixing polymer 109, the temperature of the ink 103 landing on the region will be less likely to reach the Tg of the fixing polymer 109. This feature provides ease of reducing the possibility that the fixing polymer 109 will be formed into a coating that can inhibit the evaporation of the medium 105. Meanwhile, the temperature in the region being part of the object 101 and being immediately anterior to the ink ejector 7 is relatively high. Thus, the ink 103 landing on the region will rise in temperature in a short time, and the evaporation of the medium 105 will be expedited accordingly.

The dryer 9 may be disposed upstream of the melting device 11 in the direction of conveyance of the object 101. When the 80 mass % or more of the one or more kinds of polymers contained in the ink 103 and each having a Tg higher than the ordinary temperature is lower in Tg than the fixing polymer 109, the amount of heat to be applied by the dryer 9 (the target temperature that is to be achieved by using the dryer 9), the relative positions of (the distance between) the dryer 9 and the melting device 11, and the speed of conveyance of the object 101 may be set by the manufacturer, the user, and/or the controller 15 to values at which the temperature in a region being part of the object 101 extending from immediately posterior to the dryer 9 to immediately anterior to a region facing the melting device 11 is equal to or higher than the Tg of the 80 mass % or more of the one or more kinds of polymers and lower than the Tg of the fixing polymer 109.

When the temperature in the region being part of the object 101 and extending from immediately posterior to the dryer 9 to immediately anterior to the melting device 11 is lower than the Tg of the fixing polymer 109, the fixing polymer 109 is less likely to be formed into a coating in the region concerned. Thus, the evaporation of the medium 105 is less likely to be inhibited by the coating. Meanwhile, the temperature in the region being part of the object 101 is relatively high. Thus, the evaporation of the medium 105 will be further expedited accordingly.

The melting device 11 may irradiate the ink 103 on the object 101 with UV rays to heat the ink 103.

The UV irradiation causes the coloring agent 107 to rise in temperature, and the fixing polymer 109 is heated accordingly. That is, the fixing polymer 109 is heated before the applied heat is transferred to the object 101. This results in improved thermal efficiency. The dryer 9 reduces the occurrence of localized heating of the ink 103. This effect is further brought into play when the ink 103 is subjected to UV irradiation, which would otherwise cause localized heating of the ink 103.

Second Embodiment

Figure 9:
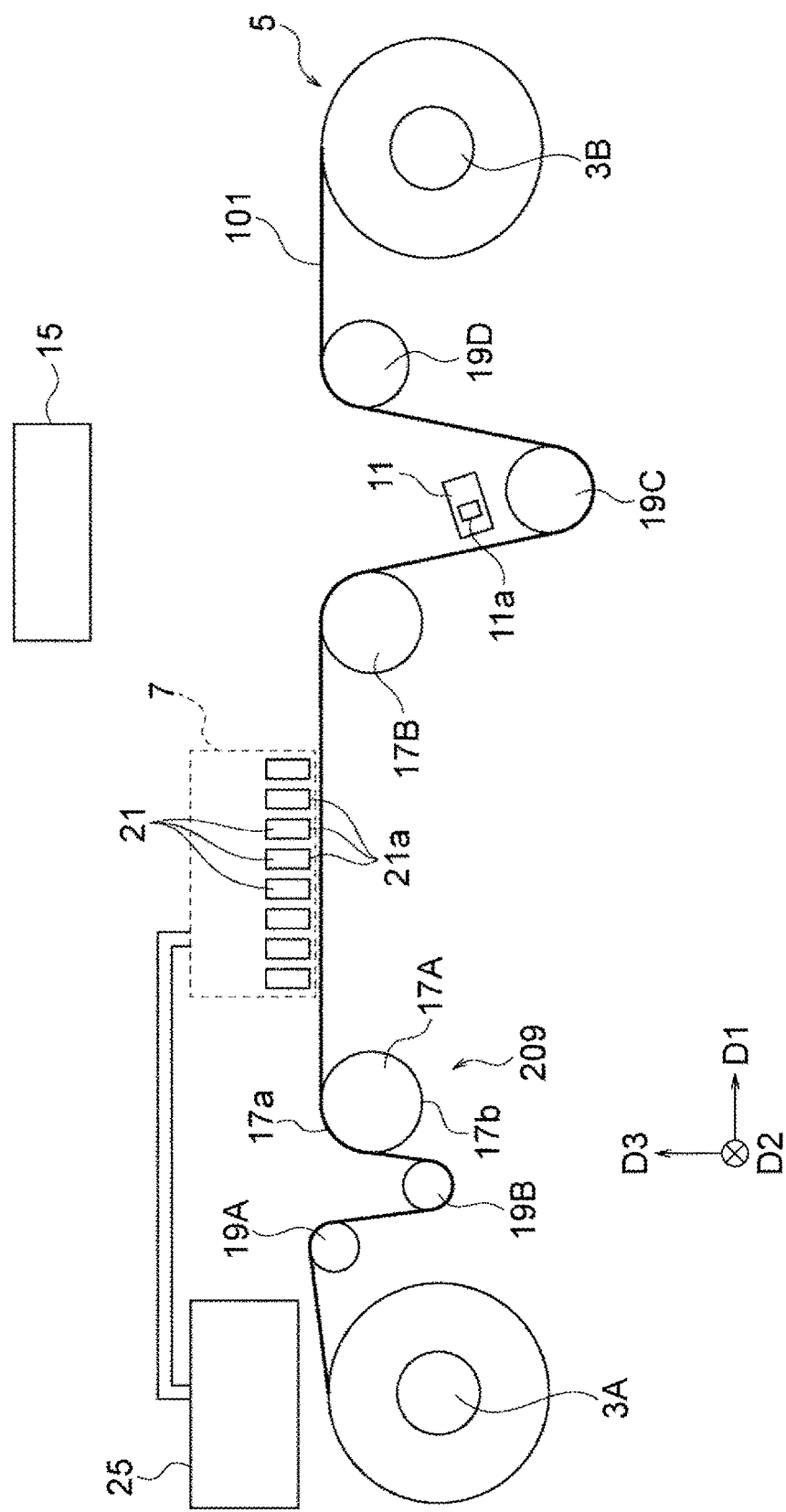
FIG. 9 is a side view of a printing apparatus according to a second embodiment.

FIG. 9 is a side view of a printing apparatus 201 according to a second embodiment and is analogous to FIG. 1 relevant to the first embodiment.

The melting device 11 included in the printing apparatus 201 is disposed downstream of the second heat roller 17B in the direction of conveyance of the object 101. In other words, the printing apparatus 201 does not include the auxiliary melting device 13 facing the melting device 11 with the object 101 placed between the auxiliary melting device 13 and the melting device 11. The first heat roller 17A and the second heat roller 17B constitute a dryer 209, which is disposed upstream of the melting device 11. That is, the dryer 209 includes a first dryer and a second dryer that are the first heat roller 17A and the second heat roller 17B, respectively.

Unless a contradiction arises, the control performed on the first heat roller 17A (the first dryer) in the present embodiment may be understood as analogous to the control performed on the first heat roller 17A (the dryer 9) in the first embodiment. Likewise, the target temperature that is to be achieved by using the first heat roller 17A (the first dryer) in the present embodiment may be understood as analogous to the target temperature that is to be achieved by using the first heat roller 17A (the dryer 9) in the first embodiment. In the present embodiment, the term "dryer 9" mentioned above in relation to the previous embodiment may be replaced with "dryer 209" or "first dryer" unless a contradiction arises.

Unless a contradiction arises, the control performed on the second heat roller 17B (the second dryer) in the present embodiment may be understood as analogous to the control performed on the first heat roller 17A (the dryer 9) in the first embodiment. Likewise, the target temperature that is to be achieved by using the second heat roller 17B (the second dryer) in the present embodiment may be understood as analogous to the target temperature that is to be achieved by using the first heat roller 17A (the dryer 9) in the first embodiment. In the present embodiment, the terms "dryer 9" and "first heat roller 17A" mentioned above in relation to the previous embodiment may be replaced respectively with "second dryer" and "second heat roller 17B" unless a contradiction arises. At the same time or alternatively, the following may hold. Unless a contradiction arises, the control performed on the second heat roller 17B (the second dryer) in the present embodiment may be understood as analogous to the control performed on the second heat roller 17B (the auxiliary melting device 13) in the first embodiment. Likewise, the target temperature that is to be achieved by using the second heat roller 17B (the second dryer) in the present embodiment may be understood as analogous to the target temperature that is to be achieved by using the second heat roller 17B (the auxiliary melting device 13) in the first embodiment. In the present embodiment, the term "auxiliary melting device 13" mentioned above in relation to the previous embodiment may be replaced with "second dryer" unless a contradiction arises.

For example, the amount of heat to be applied to the object 101 by the dryer 209 or the second heat roller 17B (the second dryer), the relative positions of the dryer 209 or the second heat roller 17B and the melting device 11, and the speed of conveyance of the object 101 may be set to values at which the medium 105 fully evaporates through the application of heat by the dryer 209 or the second heat roller 17B before the melting device 11 causes the fixing polymer 109 to melt. When the first polymer 111 (or 80 mass % or more of the one or more kinds of polymers contained in the ink 103 and each having a Tg higher than the ordinary temperature) is lower in Tg than the fixing polymer 109, the amount of heat to be applied by the dryer 209 or the second dryer, the relative positions of the second dryer and the melting device 11, and the speed of conveyance of the object 101 may be set to values at which the temperature in a region being part of the object 101 and extending from immediately posterior to the dryer 209 (from immediately posterior to the second dryer) to immediately anterior to a region facing the melting device 11 is equal to or higher than the Tg of the first polymer 111 (or the 80 mass % or more of the one or more kinds of polymers) and lower than the Tg of the fixing polymer 109.

As with the previous embodiment, the present embodiment described above involves the following feature. The printing apparatus 1 includes the ink ejector 7, the dryer 209, and the melting device 11. The ink ejector 7 ejects the ink 103 to the object 101. The ink 103 contains the medium 105 and the fixing polymer 109. The dryer 209 heats the object 101 to expedite evaporation of the medium 105. The melting device 11 heats the ink 103 on the object 101 to cause the fixing polymer 109 to melt and to fix the ink 103 (the coloring agent 107) to the object 101 accordingly.

This feature produces effects equivalent to those produced in the first embodiment. More specifically, a device dedicated to the purpose of causing the medium 105 to evaporate and a device dedicated to the purpose of transforming the fixing polymer 109 into a molten state may be included in the printing apparatus. This leads to the speeding-up of the process of fixing the ink 103, the enhanced efficiency of fixing the ink 103, and/or the improved quality of the ink 103 or the like.

As described above in relation to the present embodiment, the dryer 209 may include the first dryer (the first heat roller 17A) and the second dryer (the second heat roller 17B) disposed upstream and downstream, respectively, of the ink ejector 7 in the direction of conveyance of the object 101. The melting device 11 may be disposed downstream of the second dryer.

Heating the object 101 in advance by using the first heat roller 17A before the ink 103 lands on the object 101 enables the ink 103 to rise in temperature quickly upon contact with the object 101. Heating the object 101 by using the second heat roller 17B after the ink 103 lands on the object 101 enables the medium 105 to evaporate quickly. It is thus easy to cause the medium 105 to evaporate fully before being irradiated with UV rays emitted by the melting device 11.

The first embodiment is more advantageous than the second embodiment in the following respects. The second heat roller 17B can contribute more to the process by which the temperature of the fixing polymer 109 is increased to its Tg or above. The workload of the melting device 11 can be further lightened accordingly. Supposing the distance between the ink ejector 7 and the second heat roller 17B is unchangeable due to constraints on the mechanism design, the first embodiment provides greater ease of shortening the entire length of the printing apparatus 1 than the second embodiment.

Third Embodiment

Figure 10:
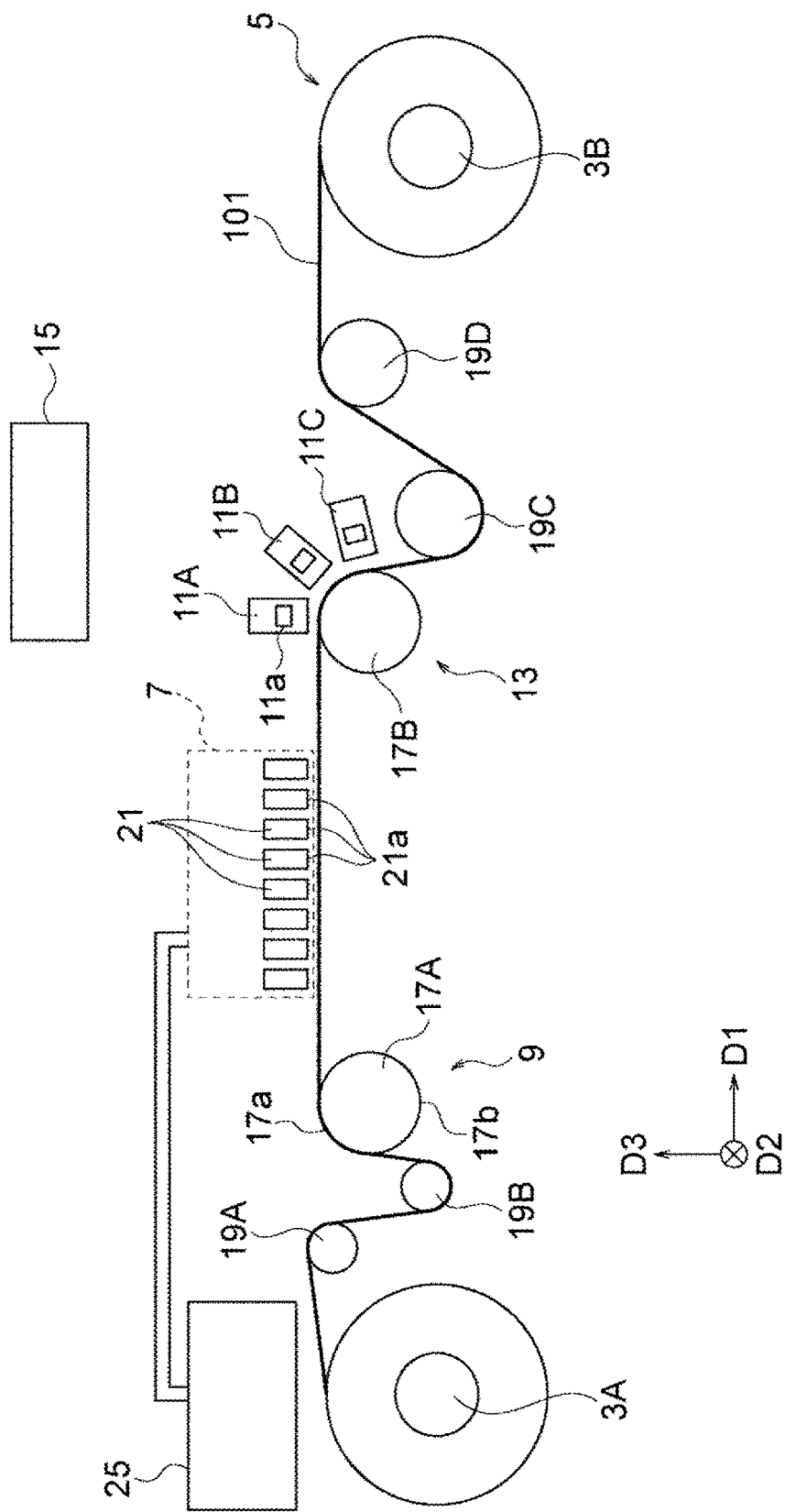
FIG. 10 is a side view of a printing apparatus according to a third embodiment.

FIG. 10 is a side view of a printing apparatus 301 according to a third embodiment and is analogous to FIG. 1 relevant to the first embodiment.

The printing apparatus 301 includes more than one melting device. In the illustrated example, the printing apparatus 301 includes three melting devices, which are denoted by 11A, 11B, and 11C, respectively. The melting devices 11A, 11B, and 11C each may be basically identical or similar to the melting device 11 in the first embodiment (except for design specifications, such as dimensions). The melting devices may be hereinafter also simply denoted by 11 (without A to C) when there is no need to distinguish one from another. The three melting devices 11 may be regarded as one melting device.

The melting devices 11 are in different positions in the direction of conveyance of the object 101. Regions being part of the object 101 and irradiated with UV rays emitted by the respective melting devices 11 may be discretely located away from each other in the conveyance direction, may be adjacent to each other with substantially no gap therebetween in the conveyance direction, or may overlap each other in the conveyance direction.

The melting devices 11 are arranged along a region where the object 101 is bent with its front surface being curved convexly by the second heat roller 17B. The melting devices 11 irradiate mostly the curved region with UV rays in directions normal to the respective portions of the curved region of the object 101. That is, the curved region of the object 101 is irradiated with UV rays emitted in multiple directions normal to the curved region. Referring to FIG. 10, the curved region of the object 101 is irradiated with UV rays emitted by the three melting devices, namely, the melting devices 11A, 11B, and 11C. Alternatively, more than three melting devices 11 at a greater distance from the object 101 may be disposed. The curved region of the object 101 can thus be irradiated with UV rays emitted by a larger number of melting devices 11. As mentioned above, a region being part of the object 101 and curved convexly is irradiated with UV rays, in which case a large number of melting devices 11 may be disposed to irradiate a particular region of the object 101 with UV rays at nearly right angles to the region. This feature enables an increase in the energy density of UV irradiation such that the fixing polymer 109 can melt in a short time.

In another example (not illustrated), the melting devices 11 are arranged along a linear region of the object 101 to irradiate the linear region with UV rays. In the previous example, UV rays are emitted to the object 101 to irradiate a region that is bent with its surface being curved convexly. The region concerned may be bent by a roller other than the second heat roller 17B or may be bent by two or more rollers.

In another example (not illustrated), the curved region of the object 101 may be irradiated with UV rays emitted in multiple directions normal to the curved region without using multiple melting devices 11. In this case, one melting device 11 may extend along the curved region of the object 101. More specifically, two or more light sources 11a may be arranged along the curved region of the object 101, and a reflector, a diaphragm, and/or a power supply circuit may be disposed in such a manner as to be shared with the light sources 11a. The reflector and/or the diaphragm may be shaped in conformance with the curved region of the object 101. The light sources 11a may be provided for the respective melting devices 11. In this case, the reflector, the diaphragm, and/or the power supply may be regarded as being shared by the melting devices 11. Alternatively, one melting device 11 including a surface light source may be disposed. In this case, the surface light source, which is an example of the light source 11a, is curved and includes LEDs arranged along the curved region of the object 101. The LEDs are also examples of the light source 11a.

The two or more melting devices 11 may be identical to each other or different from each other in terms of specifics concerning the wavelength of UV rays, the intensity of UV rays, and/or how long a region being part of the object 101 and irradiated with UV rays at a time is in the conveyance direction.

For example, some or all of the melting devices 11 may be configured to emit UV rays of the same wavelength. The region that can be irradiated with UV rays at a time by the melting devices 11 concerned may be longer in the direction of conveyance of the object 101 than the region that can be irradiated with UV rays at a time by one melting device 11. It is therefore possible to convey the object 101 at a faster speed while the time period over which UV rays are emitted to the same spot on the object 101 is long enough to cause the fixing polymer 109 to melt. When viewed from another perspective, this feature increases the design flexibility needed to ensure that the irradiation distance (time) of the melting devices 11 is long enough to cause the fixing polymer 109 to melt.

Alternatively, some or all of the melting devices 11 may be configured to emit UV rays of different wavelengths. UV rays of a certain wavelength can be absorbed in a greater amount by the ink; that is, irradiating the ink with UV rays of a certain wavelength enables generation of a greater amount of heat, where the wavelength concerned varies depending on the color of the ink 103 (the kind of the coloring agent 107). This will be described later in relation to variations of the ink. When being a color printer, the printing apparatus 1 may include melting devices 11 provided for the respective colors and configured to emit UV rays of wavelengths at which a greater amount of heat can be generated. In this case, inks 103 of different colors can be heated uniformly.

As with the melting devices configured to irradiate the curved region of the object 101 with UV rays, the melting devices 11 (light sources 11a) that emit UV rays of different wavelengths may share a reflector, a diaphragm, and/or a power supply circuit and may be regarded as one melting device. LEDs (examples of the light sources 11a) configured to emit UV rays of different wavelengths and arranged mixedly may constitute one surface light source, which is an example of the light sources 11a.

As with the previous embodiments, the present embodiment described above involves the following feature. The printing apparatus 301 includes the ink ejector 7, the dryer 9, and the melting device 11. This feature produces effects equivalent to those produced in the first embodiment. More specifically, a device dedicated to the purpose of causing the medium 105 to evaporate and a device dedicated to the purpose of transforming the fixing polymer 109 into a molten state may be included in the printing apparatus. This leads to the speeding-up of the process of fixing the ink 103, the enhanced efficiency of fixing the ink 103, and/or the improved quality of the ink 103 or the like.

The printing apparatus 301 may include the conveyor 5 configured to convey the object 101 and to bend at least part of the object 101 being conveyed. The surface to which the ink 103 is ejected is curved convexly. One or more melting devices 11 may emit UV rays to a region being part of the object 101 and bent by the conveyor 5 or, more specifically, by the second heat roller 17B.

With the external circumference side being greater in area than the internal circumference side, the region in which or more melting devices 11 are disposed is greater than the region being part of the object 101 and irradiated with UV rays. A relatively small region in the object 101 may thus be irradiated with UV rays emitted in multiple directions normal to the region. This feature enables an increase in the energy density such that the ink 103 can rise in temperature in a short time. The region that can be irradiated with UV rays extends not only in the D1 direction but also in other directions. This feature makes it easier to shorten the length of the printing apparatus 1.

The printing apparatus 301 may include a plurality of light sources 11a constituting one or more melting devices 11. The plurality of light sources 11a are configured to emit UV rays of different wavelengths.

As in the aforementioned case in which the printing apparatus 1 is a color printer, light sources 11a may be provided for the respective colors and may be configured to emit UV rays of wavelengths at which a greater amount of heat can be generated. In this case, inks 103 of different colors can be heated uniformly. This feature reduces the possibility that a specific ink 103, namely, an ink of a specific color will be heated too much or too little. Thus, the inks 103 and/or the object 101 will be in higher quality. When viewed from another perspective, the function of causing the fixing polymer 109 to melt is less dependent on the color of the ink 103 and thus gains adaptability to a wider variety of printing apparatuses, such as monochrome printers and color printers.

Fourth Embodiment

Figure 11:
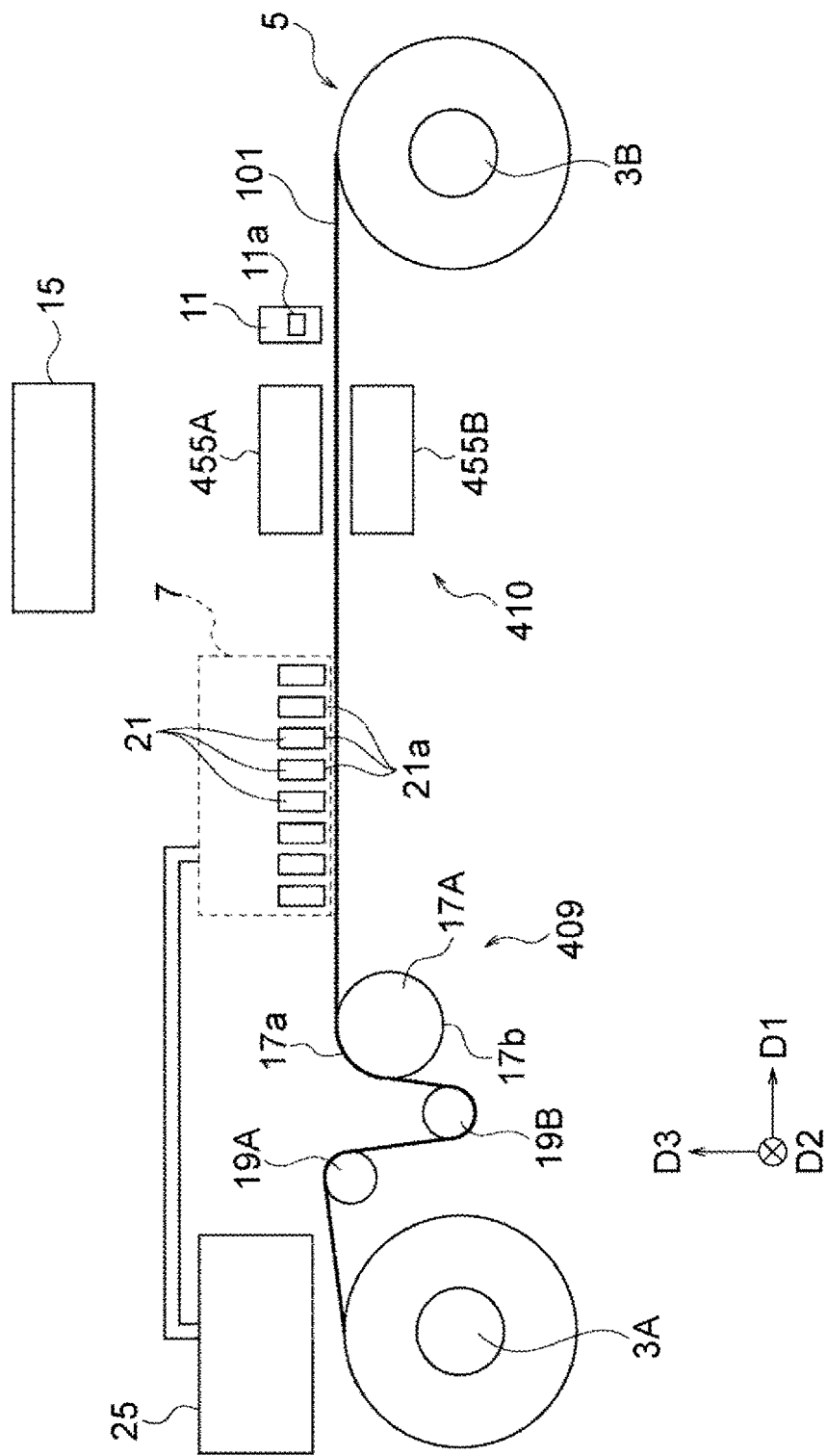
FIG. 11 is a side view of a printing apparatus according to a fourth embodiment.

FIG. 11 is a side view of a printing apparatus 401 according to a fourth embodiment and is analogous to FIG. 1 relevant to the first embodiment.

The printing apparatus 401 includes a dryer 409, which is analogous to the dryer 209 in the second embodiment in the following respect: the dryer 409 includes a first dryer (the first heat roller 17A) disposed upstream of the ink ejector 7 and a second dryer disposed between the ink ejector 7 and the melting device 11. The second dryer in the present embodiment is denoted by 410 and is configurationally different from the second dryer (the second heat roller 17B) in the second embodiment.

More specifically, the second dryer 410 may be a warm air dryer that ejects a jet of warm air to the object 101. The second dryer 410 in the illustrated example includes a front dryer 455A and a back dryer 155B. The front dryer 455A ejects a jet of warm air to the front surface of the object 101, and the back dryer 455B ejects a jet of warm air to the back surface of the object 101. The front dryer 455A and the back dryer 455B may be hereinafter also simply referred to as dryers 455 when there is no need to distinguish one from another. The second dryer 410 may include the front dryer 455A or the back dryer 455B only.

For example, the dryers 455 each include a heat source and a blower (not illustrated). Gas around the heat source is blown out by the blower. The heat source may be similar to the first heat roller 17A; that is, the heat source may be a heating wire, an induction coil, or a channel through which a heating medium flows. The blower may include a fan and a motor that rotates the fan. The dryers 455 each may include a duct through which the gas flown out by the fan flows to the object 101. Alternatively, one heat source may be provided, and gas around the heat source may be guided by a duct to both the front surface and the back surface of the object 101. The gas blown out to the object 101 may be air.

Unless a contradiction arises, the control performed on the dryer 409 or the second dryer 410 in the present embodiment may be understood as analogous to the control performed on the dryer 9 (the first heat roller 17A) in the first embodiment and/or the control performed on the second dryer (the second heat roller 17B) in the second embodiment. Likewise, the target temperature that is to be achieved by using the dryer 409 or the second dryer 410 in the present embodiment may be understood as analogous to the target temperature that is to be achieved by using the dryer 9 (the first heat roller 17A) in the first embodiment and/or the target temperature that is to be achieved by using the second dryer (the second heat roller 17B) in the second embodiment.

For example, the amount of heat to be applied to the object 101 by the dryer 409 or the second dryer 410, the relative positions of the dryer 409 or the second dryer 410 and the melting device 11, and the speed of conveyance of the object 101 may be set to values at which the medium 105 fully evaporates through the application of heat by the dryer 409 or the second dryer 410 before the melting device 11 causes the fixing polymer 109 to melt. When the first polymer 111 (or 80 mass % or more of the one or more kinds of polymers contained in the ink 103 and each having a Tg higher than the ordinary temperature) is lower in Tg than the fixing polymer 109, the amount of heat to be applied by the dryer 409 or the second dryer 410, the relative positions of the second dryer 410 and the melting device 11, and the speed of conveyance of the object 101 may be set to values at which the temperature in a region being part of the object 101 and extending from immediately posterior to the dryer 409 (from immediately posterior to the second dryer 410) to immediately anterior to a region facing the melting device 11 is equal to or higher than the Tg of the first polymer 111 (or the 80 mass % or more of the one or more kinds of polymers) and lower than the Tg of the fixing polymer 109.

As with the other dryers, the second dryer 410 may be subjected to open loop control or feedback control. When the feedback control is performed, the temperature sensor configured to determine the temperature of the object 101 may determine the temperature of the object 101 itself, the ambient temperature of the environment in which the object 101 is placed, or the temperature of a desired portion of the second dryer 410. When the second dryer 410 is a warm air dryer, the temperature sensor may be configured to determine the temperature of gas blown out to the object 101.

As with the other dryers, the second dryer 410 may be subjected to control of power that is supplied to the heat sources. When the second dryer 410 is a warm air dryer, the amount of air that is blown out by the second dryer 410 may be controlled.

As with the previous embodiments, the present embodiment described above involves the following feature. The printing apparatus 401 includes the ink ejector 7, the dryer 409, and the melting device 11. This feature produces effects equivalent to those produced in the first embodiment. More specifically, a device dedicated to the purpose of causing the medium 105 to evaporate and a device dedicated to the purpose of transforming the fixing polymer 109 into a molten state may be included in the printing apparatus. This leads to the speeding-up of the process of fixing the ink 103, the enhanced efficiency of fixing the ink 103, and/or the improved quality of the ink 103 or the like.

The dryer 409 (the second dryer 410) may include a warm air dryer that blows out heated gas. The second dryer is simpler in this case than in the second embodiment, in which the second dryer is the second heat roller 17B. Meanwhile, higher energy efficiency is achieved in the second embodiment. The reason for this is that dissipation of heat from the object 101 is inhibited more in the second embodiment than in the present embodiment.

(Variations Concerning Ink Set)

Given that inks 103 of different colors are included in an ink set and are to be irradiated with UV rays of the same wavelength, the following describes variations concerning the ink set. The wavelength concerned is herein also referred to as a specific wavelength. With regard to the following variations, the ink set is intended for use with a color printer including one or more melting devices 11 (one or more light sources 11a) that emit UV rays of the same wavelength. The variations concerning the ink set may be adopted into a color printer capable of emitting UV rays of different wavelengths.

Figure 12A:
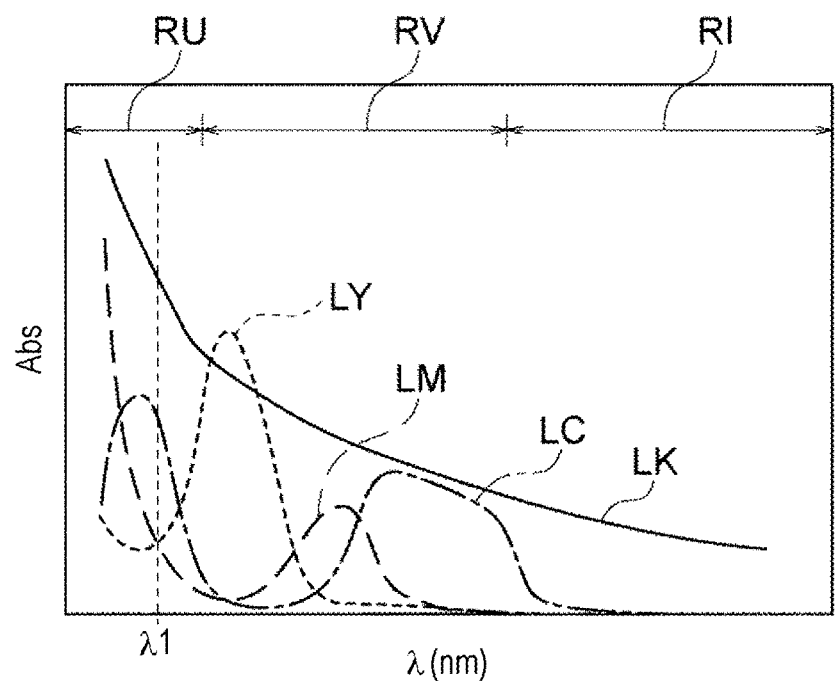
FIG. 12A is a graph schematically illustrating light absorption properties of inks in an example in which the inks are of different colors.

FIG. 12A is a graph schematically illustrating light absorption properties of inks 103 in an example in which the inks 103 are of different colors. FIG. 12A concerns the inks 103 in the embodiments described above, not the inks 103 in the variations.

The horizontal axis of the graph represents the wavelength $\lambda$ (in units of nm). The vertical axis of the graph represents the absorbance Abs, which is a dimensionless quantity. RU denotes the UV wavelength range. RV denotes the visible light wavelength range. RI denotes the infrared wavelength range. LY denotes a line representing the properties of an ink 103 or, more specifically, of a yellow ink. LM denotes a line representing the properties of an ink 103 or, more specifically, of a magenta ink. LC denotes a line representing the properties of an ink 103 or, more specifically, of a cyan ink. LK denotes a line representing the properties of an ink 103 or, more specifically, of a black ink. The graph deals with inks of four different colors with the same optical path length.

The absorbance may be the logarithm (with base 10) of the ratio of the intensity of incident light to the intensity of emitted light. The absorbance may be determined with or without consideration given to reflection and scattering. For convenience, influence exerted on the absorbance by reflection and scattering will be disregarded in the following example.

As can be seen in the graph, the absorbance of each ink 103 varies with the wavelength of light. In other words, the amount of heat generated in each ink 103 irradiated with light (e.g., UV rays) varies with the wavelength of light. There is no uniformity among the inks 103 of different colors in terms of the way in which the absorbance (the amount of heat) varies. The color differences among the inks 103 arise from differences in the material and/or content (mass %) of the coloring agent 107. When the material and/or content of the coloring agent 107 is not uniform among the inks 103, the amount of heat generated by UV irradiation varies from ink to ink. The illustrated example suggests that in terms of the UV absorbance at the specific wavelength Xl, the black ink is on top, second is the cyan ink, followed by the yellow ink and the magenta ink, which exhibit a low absorbance. In this case, the black ink can be heated excessively; conversely, the yellow ink and the magenta ink can be heated insufficiently.

As a workaround, a UV-absorbing agent other than the coloring agent 107 may be added to at least one of the inks 103 included in the ink set. This is an approach for enabling the inks 103 of different colors to achieve the same level of heating value through UV irradiation (emission of UV rays of a predetermined wavelength) from the melting device 11. For example, the UV-absorbing agent other than the coloring agent 107 may be added in such a manner that the percentage content of the UV-absorbing agent in at least one of the inks 103 is not equal to the percentage content of another ink 103, which does not necessarily contain the UV-absorbing agent. With this approach, the percentage content of the UV-absorbing agent may be adjusted in such a way as to reduce the differences among the inks 103 in the amount of heat generated through UV irradiation from the melting device 11.

When at least two inks 103 are irradiated with UV rays emitted by the melting device 11, the coloring agent 107 contained in one of the inks 103 may have a lower UV absorptance than the coloring agent 107 contained in the other ink 103. The percentage content of the UV-absorbing agent in the ink 103 concerned may be higher than the percentage content of the UV-absorbing agent in the other ink 103. The other ink 103 does not necessarily contain the UV-absorbing agent. The term "specific wavelength Xl" with regard to the comparisons made on the UV absorptance may be interpreted as the center wavelength in the wavelength range of UV rays emitted by the melting device 11. The magnitude relationship of the absorptance of the coloring agent 107 may be interpreted as the magnitude relationship of the molar absorption coefficient (molar extinction coefficient) of the coloring agent 107. Alternatively, the magnitude relationship of the absorptance of the coloring agent 107 may be interpreted as the magnitude relationship of the absorbance between solutions of similar concentrations, where the coloring agent 107 is dispersed in solvent (e.g., water). The value of the molar absorption coefficient mentioned above is specific to the coloring agent 107, and there is not much difference among the inks 103 in terms of the concentration of the coloring agent 107. With this approach, the percentage content of the UV-absorbing agent may be adjusted in such a way as to further reduce the differences among the inks 103 in the amount of heat generated through UV irradiation from the melting device 11.

Given that the inks 103 are to be irradiated with UV rays emitted by the melting device 11, the percentage content of the UV-absorbing agent may be adjusted in such a manner that the ink 103 containing a coloring agent with a lower UV absorptance has a higher content of UV-absorbing agent. When the two inks 103 are irradiated with UV rays emitted by the melting device 11, one of the inks 103 may have a lower UV absorptance of the coloring agent 107 than the other ink 103. The percentage content of the UV-absorbing agent in the ink 103 concerned may be higher than the percentage content of the UV-absorbing agent in the other ink 103. The other ink 103 does not necessarily contain the UV-absorbing agent. The term "specific wavelength Xl" with regard to the comparisons made on the absorptance may be interpreted as the center wavelength in the wavelength range of UV rays emitted by the melting device 11. The absorptance may be interpreted as the absorbance or a value (the absorption coefficient) determined by dividing the absorbance by the length of a sample (ink) upon which UV rays are incident. The UV absorptance of the coloring agent 107 contained in the ink 103 may be interpreted as the absorptance of a sample in which the percentage content of the coloring agent 107 is equal to that in the ink 103 given that UV rays are not substantially absorbed by other constituents (e.g., the medium 105) of the sample. Alternatively, the UV absorptance of the coloring agent 107 contained in the ink 103 may be interpreted as the UV absorptance of any of the inks 103 mentioned above in relation to the variations given that the UV-absorbing agent is substituted by the same amount of the medium 105. The absorptance may be measured by using a well-known spectrophotometer. With this approach, the percentage content of the UV-absorbing agent may be adjusted in such a way as to further reduce the differences among the inks 103 in the amount of heat generated through UV irradiation from the melting device 11.

Figure 12B:
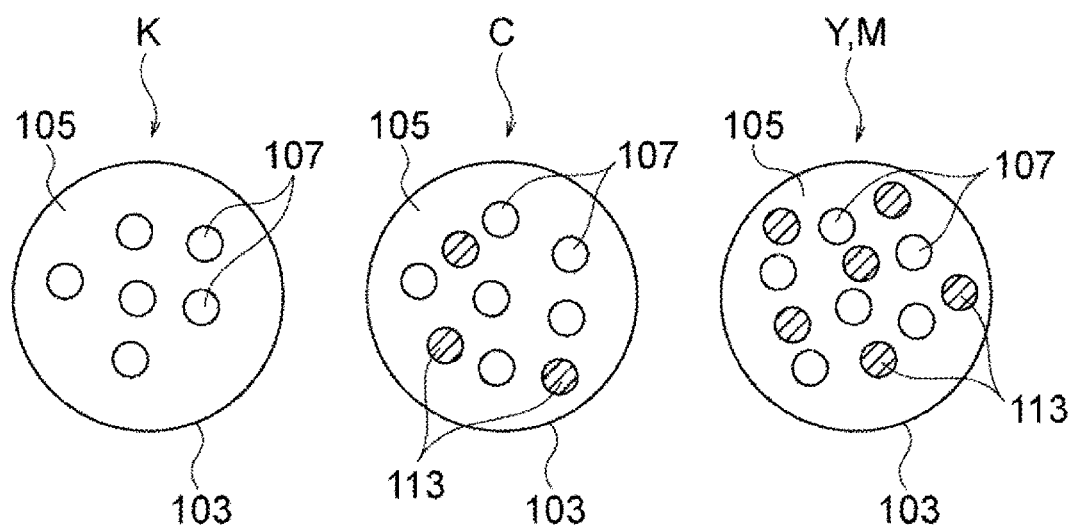
FIG. 12B is a schematic diagram for explanation of variations concerning an ink set.

FIG. 12B schematically illustrates an ink set including the inks 103 to which the UV-absorbing agent is added as in the example described above.

For greater clarity, the fixing polymer 109 and the like (constituents of the ink 103 other than the medium 105, the coloring agent 107, and a UV-absorbing agent 113) are not illustrated in FIG. 12B. K, C, Y, and M in FIG. 12B denote black, cyan, yellow, and magenta, respectively.

FIG. 12B illustrates an example in which UV rays at the specific wavelength $\lambda 1$ (see FIG. 12A) are emitted. The ink 103 in black is on top in terms of the heating value at the specific wavelength $\lambda 1$ and does not contain the UV-absorbing agent 113. The ink 103 in cyan contains the UV-absorbing agent 113. The ink 103 in yellow and the ink 103 in magenta are the lowest in terms of the heating value at the specific wavelength $\lambda 1$ and each have a higher percentage content of the UV-absorbing agent 113 than the ink 103 in cyan.

Figure 13A:
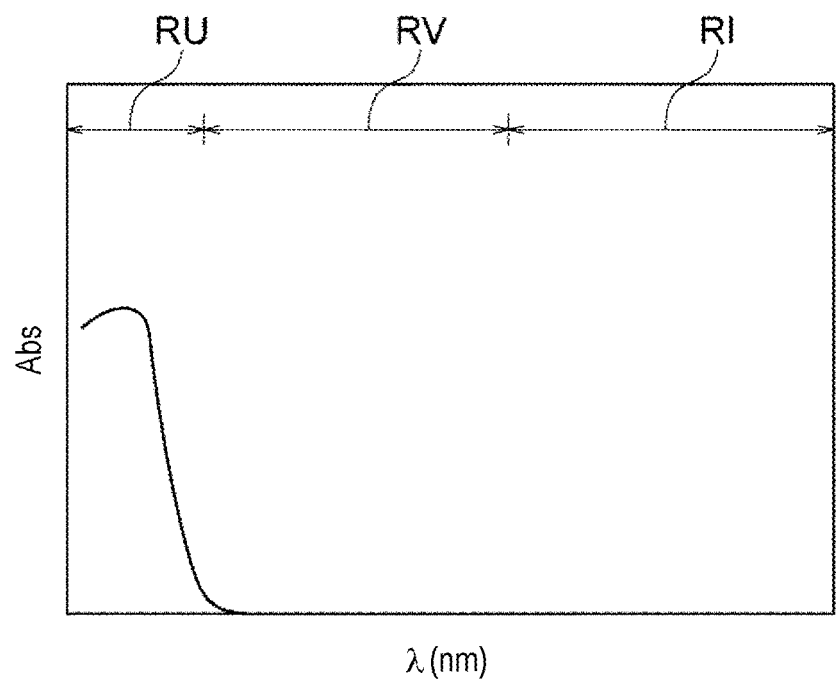
FIG. 13A is a graph schematically illustrating light absorption properties of a UV-absorbing agent in an example.

FIG. 13A is a graph schematically illustrating light absorption properties of the UV-absorbing agent 113 in an example. The horizontal axis and the vertical axis of the graph in FIG. 13B are identical to the respective axes of the graph in FIG. 12A.

As can be seen in the graph, the UV-absorbing agent 113 exhibits a rise in absorbance. The wavelengths at which the rise is exhibited is substantially within a range denoted by RU. The UV-absorbing agent 113 has little influence on visible light (visibility of the ink 103) while UV rays absorbed by the UV-absorbing agent 113 generate a large amount of heat. The absorbance in a range denoted by RV is not more than 10% or not more than 5% of the peak value of the absorbance or of the absorbance at the wavelength (the specific wavelength $\lambda 1$) of UV rays emitted by the melting device 11.

Figures 13B, 14:
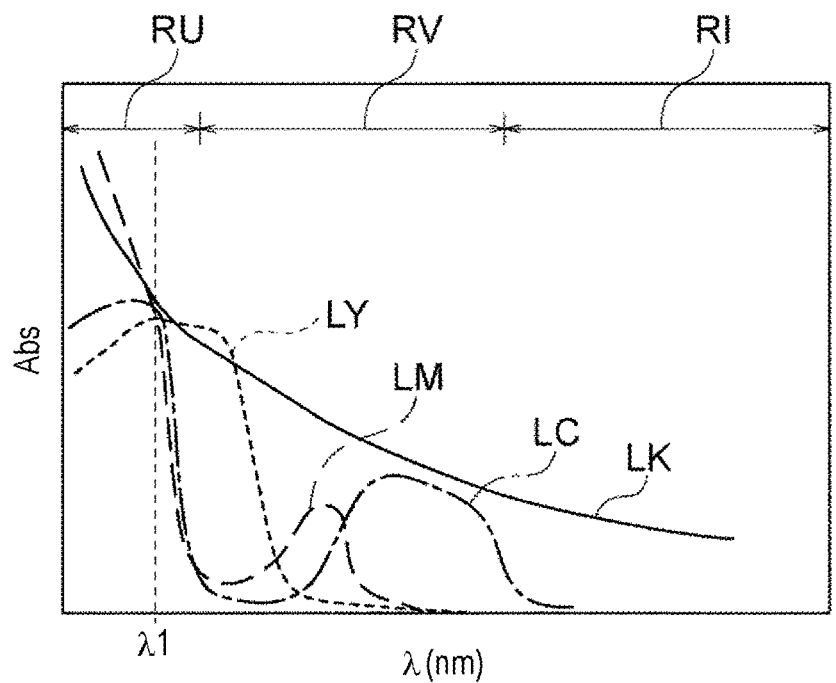
FIG. 13B is a graph schematically illustrating light absorption properties of inks in the ink set presented as an example of the variations.
FIG. 14 is a table for explanation of a method for producing a polymer that is to be contained in the ink according to an embodiment.

FIG. 13B is a graph schematically illustrating light absorption properties of the inks 103 in an example. The inks 103 concerned are those mentioned above as the variations and contain the UV-absorbing agent 113. The horizontal axis and the vertical axis of the graph in FIG. 13B are identical to the respective axes of the graph in FIG. 12A. As in FIG. 12A, LY, LM, LC, and LK denote the respective lines representing the four colors.

As described above with reference to FIG. 12B, inks of different colors can achieve the same level of absorbance (absorptance). More specifically, the UV-absorbing agent 113 having characteristics illustrated in FIG. 13A are added to inks such that inks of different colors exhibit the same level of absorbance (absorptance) at the wavelength (the specific wavelength $\lambda 1$) of UV rays emitted by the melting device 11. For all the colors, the difference in absorptance at the specific wavelength $\lambda 1$ is not more than 50%, not more than 20%, or not more than 10% of the highest absorptance. It is only required that for at least two inks 103 of different colors in the variations concerning the ink set, the difference in the absorptance at the specific wavelength $\lambda 1$ be reduced to some extent by the addition of the UV-absorbing agent 113. Unlike the example illustrated in FIG. 13B, not all the inks in another example have the same level of absorptance at the specific wavelength Xl.

Each ink 103 changes in color when the UV-absorbing agent 113 is added to the ink 103. The color difference increases with increasing mass % of the UV-absorbing agent 113 in the ink 103. With the color difference arising from the addition of the UV-absorbing agent 113, the mass % of the UV-absorbing agent 113 in each ink 103 may thus be set to a desired value with a view not only to reducing the difference in UV absorptance among the inks 103 but also to preventing the color difference from exceeding a predetermined threshold value.

For example, the threshold value is 10 or 5 on the grounds that a color difference of 5 or more is generally recognizable by humans. The color difference may be determined on the basis of the color of the ink ejected to an object subjected to printing. The color difference of two inks with the same constituents in the same relative proportions except for the UV-absorbing agent 113 may be measured. The relative proportions of constituents herein refer to the ratio of the mass of one constituent to the mass of another constituent rather than the mass % of each constituent in the ink.

Experiments conducted by the inventors in the present application validated the feasibility of satisfying the following conditions: the color difference arising from the addition of the UV-absorbing agent 113 is not more than 10; and there is uniformity among the inks 103 of different colors in terms of UV absorptance. The experimental results will be described below in more detail.

A black ink, a cyan ink, a yellow ink, and a magenta ink substantially identical in properties to the respective inks illustrated in FIG. 12A were prepared without the addition of the UV-absorbing agent 113. These inks are herein denoted by 103. More specifically, a black ink with an absorbance of about 0.8 at a wavelength of about 350 nm, a cyan ink with an absorbance of about 0.4 at a wavelength of about 350 nm, a yellow ink with an absorbance of about 0.2 at a wavelength of about 350 nm, and a magenta ink with an absorbance of about 0.2 at a wavelength of about 350 nm were used in the experiments.

The UV-absorbing agent 113 was added to three color inks other than the black ink, which was top of the four color inks 103 in terms of UV absorbance. The amount of the UV-absorbing agent 113 added to each ink 103 was equivalent to 5% of the mass of the ink 103 in a state before the addition of the UV-absorbing agent 113. For convenience, the content of the UV-absorbing agent 113 is hereinafter expressed as 5 mass %. Dipropylene glycol was used as the UV-absorbing agent 113. Dipropylene glycol has a peak absorbance at a wavelength of about 350 nm.

The absorbance of each of the three inks 103 was measured after the addition of the UV-absorbing agent 113. At a wavelength of about 350 nm, the cyan ink, the yellow ink, and the magenta ink each exhibited an absorbance higher than that of the black ink or, more specifically, an absorbance of about 1 or higher. It was found that the uniformity in absorbance was achievable among the inks of four different colors when the content of the UV-absorbing agent 113 was not more than 5 mass %.

For each of the three colors, inks were prepared with and without the addition of the UV-absorbing agent 113 under the same conditions as mentioned above to measure the color difference between them (the inks 103). Two inks 103 varying in the percentage content of the UV-absorbing agent 113 were prepared for each of the three colors. The amount of the UV-absorbing agent 113 added to one of the two inks and the amount of the UV-absorbing agent 113 added to the other ink were equivalent to 2.5% and 5%, respectively, of the mass of the ink 103 in a state before the addition of the UV-absorbing agent 113. Each ink 103 was applied to coated paper by using a bar coater and was then fully dried and fixed to the coated paper before being subjected to measurement of color difference. The thickness of each ink 103 applied to the coated paper was such that the color of the coated paper did not affect the measurement.

It was found from measurements that each of the three inks (the cyan ink, the yellow ink, and the magenta ink) and the corresponding one of the inks in which the content of the UV-absorbing agent 113 was 5 mass % had a color difference of not more than 10. Meanwhile, it was found from measurements that each of the yellow and magenta inks and the corresponding one of the inks in which the content of the UV-absorbing agent 113 was 2.5 mass % had a color difference of not more than 5. The results validated the feasibility of satisfying the following condition: the color difference arising from the addition of the UV-absorbing agent 113 is not more than 10 while the content of the UV-absorbing agent 113 is high enough to achieve uniformity in absorbance.

The UV-absorbing agent 113 may be in any desired form. For example, a substance that can be used to protect a polymer or a coloring agent or a substance that can be contained in cosmetics may be used as the UV-absorbing agent 113. Examples of such a UV-absorbing agent include dihydroxybenzophenone compounds, benzotriazole compounds, hydroxyphenyltriazine compounds, dipropylene glycol compounds, and cyanoacrylate compounds.

The variations described above can be summarized as follows. The ink 103 contains the medium 105, the coloring agent 107, the fixing polymer 109, and one or more kinds of polymers (e.g., the first polymer 111) other than the fixing polymer 109. The fixing polymer 109 is higher in Tg than 80 mass % or more of the one or more kinds of polymers contained in the ink 103 and each having a Tg higher than the ordinary temperature. This feature produces effects equivalent to those produced in the previous embodiments. For example, the fixing polymer 109 in a molten state is less likely to be formed into a coating that can inhibit the evaporation of the medium 105. This feature reduces the time it takes the ink 103 to be dried and fixed.

Two different inks 103 containing different coloring agents 107 may be included in an ink set. At least one of the two inks 103 may contain the UV-absorbing agent 113 different from the coloring agents 107. The percentage content of the UV-absorbing agent 113 in one of the two inks 103 may be different from the percentage content of the UV-absorbing agent in the other ink 103.

In this case, the amount of heat generated by UV irradiation is not dependent on the action of the coloring agent 107 only and is adjustable by the addition of the UV-absorbing agent 113. As mentioned above, this provide ease of enabling the inks 103 of different colors to achieve the same level of heating value. The converse of above is possible where the heating values of the inks 103 of different colors vary widely. In this case, an ink of a specific color may be preferentially dried.

When the two inks 103 are irradiated with UV rays at the specific wavelength Xl, the coloring agent 107 contained in one of the inks 103 (e.g., Y or M) may have a lower UV absorptance than the coloring agent 107 contained in the other ink 103 (C or K). The percentage content of the UV-absorbing agent 113 in the ink 103 concerned may be higher than the percentage content of the UV-absorbing agent in the other ink 103.

At the same time or alternatively, the UV absorptance of the coloring agent 107 contained in one of the two inks 103 (e.g., Y or M) may be lower than the UV absorptance of the other coloring agent 107 contained in the other ink 103 (e.g., C or K), and the percentage content of the UV-absorbing agent 113 different from the coloring agents 107 may be higher in the ink 103 concerned than in the other ink 103.

These features reduce the variability between the inks 103 of different colors in the amount of heat generated per unit time under UV irradiation at the predetermined specific wavelength λ1 and, as a result, reduce the possibility that the ink 103 of a specific color will be heated excessively or insufficiently. Thus, the inks 103 on the object 101 can be fixed with stability, irrespective of (the color scheme of) an image printed on the object 101.

Each ink 103 and the corresponding ink with the same constituents in the same relative proportions except for the UV-absorbing agent 113 have a color difference of not more than 10 after being ejected to an object subjected to printing.

When this condition is satisfied, the UV-absorbing agent 113 added to each ink 103 is less likely to cause a deterioration in image quality. Thus, the time it takes the ink 103 to be fixed can be reduced without deterioration in image quality.

EXAMPLES

The following describes concrete examples of a method for producing the ink 103 according to the embodiments.

FIG. 14 is a table provided for explanation of Production Examples 1 and 6. FIG. 15 is a table provided for explanation of Production Examples 2 to 5. FIG. 16 is a table provided for explanation of Production Examples 7 to 10.

Production Example 1 is an example method for producing a dispersant polymer (an example of the first polymer 111). Production Examples 2 to 5 are example methods for producing a water dispersion that contains both a dispersant polymer obtained in Production Example 1 and a pigment (the coloring agent 107). The term "water dispersion" herein refers to a disperse system in which the medium is mostly water. Each of Production Examples 2 to 5 is provided for the corresponding one of the four colors. Production Example 6 is an example method for producing a water dispersion in which the fixing polymer 109 is dispersed. Each of Production Examples 7 to 10 is an example method for producing an ink 103 that contains both the water dispersion prepared in the corresponding one of Production Examples 2 to 5 provided for the respective four colors and the water dispersion produced in Production Example 6 and containing the fixing polymer 109. In the following production examples, "part(s)" following a numerical value stands for "part(s) by mass" unless otherwise specified.

Production Example 1: Synthesis of Dispersant Polymer

Several kinds of monomers in FIG. 4 are added together to prepare 115 parts of a monomer mixture solution. More specifically, the monomers include:
styrene available from Wako Pure Chemical Industries, Ltd.;
butyl acrylate available from Wako Pure Chemical Industries, Ltd.;
methacrylic acid available from Wako Pure Chemical Industries, Ltd.; and
methoxypolyethylene glycol methacrylate "BLEMMER PME-200" available from NOF Corporation.

Then, 10% (11.5 parts) of the monomer mixture solution, 18 parts of methyl ethyl ketone, 0.03 parts of 2-mercaptoethanol as a chain transfer agent, are charged into a reaction vessel and are mixed together, and the inside atmosphere of the reaction vessel is fully replaced with a nitrogen gas.

Separately, a mixed solution prepared by mixing remaining 90% (103.5 parts) of the monomer mixture solution, 0.27 parts of the chain transfer agent, 42 parts of methyl ethyl ketone, and 3 parts of 2,2'-azobis(2,4-dimethylvaleronitrile) as a polymerization initiator (available from Wako Pure Chemical Industries, Ltd.) is charged into a dropping funnel. In a nitrogen atmosphere, the mixed solution in the reaction vessel is heated to 75° C. while being stirred. The mixed solution in the dropping funnel is added dropwise to the mixed solution in the reaction vessel over 3 hours.

After the completion of the dropwise addition, the resulting mixed solution is kept at 75° C. for 2 hours. Then, a solution prepared by dissolving 3 parts of the polymerization initiator in 5 parts of methyl ethyl ketone is added to the mixed solution in the reaction vessel. The resulting reaction solution is further aged at 75° C. for 2 hours and at 80° C. for 2 hours, and 50 parts of methyl ethyl ketone is further charged into the reaction vessel.

A dispersant polymer solution is obtained accordingly. The dispersant polymer solution has a weight-average molecular weight of about 50000. The Tg of the dispersant polymer solution is about 60° C. The solid content of the dispersant polymer solution is about 45 mass %.

Production Example 2: Production of Water Dispersion Containing Black Pigment and Dispersant Polymer In this example, 95.2 parts of the dispersant polymer solution obtained in Production Example 1 is dissolved in 53.9 parts of methyl ethyl ketone to prepare a solution. Then, 15.0 parts of a 5N sodium hydroxide aqueous solution and 0.5 parts of a 25% ammonia aqueous solution both acting as a neutralizing agent are added to the solution, and 341.3 parts of ion-exchanged water is further added to the resulting mixture. Then, 100 parts of C.I. Pigment Black 7 (P.B. 7) as a carbon black pigment (available from Cabot Japan K.K.) is further added to the resulting mixture to prepare a pigment mixed solution. The degree of neutralization of the polymer in the pigment mixed solution is about 79 mol %.

The constituents of the pigment mixed solution are blended at 20° C. for 1 hour using a disper blade running at 7000 rpm. The resulting dispersion is dispersed under a pressure of 180 MPa by passing through a dispersing apparatus 15 times. The dispersing apparatus is Microfluidizer "High-Pressure Homogenizer M-140K" available from Microfluidics Corporation.

The resulting dispersion is held at 60° C. under reduced pressure to remove methyl ethyl ketone, followed by further removal of water. The resulting dispersion is subjected to centrifugal separation, and a liquid-phase part of the dispersion is filtered through a filter "Minisart Syringe Filter" (pore diameter: 6 μm; material: cellulose acetate) (available from Sartorius Inc.) to remove coarse particles. A water dispersion containing the black pigment and the dispersant polymer is obtained accordingly.

Then, 0.45 parts of an epoxy crosslinking agent tradenamed "DENACOL EX 321L" (trimethylolpropane polyglycidyl ether; epoxy equivalent: 130) (available from Nagase ChemteX Corporation) and 15.23 parts of ion-exchanged water are added to 100 parts of the water dispersion. The resulting mixture is subjected to heat treatment at 70° C. for 3 hours while being stirred.

After the mixture subjected to heat treatment is cooled to room temperature, a liquid phase part of the mixture is filtered through a filter "Minisart Syringe Filter" (pore diameter: 5 μm; material: cellulose acetate) (available from Sartorius Inc.) to remove coarse particles. A water dispersion containing the black pigment and the dispersant polymer is obtained accordingly. The solid content of the water dispersion is about 22 wt %. The average particle size of the dispersant polymer is about 100 nm. FIG. 15 illustrates constituents and physical properties of the water dispersion obtained as above.

Production Examples 3 to 5: Production of Water Dispersions Containing Pigments of Other Colors and Dispersant Polymer The procedure in each of Production Examples 3 to 5 is the same as the procedure in Production Example 2 except for the kind and amount of pigment added and the amount of "DENACOL EX 321L" added. Referring to FIG. 15, a cyan pigment, a magenta pigment, and a yellow pigment are used. The pigments are as follows.
- Cyan: C.I. Pigment Blue 15:3 (available from DIC Corporation)
- Magenta: C.I. Pigment Red 150 (available from Fuji Pigment Co., Ltd.)
- Yellow: C.I. Pigment Yellow 74 (available from Dainichiseika Color & Chemicals Mfg. Co., Ltd.)

Production Example 6: Production of Water Dispersion Containing Fixing Polymer

The monomers in FIG. 14 are mixed together in a 1000 mL separable flask to obtain 200 parts of a monomer mixture solution. Then, 18.5 parts of "LATEMUL E118B" (emulsifier; active ingredient content: 26%) (available from Kao Corporation), 96 parts of ion-exchanged water, and potassium persulfate (available from Wako Pure Chemical Industries, Ltd.) are added to the monomer mixture solution. The resulting mixture is stirred using agitator blades (300 rpm). A monomer emulsion is obtained accordingly.

Separately, 4.6 parts of "LATEMUL E118B", 186 parts of ion-exchanged water, and 0.08 parts of potassium persulfate are charged into a reaction vessel, and the inside atmosphere of the reaction vessel is replaced with a nitrogen gas. In a nitrogen atmosphere, the mixed solution in the reaction vessel is heated to 80° C. while being stirred with agitator blades (200 rpm). Then, the monomer emulsion is charged into a dropping funnel and added dropwise to the mixed solution in the reaction vessel over 3 hours to allow the monomer emulsion to react with the mixed solution. A water dispersion containing the fixing polymer is obtained accordingly.

The solid content of the water dispersant containing the fixing polymer is about 42 wt %. The average particle size of the fixing polymer 109 is about 100 nm.

Production Example 7: Production of Black Ink

A mixed solution is prepared by mixing 508.9 g of the water dispersion (solid content: 22.0 wt %) obtained in Production Example 2 and containing the black pigment and the dispersant polymer, 48.3 g of the water dispersion (solid content: 41.6 wt %) obtained in Production Example 6 and containing the fixing polymer 109, 44.0 g of diethylene glycol monoisobutyl ether (boiling point: 230° C.), 286.0 g of propylene glycol (boiling point: 188° C.), 5.5 g of a silicone-based surface-active agent named "KF-6011" (polyether-modified silicone; HLB: 14.5) (available from Shin-Etsu Chemical Co., Ltd.), and 207.3 g of ion-exchanged water. The resulting mixed solution is filtered through a filter "Minisart Syringe Filter" (pore diameter: 5.0 μm; material: cellulose acetate) (available from Sartorius Inc.) to obtain a black water-based ink. The constituents and physical properties of the black ink are illustrated in FIG. 16.

Production Examples 8 to 10: Production of Inks of Other Colors

The procedure in each of Production Examples 8 to 10 is basically the same as the procedure in Production Example 7 except that the water dispersion containing the black ink is replaced with the water dispersion obtained in Production Examples 3 to 5. The constituents and physical properties of each of the cyan ink, the magenta ink, and the yellow in are illustrated in FIG. 16.

The technique disclosed herein is not limited to the embodiments described above and may be implemented in various forms.

The ink disclosed herein may be adopted into a desired printing apparatus, which is not limited to those described above in relation to the embodiments. It is not required that a dryer dedicated to the purpose of expediting evaporation of the medium and a melting device dedicated to the purpose of transforming the fixing polymer into a molten state be included in the printing apparatus. For example, a heat roller, a UV irradiator, and/or a warm air dryer may serve as both the dryer and the melting device. In this case as well, the fixing polymer in a molten state is less likely to be quickly formed into a coating that can inhibit the evaporation of the medium. This provides ease of improving the evaporation efficiency of the medium.

When viewed from another perspective, the melting of the fixing polymer may be caused by the heat roller or the warm air dryer, not through UV irradiation. The melting of the fixing polymer may be caused by the heat transfer from the object to the ink, not by the direct application of heat to the ink without the object serving as a path of heat transfer. The evaporation of the medium may be caused by the application of heat through UV irradiation, not through the application of heat by the heat roller or the warm air dryer.

It is not required that the object on which a printed record is to be produced be long and/or be conveyed by at least one roller. For example, the printing apparatus may run a conveyor belt such that the object placed on the conveyor belt is conveyed. In this case, the object may be cut-sheet paper, cut pieces of cloth, lumber, or tiles.

It is not required that the conveyor that conveys the object be included in the printing apparatus. That is, it is not required that the direction of conveyance of the object, the upstream side in the direction of conveyance, and the downstream side in the direction of conveyance be specified. For example, the printing apparatus may cause various devices (the dryer, the ink ejector, the melting device, and/or the auxiliary melting device) to shift when the object is stationary. More specifically, printing may be performed by using a robot that moves the ink ejector along the surface of the object. Before the ink ejector is brought close to the object or after the ink ejector is retracted, a warm air dryer fixed to the printing apparatus or carried by the robot may eject a jet of warm air to cause the medium to evaporate. After the ink ejector is retracted, the melting device may be brought close to the surface of the object by the robot to cause the fixing polymer to melt. In such an embodiment, printing may be performed not only two-dimensionally but also three-dimensionally by moving the ink ejector along surfaces of an object having a three-dimensional shape. Various devices may be moved while the object is conveyed.

In some embodiments, the expression "direction of conveyance of the object" may be read as the direction in which the object and various devices shift relative to each other.

Examples of the dryer are not limited to the heat rollers and the warm air dryer. For example, the dryer may irradiate the object with infrared rays to heat the object. As mentioned above in relation to the embodiments, it is not required that the dryer be located upstream and downstream of the ink ejector in the direction of conveyance of object; that is, the dryer may be in positional agreement with the ink ejector. For example, the dryer may include a plate-like heater that faces the ink ejector with the object therebetween. In this state, the plate-like heater is in contact with the back surface of the object. It is not required that the melting device be configured to emit UV rays. For example, the melting device that applies heat directly to the ink without the object serving as a path of heat transfer may be configured to blow out warm air or to emit infrared rays.

The invention claimed is:

1. A printing apparatus comprising:
   an ink ejector configured to eject an ink to an object on which a printed record is to be produced;
   a dryer; and
   a melting device, wherein
   the ink comprises:
   a medium;
   a coloring agent dissolved or dispersed in the medium;
   a fixing polymer having a glass-transition temperature higher than room temperature and being dispersed in the medium; and
   one or more kinds of polymers other than the fixing polymer, the one or more kinds of polymers each having a glass-transition temperature higher than the room temperature and being dissolved or dispersed in the medium,
   a glass-transition temperature of the fixing polymer is higher than the glass-transition temperature of 80 mass % or more of the one or more kinds of polymers contained in the ink,
   the dryer is configured to heat the object to expedite evaporation of the medium,
   the melting device is configured to subject the ink on the object to heat that causes the fixing polymer to melt and to fix the ink to the object accordingly, and
   the melting device irradiates the ink on the object with ultraviolet rays to heat the ink and melt the fixing polymer while the ink is exposed to a surrounding atmosphere.

2. The printing apparatus according to claim 1, wherein the a glass-transition temperature of fixing polymer is higher than the glass-transition temperature of the entirety of the one or more polymers contained in the ink.

3. The printing apparatus according to claim 1, wherein the medium comprises water and an organic solvent.

4. The printing apparatus according to claim 1, a difference between the glass-transition temperature of the fixing polymer and the glass-transition temperature of the 80 mass % or more of the one or more kinds of polymers is equal to or more than 40° C. and equal to or less than 60° C.

5. The printing apparatus according to claim 1, wherein the 80 mass % or more of the one or more kinds of polymers comprises a dispersant polymer.

6. The printing apparatus according to claim 1, further comprising an ink set comprising two kinds of inks comprising different coloring agents, wherein
   at least one of the inks comprises an ultraviolet-absorbing agent different from the coloring agents, and
   a percentage content of the ultraviolet-absorbing agent in one of the inks is not equal to a percentage content of the ultraviolet-absorbing agent in the other ink.

7. The ink-set printing apparatus according to claim 6, wherein when the inks are irradiated with ultraviolet rays at a specific wavelength, the coloring agent contained in one of the inks has a lower ultraviolet absorptance than the coloring agent contained in the other ink, and
   the percentage content of the ultraviolet-absorbing agent in the one of the inks is higher than the percentage content of the ultraviolet-absorbing agent in the other ink.

8. The printing apparatus according to claim 6, wherein when the inks are irradiated with ultraviolet rays at a specific wavelength, one of the inks has a lower ultraviolet absorptance of the coloring agent than the other ink, and
   the percentage content of the ultraviolet-absorbing agent in the one of the inks is higher than the percentage content of the ultraviolet-absorbing agent in the other ink.

9. The printing apparatus according to claim 6, wherein the one of the inks and an ink with same constituents in same relative proportions except for the ultraviolet-absorbing agent have a color difference of not more than 10 after being ejected to an object subjected to printing.

10. The printing apparatus according to claim 1, wherein the melting device is disposed downstream of the dryer in a direction of conveyance of the object.

11. The printing apparatus according to claim 1, wherein the melting device causes the fixing polymer to melt after the dryer causes the medium to evaporate.

12. The printing apparatus according to claim 1, wherein an amount of heat to be applied to the object by the dryer, relative positions of the dryer and the melting device, and a speed of conveyance of the object are set to values at which the medium fully evaporates through application of heat by the dryer before the melting device causes the fixing polymer to melt.

13. The printing apparatus according to claim 1, wherein
   the dryer heats the object to a temperature below a glass-transition temperature of the fixing polymer, and
   the melting device heats the ink on the object to a temperature equal to or higher than the glass-transition temperature of the fixing polymer.

14. The printing apparatus according to claim 13, wherein the dryer heats the object to a temperature equal to or higher than the glass-transition temperature of the 80 mass % or more of the one or more kinds of polymers and lower than the glass-transition temperature of the fixing polymer.

15. The printing apparatus according to claim 14, wherein
   the dryer comprises a first dryer disposed upstream of the ink ejector in a direction of conveyance of the object, and
   an amount of heat to be applied by the first dryer, relative positions of the first dryer and the ink ejector, and a speed of conveyance of the object are set to values at which a temperature in a region being part of the object and being immediately anterior to a region facing the ink ejector is equal to or higher than the glass-transition temperature of the 80 mass % or more of the one or more kinds of polymers and lower than the glass-transition temperature of the fixing polymer.

16. The printing apparatus according to claim 14, wherein the dryer is disposed upstream of the melting device in a direction of conveyance of the object, and an amount of heat to be applied by the dryer, relative positions of the dryer and the melting device, and a speed of conveyance of the object are set to values at which a temperature in a region being part of the object and extending from immediately posterior to the dryer to immediately anterior to a region facing the melting device is equal to or higher than the glass-transition temperature of the 80 mass % or more of the one or more kinds of polymers and lower than the glass-transition temperature of the fixing polymer.

17. The printing apparatus according to claim 1, wherein the dryer heats the ink to a temperature equal to or higher than 50° C. and lower than 120° C., the temperature being lower than the glass-transition temperature of the fixing polymer.

18. The printing apparatus according to claim 1, wherein the ink comprises an UV-absorbing agent different from the coloring agent,
a wavelength of the ultraviolet rays are not less than 10 nm and not more than 400 nm, and
an intensity of the ultraviolet rays are not less than 10 W/cm2.

19. A printing method comprising:
ejecting an ink to an object on which a printed record is to be produced;
drying; and
melting, wherein
the ink comprises:
  a medium;
  a coloring agent dissolved or dispersed in the medium;
  a fixing polymer having a glass-transition temperature higher than room temperature and being dispersed in the medium; and
  one or more kinds of polymers other than the fixing polymer, the one or more kinds of polymers each having a glass-transition temperature higher than the room temperature and being dissolved or dispersed in the medium,
a glass-transition temperature of the fixing polymer is higher than the glass-transition temperature of 80 mass % or more of the one or more kinds of polymers contained in the ink,
the drying comprises heating the object to expedite evaporation of the medium,
the melting comprises subjecting the ink on the object to heat that causes the fixing polymer to melt and to fix the ink to the object accordingly, and
the melting comprises irradiating the ink on the object with ultraviolet rays to heat the ink and melt the fixing polymer while the ink is exposed to a surrounding atmosphere.

* * * * *